(12) United States Patent
Fortman et al.

(10) Patent No.: US 12,325,778 B2
(45) Date of Patent: Jun. 10, 2025

(54) URETHANE EXCHANGE CATALYSTS AND METHODS FOR REPROCESSING CROSS-LINKED POLYURETHANE FOAMS

(71) Applicants: Northwestern University, Evanston, IL (US); Cornell University, Ithaca, NY (US); Regents of the University of Minnesota, Minneapolis, MN (US)

(72) Inventors: David J. Fortman, Pittsburgh, PA (US); William R. Dichtel, Wilmette, IL (US); Daylan T. Sheppard, Evanston, IL (US); Kailong Jin, Minneapolis, MN (US); Christopher J. Ellison, Eden Prairie, MN (US)

(73) Assignees: Northwestern University, Evanston, IL (US); Cornell University, Ithaca, NY (US); Regents of the University of Minnesota, Minneapolis, MN (US)

( * ) Notice: Subject to any disclaimer, the term of this patent is extended or adjusted under 35 U.S.C. 154(b) by 714 days.

(21) Appl. No.: 17/605,831

(22) PCT Filed: Apr. 23, 2020

(86) PCT No.: PCT/US2020/029502
§ 371 (c)(1),
(2) Date: Oct. 22, 2021

(87) PCT Pub. No.: WO2020/219663
PCT Pub. Date: Oct. 29, 2020

(65) Prior Publication Data
US 2022/0267562 A1  Aug. 25, 2022

Related U.S. Application Data

(60) Provisional application No. 62/837,606, filed on Apr. 23, 2019.

(51) Int. Cl.
| | |
|---|---|
| *C08J 11/26* | (2006.01) |
| *B01J 31/04* | (2006.01) |
| *B01J 31/22* | (2006.01) |
| *C08G 18/08* | (2006.01) |
| *C08G 18/12* | (2006.01) |
| *C08G 18/24* | (2006.01) |
| *C08G 18/42* | (2006.01) |
| *C08G 18/48* | (2006.01) |
| *C08G 18/76* | (2006.01) |

(52) U.S. Cl.
CPC .............. *C08J 11/26* (2013.01); *B01J 31/04* (2013.01); *B01J 31/2234* (2013.01); *C08G 18/12* (2013.01); *C08G 18/14* (2013.01); *C08G 18/242* (2013.01); *C08G 18/42* (2013.01); *C08G 18/4812* (2013.01); *C08G 18/4833* (2013.01); *C08G 18/7671* (2013.01); *B01J 2531/54* (2013.01); *B01J 2531/842* (2013.01); *C08G 2110/0025* (2021.01); *C08J 2375/06* (2013.01); *C08J 2375/08* (2013.01)

(58) Field of Classification Search
USPC ......................................... 521/43.5
See application file for complete search history.

(56) References Cited

U.S. PATENT DOCUMENTS

| | | |
|---|---|---|
| 3,684,769 A | 8/1972 | Abbott et al. |
| 4,657,988 A | 4/1987 | Sugerman et al. |
| 5,292,462 A | 3/1994 | Nestle |
| 5,451,376 A | 9/1995 | Proksa et al. |
| 5,478,865 A | 12/1995 | Chang |
| 5,525,278 A | 6/1996 | Krosch et al. |
| 5,587,448 A | 12/1996 | Krosch et al. |
| 9,410,026 B1 | 8/2016 | Rees et al. |
| 2005/0096399 A1 | 5/2005 | Villwock et al. |
| 2011/0105634 A1 | 5/2011 | Cookson et al. |
| 2015/0353675 A1 | 12/2015 | Duquenne et al. |
| 2017/0210055 A1 | 7/2017 | Xie et al. |
| 2017/0218192 A1 | 8/2017 | Groote et al. |
| 2018/0291125 A1 | 10/2018 | Anderson et al. |
| 2018/0312657 A1 | 11/2018 | Yue et al. |

FOREIGN PATENT DOCUMENTS

| | | | |
|---|---|---|---|
| CN | 107805308 A | 3/2018 | |
| KR | 20000012371 A | 3/2000 | |
| WO | 2001092366 A1 | 12/2001 | |
| WO | 2003008488 A1 | 1/2003 | |
| WO | 2005090427 A2 | 9/2005 | |
| WO | 2014086974 A1 | 6/2014 | |
| WO | WO-2018028365 A1 * | 2/2018 | ............ C08F 220/28 |

(Continued)

OTHER PUBLICATIONS

Brutman, J. P. et al., Mechanistic study of stress relaxation in urethane-containing polymer networks. J. Phys. Chem. B 2019, 123 (6), 1432-1441.

Brutman, J. P. et al., Polyactide Vitrimers. ACS Macro Lett. 2014, 3, 607-610.

Capelot, M. et al., Catalytic control of the vitrimer glass transition. ACS Macro Lett. 2012, 1, 789-792.

Colodny, P. C. et al., Chemorheological Study of Polyurethan Elastomers1. J. Am. Chem. Soc. 1957, 79 (16), 4320-4323.

Fortman, D. J. el al., Mechanically activated, catalyst-free polyhydroxyurethane vitrimers. J. Am. Chem. Soc. 2015, 137 (44), 14019-14022.

Fortman, D. J. et al., Reprocessing Cross-Linked Polyurethanes by Catalyzing Carbamate Exchange. Macromolecules 2019, 52 (16), 6330-6335.

(Continued)

*Primary Examiner* — Terressa Boykin
(74) *Attorney, Agent, or Firm* — Quarles & Brady LLP

(57) ABSTRACT

Disclosed herein are methods for reprocessing polyurethane compositions such as polyurethane foams. The method comprises introducing a polyurethane composition into a compounding device, heating the polyurethane composition to an effective bond-exchange temperature, and compounding the polyurethane composition for an effective bond-exchange time.

20 Claims, 31 Drawing Sheets

(56) References Cited

FOREIGN PATENT DOCUMENTS

WO     2018045866 A1     3/2018
WO     2019210098 A1     10/2019

OTHER PUBLICATIONS

Fortman, D. J. et al., Structural effects on the reprocessability and stress relaxation of crosslinked polyhydroxyurethanes. J. Appl. Polym. Sci. 2017, 134 (45), 44984.
Offenbach, J. A. et al., Chemical relaxation of stress in polyurethane elastomers. J. Colloid Sci. 1956, 11, 39-47.
Schellekens, Y. et al., Tin-free catalysts for the production of aliphatic thermoplastic polyurethanes. Green Chem 2014, 16 (9), 4401-4407.
Solouki Bonab, V. et al., Ultra-Fast Microwave Assisted Self-Healing of Covalent Adaptive Polyurethane Networks with Carbon Nanotubes. Macromol. Mater. Eng. 2019, 304 (1), 1800405.
Wang, Y. et al., Reprocessable and multiple shape memory thermosets with reconfigurability. Macromol. Rapid Commun. 2019, 1900001.
Wen, Z. et al. Reconfigurable LC Elastomers: Using a Thermally Programmable Monodomain To Access Two-Way Free-Standing Multiple Shape Memory Polymers. Macromolecules 2018, 51 (15), 5812-5819.
Yan, P. et al., Multifunctional polyurethane-vitrimers completely based on transcarbamoylation of carbamates: thermally-induced dual-shape memory effect and self-welding. RSC Adv. 2017, 7 (43), 26858-26866.
Yue, L.; Bonab, V. S.; Yuan, D.; Patel, A.; Karimkhani, V.; Manas-Zloczower, I., Vitrimerization: A Novel Concept to Reprocess and Recycle Thermoset Waste via Dynamic Chemistry. Global Challenges 2019, 1800076.
Zheng, N. et al., Catalyst-free thermoset polyurethane with permanent shape reconfigurability and highly tunable triple-shape memory performance. ACS Macro Lett. 2017, 6 (4), 326-330.
Zheng, N. et al., Thermoset shape-memory polyurethane with intrinsic plasticity enabled by transcarbamoylation. Angew. Chem. Int. Ed. 2016, 55 (38), 11421-11425.
International Search Report, corresponding to PCT/US20/29502, dated Jul. 21, 2020.
Yang, Y.; Xue, M.; Xiang, J. F.; Chen, C. F. Noncovalent Synthesis of Shape-Persistent Cyclic Hexamers from Ditopic Hydrazide-Based Supramolecular Synthons and Asymmetric Induction of Supramolecular Chirality. J. Am. Chem. Soc. 2009, 131 (35), 12657-12663.
Loo, Y. L.; Register, R. A.; Adamson, D. H. Direct Imaging of Polyethylene Crystallites within Block Copolymer Microdomains. J. Polym. Sci. Part B Polym. Phys. 2000, 38 (19), 2564-2570.
Wang, B.; Li, B.; Xiong, J.; Li, C. Y. Hierarchically Ordered Polymer Nanofibers via Electrospinning and Controlled Polymer Crystallization. Macromolecules 2008, 41 (24), 9516-9521.
Allo, B. A.; Rizkalla, A. S.; Mequanint, K. Synthesis and Electrospinning of E-Polycaprolactone-Bioactive Glass Hybrid Biomaterials via a Sol-Gel Process. Langmuir 2010, 26 (23), 18340-18348.
Herrera, D.; Zamora, J. C.; Bello, A.; Grimau, M.; Laredo, E.; Müller, A. J.; Lodge, T. P. Miscibility and Crystallization in Polycarbonate/Poly(&-Caprolactone) Blends: Application of the Self-Concentration Model. Macromolecules 2005, 38 (12), 5109-5117.
Jin, M et al., Neural Regen Res. 2012, 7 (28), 2213-2220.
Kulkarni, G. S. 1—Introduction to Polymer and Their Recycling Techniques. In Recycling of Polyurethane Foams; Thomas, S., Rane, A. V., Kanny, K., V.k., A., Thomas, M. G., Eds .; Plastics Design Library; William Andrew Publishing, 2018; pp. 1-16. https://doi.org/10.1016/B978-0-323-51133-9.00001-2.
McBride, M. K.; Worrell, B. T.; Brown, T.; Cox, L. M.; Sowan, N.; Wang, C.; Podgorski, M.; Martinez, A. M.; Bowman, C. N. Enabling Applications of Covalent Adaptable Networks. Annu. Rev. Chem. Biomol. Eng. 2019, 10, 175-198. https://doi.org/10.1146/annurev-chembioeng-060718-030217.
Cromwell, O. R.; Chung, J.; Guan, Z. Malleable and Self-Healing Covalent Polymer Networks through Tunable Dynamic Boronic Ester Bonds. J. Am. Chem. Soc. 2015, 137, 6492-6495. https://doi.org/10.1021/jacs.5b03551.
Willocq, B.; Khelifa, F.; Brancart, J.; Van Assche, G.; Dubois, Ph.; Raquez, J.-M. One-Component Diels-Alder Based Polyurethanes: A Unique Way to Self-Heal. RSC Adv 2017, 7, 48047-48053. https://doi.org/10.1039/C7RA09898G.
Snyder, R. L.; Fortman, D. J.; De Hoe, G. X.; Hillmyer, M. A.; Dichtel, W. R. Reprocessable Acid-Degradable Polycarbonate Vitrimers. Macromolecules 2018, 51, 389-397. https://doi.org/10.1021/acs.macromol.7b02299.
Lei, Z. Q.; Xiang, H. P.; Yuan, Y. J.; Rong, M. Z.; Zhang, M. Q. Room-Temperature Self-Healable and Remoldable Cross-Linked Polymer Based on the Dynamic Exchange of Disulfide Bonds. Chem. Mater. 2014, 26, 2038-2046. https://doi.org/10.1021/cm4040616.
Shi, J.; Zheng, T.; Zhang, Y.; Guo, B.; Xu, J. Reprocessable Cross-Linked Polyurethane with Dynamic and Tunable Phenol-Carbamate Network. ACS Sustain. Chem. Eng. 2020, 8, 1207-1218. https://doi.org/10.1021/ acssuschemeng. 9b06435.
Meng, F.; Pritchard, R. H.; Terentjev, E. M. Stress Relaxation, Dynamics, and Plasticity of Transient Polymer Networks. Macromolecules 2016, 49, 2843-2852. https://doi.org/10.1021/acs.macromol.5b02667.
Jones, M. D. In Sustainable Catalysis with Non-endangered Metals, Part 1; Royal Society of Chemistry, 2016; pp. 199-215. https://doi.org/10.1039/9781782622116.
Sardon, H.; Irusta, L.; Fernandez-Berridi, M. J. Synthesis of Isophorone Diisocyanate (IPDI) Based Waterborne Polyurethanes: Comparison between Zirconium and Tin Catalysts in the Polymerization Process. Prog. Org. Coat. 2009, 66, 291-295. https://doi.org/10.1016/j.porgcoat.2009.08.005.
Dobrzynski, P.; Kasperczyk, J.; Janeczek, H.; Bero, M. Synthesis of Biodegradable Copolymers with the Use of Low Toxic Zirconium Compounds. 1. Copolymerization of Glycolide with L -Lactide Initiated by Zr(Acac) 4. Macromolecules 2001, 34, 5090-5098. https://doi.org/10.1021/ma0018143.
Nandurkar, N. S.; Patil, D. S.; Bhanage, B. M. Ultrasound Assisted Synthesis of Metal-1,3-Diketonates. Inorg. Chem. Commun. 2008, 11, 733-736. https://doi.org/10.1016/j.inoche.2008.03.014.
Han, C.; Porco. Synthesis of Carbamates and Ureas Using Zr(IV)-Catalyzed Exchange Processes. Org. Lett. 2007, 9, 1517-1520. https://doi.org/10.1021/ol0702728.
Petrak, S.; Shadurka, V.; Binder, W. H. Cleavage of Blocked Isocyanates within Amino-Type Resins: Influence of Metal Catalysis on Reaction Pathways in Model Systems. Prog. Org. Coat. 2009, 66, 296-305. https://doi.org/10.1016/j. porgcoat.2009.08.006.
Blank, W. J.; He, Z. A.; Hessell, E. T. Catalysis of the Isocyanate-Hydroxyl Reaction by Non-Tin Catalysts. Prog. Org. Coat. 1999, 35, 19-29. https://doi.org/10.1016/S0300-9440(99)00006-5.
Yang, P. F.; Li, T. D. Urethane Reaction Kinetics of Butanediols Catalyzed by Zr(Acac) 4. J. Appl. Polym. Sci. 2013, 129, 2399-2403. https://doi.org/10.1002/app.38978.
Gao, W.; Bie, M.; Quan, Y.; Zhu, J.; Zhang, W. Self-Healing, Reprocessing and Sealing Abilities of Polysulfide-Based Polyurethane. Polymer 2018, 151, 27-33. https://doi.org/10.1016/j.polymer.2018.07.047.
Menard, K. P.; Menard, N. R.. Dynamic Mechanical Analysis in the Analysis of Polymers and Rubbers. In Encyclopedia of Polymer Science and Technology, 4th ed.; John Wiley & Sons, 2015; pp. 1-3.
J. DiGangi, J. Strakova, IPEN 2011.
P. Zhu, Z. B. Cao, Y. Chen, X. J. Zhang, G. R. Qian, Y. L. Chu, M. Zhou, Environ. Technol. 2014, 35, 2676.
D. Simón, A. M. Borreguero, A. De Lucas, J. F. Rodríguez, Polym. Degrad. Stab. 2015, 116, 23.
N. Zheng, Z. Fang, W. Zou, Q. Zhao, T. Xie, Angew. Chem. Int. Ed. 2016, 128, 11593.
Y. Wang, Y. Pan, Z. Zheng, X. Ding, Macromol. Rapid Commun. 2019, 40, 1.
M. Podgórski, B. D. Fairbanks, B. E. Kirkpatrick, M. McBride, A. Martinez, A. Dobson, N. J. Bongiardina, C. N. Bowman, Adv. Mater. 2020, 32, 1.

(56) References Cited

OTHER PUBLICATIONS

N. V. Gama, A. Ferreira, A. Barros-Timmons, Materials 2018, 11, 1841.
J. Stange, H. Münstedt, J. Rheol. 2006, 50, 907.
W. Zhai, T. Kuboki, L. Wang, C. B. Park, E. K. Lee, H. E. Naguib, Ind. Eng. Chem. Res. 2010, 49, 9834.
P. Dobrzynski, J. Polym. Sci. Part A Polym. Chem. 2002, 40, 3129.
A. Orchel, K. Jelonek, J. Kasperczyk, P. Dobrzynski, A. Marcinkowski, E. Pamula, J. Orchel, I. Bielecki, A. Kulczycka, Biomed Res. Int. 2013, 2013, 176946.
L. Xu, C. Li, K. Y. S. Ng, J. Phys. Chem. A 2000, 104, 3952.
Y. Xie, P. Li, J. Zhang, H. Wang, H. Qian, W. Yao, Spectrochim. Acta - Part A Mol. Biomol. Spectrosc. 2013, 114, 80.
A. S. Prakash, W. A. Swam, A. N. Strachan, J. Chem. Soc., Perkin Trans. 2 1975, 1975, 46.
J. A. Reyes-Labarta, A. Marcilla, J. Appl. Polym. Sci. 2008, 107, 339.
J. A. Reyes-Labarta, A. Marcilla, Ind. Eng. Chem. Res. 2012, 51, 9515.
H. E. Naguib, C. B. Park, N. Reichelt, J. Appl. Polym. Sci. 2004, 91, 2661.
C. B. Park, L. K. Cheung, Polym. Eng. Sci. 1997, 37, 1.
F. Peng, B. D. Vogt, M. Cakmak, Addit. Manuf. 2018, 22, 197.
A. D'Amico, A. M. Peterson, Addit. Manuf. 2018, 21, 422.
L. M. Matuana, O. Faruk, C. A. Diaz, Bioresour. Technol. 2009, 100, 5947.
P. Spitael, C. W. Macosko, Polym. Eng. Sci. 2004, 44, 2090.
C. B. Park, D. F. Baldwin, N. P. Suh, Polym. Eng. Sci. 1995, 35, 432.
J. Vera-Sorroche, A. Kelly, E. Brown, P. Coates, N. Karnachi, E. Harkin-Jones, K. Li, J. Deng, Appl. Therm. Eng. 2013, 53, 405.
G. J. Nam, J. H. Yoo, J. W. Lee, J. Appl. Polym. Sci. 2005, 96, 1793.
A. Paruzel, S. Michałowski, J. Hodan, P. Horák, A. Prociak, H. Bene, ACS Sustain. Chem. Eng. 2017, 5, 6237.
Sonnenchein, M. F. Polyurethanes: Science, Technology, Markets, and Trends; Wiley: Hoboken, NJ, 2015.
Szycher, M. Szycher's Handbook of Polyurethanes, 2nd ed .; Taylor & Francis, 2012.
Geyer, R.; Jambeck, J. R.; Law, K. L. Production, Use, and Fate of All Plastics Ever Made. Sci. Adv. 2017, 3 (7), e1700782.
Zia, K. M.; Bhatti, H. N.; Ahmad Bhatti, I. Methods for Polyurethane and Polyurethane Composites, Recycling and Recovery: A Review. React. Funct. Polym. 2007, 67 (8), 675-692.
Borda, J.; Pásztor, G.; Zsuga, M. Glycolysis of Polyurethane Foams and Elastomers. Polym. Degrad. Stab. 2000, 68 (3), 419-422.
You, K. K.; Durocher, D. T.; Kierkus, P. C.; Fishback, T. L. Chemical Recycling of Polyurethanes and Applications for the Recyclates. J. Cell. Plast. 1998, 34 (3), 261-271.
Matuszak, M. L.; Frisch, K. C.; Reegen, S. L. Hydrolysis of Linear Polyurethanes and Model Monocarbamates. J Polym Sci Part A-1 Polym Chem 1973, 11 (7), 1683-1690.
Mahoney, L. R.; Weiner, S. A.; Ferris, F. C. Hydrolysis of Polyurethane Foam Waste. Environ. Sci. Technol. 1974, 8(2), 135-139.
Simon, D.; Borreguero, A. M.; de Lucas, A.; Rodríguez, J. F. Recycling of Polyurethanes from Laboratory to Industry, a Journey towards the Sustainability. Waste Manag. 2018, 76, 147-171.
Helling, R. K .; Russell, D. A. Use of Life Cycle Assessment to Characterize the Environmental Impacts of Polyol Production Options. Green Chem. 2009, 11 (3), 380-38.
Maisonneuve L.; Lamarzelle, O.; Rix, E.; Grau, E.; Cramail, H. Isocyanate-Free Routes to Polyurethanes and Poly (Hydroxy Urethane)S. Chem. Rev. 2015, 115 (22), 12407-12439.J.
Rokicki, G.; Parzuchowski, P. G.; Mazurek, M. Non-Isocyanate Polyurethanes: Synthesis, Properties, and Applications. Polym. Adv. Technol. 2015, 26 (7), 707-761.
Montarnal, D.; Capelot, M.; Tournilhac, F.; Leibler, L. Silica-like Malleable Materials from Permanent Organic Networks. Science (80 -. ). 2011, 334 (6058), 965-968.
Kloxin, C. J.; Scott, T. F.; Adzima, B. J.; Bowman, C. N. Covalent Adaptable Networks (CANs): A Unique Paradigm in Cross-Linked Polymers. Macromolecules 2010, 43 (6), 2643-2653.
Chen, Z.; Sun, Y. C.; Wang, J.; Qi, H. J.; Wang, T.; Naguib, H. E. Flexible, Reconfigurable, and Self-Healing TPU/ Vitrimer Polymer Blend with Copolymerization Triggered by Bond Exchange Reaction. ACS Appl. Mater. Interfaces 2020, 12 (7), 8740-8750.
Snyder, H. L.; Meakin, P.; Reich, S. Dynamical Aspects of Phase Separation in Polymer Blends. Macromolecules 1983, 16 (5), 757-762.
Eagan, J. M.; Xu, J.; Di Girolamo, R.; Thurber, C. M.; Macosko, C. W.; La Pointe, A. M .; Bates, F. S .; Coates, G. W. Combining Polyethylene and Polypropylene: Enhanced Performance with PE/iPP Multiblock Polymers. Science (80-.). 2017, 355 (6327), 814-816.
Bates, C. M.; Bates, F. S. 50th Anniversary Perspective: Block Polymers-Pure Potential. Macromolecules 2017, 50 (1), 3-22.
Yang, Z.; Peng, H.; Wang, W.; Liu, T. Crystallization Behavior of Poly(&-Caprolactone)/Layered Double Hydroxide Nanocomposites. J. Appl. Polym. Sci. 2010, 116 (5), 2658-2667.
Yin, Z.; Koulic, C.; Pagnoulle, C.; Jérôme, R. Reactive Blending of Functional PS and PMMA: Interfacial Behavior of in Situ Formed Graft Copolymers. Macromolecules 2001, 34 (15), 5132-5139.
Sailer, C.; Handge, U. A. Reactive Blending of Polyamide 6 and Styrene-Acrylonitrile Copolymer: Influence of Blend Composition and Compatibilizer Concentration on Morphology and Rheology. Macromolecules 2008, 41 (12), 4258- 4267.
Todd, A. D.; Mceneany, R. J.; Topolkaraev, V. A.; Macosko, C. W.; Hillmyer, M. A. Reactive Compatibilization of Poly (Ethylene Terephthalate) and High-Density Polyethylene Using Amino-Telechelic Polyethylene. Macromolecules 2016, 49 (23), 8988-8994.
Hu, L.; Vuillaume, P. Y. Chapter 7—Reactive Compatibilization of Polymer Blends by Coupling Agents and Interchange Catalysts; A.R., A., Thomas, S. B. T.-C. of P. B., Eds.; Elsevier, 2020; pp. 205-248.
Martin, R.; Rekondo, A.; Ruiz De Luzuriaga, A.; Santamaria, A.; Odriozola, I. Mixing the Immiscible: Blends of Dynamic Polymer Networks. RSC Adv. 2015, 5 (23), 17514-17518.
Zhang, B.; Yuan, C.; Zhang, W.; Dunn, M. L.; Qi, H. J.; Liu, Z.; Yu, K.; Ge, Q. Recycling of Vitrimer Blends with Tunable Thermomechanical Properties. RSC Adv. 2019, 9 (10), 5431-5437.
Aubin, M .; Prud'homme, R. E. Analysis of the Glass Transition Temperature of Miscible Polymer Blends. Macromolecules 1988, 21 (10), 2945-2949.
Duek, K.; Spirková, M .; Havliek, I. Network Formation of Polyurethanes Due to Side Reactions. Macromolecules 1990, 23 (6), 1774-1781.
Haugstad, G. Atomic Force Microscopy: Understanding Basic Modes and Advanced Applications, 1st ed .; Wiley, 2012.
Singh, N.; Hui, D.; Singh, R.; Ahuja, I. P. S.; Feo, L.; Fraternali, F. Recycling of Plastic Solid Waste: A State of Art Review and Future Applications. Compos. Part B Eng. 2017, 115, 409-422.
Siddiqui, J.; Pandey, G. A Review of Plastic Waste Management Strategies. Int. Res. J. Environ. Sci. Int. Sci. Congr. Assoc. 2013, 2 (12), 84-88.
Budsaereechai, S.; Hunt, A. J.; Ngernyen, Y. Catalytic Pyrolysis of Plastic Waste for the Production of Liquid Fuels for Engines. RSC Adv. 2019, 9 (10), 5844-5857.
Rahimi, A. R.; Garcia, J. M. Chemical Recycling of Waste Plastics for New Materials Production. Nat. Rev. Chem. 2017, 1, 1-11.
Helms, B. A.; Russell, T. P. Reaction: Polymer Chemistries Enabling Cradle-to-Cradle Life Cycles for Plastics. Chem 2016, 1 (6), 816-818.
Garcia, J. M.; Robertson, M. L. The Future of Plastics Recycling. Science (80-.). 2017, 358 (6365), 870-872.
Tullo, A. H. Plastic Has a Problem; Is Chemical Recycling the Solution? Chem. Eng. News 2019, 97 (39).
Wahab, D. A.; Hussain, A.; Scavino, E.; Mustafa, M. M.; Basri, H. Development of a Prototype Automated Sorting System for Plastic Recycling D . A. Wahab , A . Hussain , E . Scavino , M . M . Mustafa and H . Basri. 2006, 3 (7), 1924-1928.
Utracki, L. A. Economics of Polymer Blends. Polym. Eng. Sci. 1982, 22 (17), 1166-1175.

(56) References Cited

OTHER PUBLICATIONS

Suarez, H.; Barlow, J. W.; Paul, D. R. Mechanical-Properties of Abs Polycarbonate Blends. J. Appl. Polym. Sci. 1984, 29, 3253-3259.
Kim, J.; Gray, M. K.; Zhou, H.; Nguyen, S. T.; Torkelson, J. M. Polymer Blend Compatibilization by Gradient Copolymer Addition during Melt Processing: Stabilization of Dispersed Phase to Static Coarsening. Macromolecules 2005, 38 (4), 16-19.
Macosko, C. W.; Jeon, H. K.; Hoye, T. R. Reactions at Polymer-Polymer Interfaces for Blend Compatibilization. Prog. Polym. Sci. 2005, 30 (8-9), 939-947.
Bates, C. M.; Maher, M. J.; Janes, D. W.; Ellison, C. J.; Willson, C. G. Block Copolymer Lithography. Macromolecules 2014, 47, 2-12.
Trimbach, D.; Feldman, K.; Spencer, N. D.; Broer, D. J.; Bastiaansen, C. W. M. Block Copolymer Thermoplastic Elastomers for Microcontact Printing. Langmuir 2003, 19 (26), 10957-10961.
Hillmyer, M. A. Block Copolymer Synthesis. Curr. Opin. Solid State Mater. Sci. 1999, 4, 559-564.
Anastasaki, A.; Oschmann, B.; Willenbacher, J.; Melker, A.; Van Son, M. H. C.; Truong, N. P.; Schulze, M. W.; Discekici, E. H.; McGrath, A. J.; Davis, T. P.; Bates, C. M.; Hawker, C. J. One-Pot Synthesis of ABCDE Multiblock Copolymers with Hydrophobic, Hydrophilic, and Semi-Fluorinated Segments. Angew. Chemie—Int. Ed. 2017, 56 (46), 14483-14487.
Boyer, C.; Soeriyadi, A. H.; Zetterlund, P. B.; Whittaker, M. R. Synthesis of Complex Multiblock Copolymers via a Simple Iterative Cu(0)-Mediated Radical Polymerization Approach. Macromolecules 2011, 44 (20), 8028-8033.
Gody, G.; Barbey, R.; Danial, M.; Perrier, S. Ultrafast RAFT Polymerization: Multiblock Copolymers within Minutes. Polym. Chem. 2015, 6 (9), 1502-1511.
Macosko, C. W.; Guégan, P.; Khandpur, A. K.; Nakayama, A.; Marechal, P.; Inoue, T. Compatibilizers for Melt Blending: Premade Block Copolymers. Macromolecules 1996, 29 (17), 5590-5598.
Mayo, F. R.; Lewis, F. M. Copolymerization. I. A Basis for Comparing the Behavior of Monomers in Copolymerization; The Copolymerization of Styrene and Methyl Methacrylate. J. Am. Chem. Soc. 1944, 66 (9), 1594-1601.
Lutz, J. F.; Kirci, B.; Matyjaszewski, K. Synthesis of Well-Defined Alternating Copolymers by Controlled/Living Radical Polymerization in the Presence of Lewis Acids. Macromolecules 2003, 36 (9), 3136-3145.
F. Saint-Michel, L. Chazeau, J. Y. Cavaillé, E. Chabert, Compos. Sci. Technol. 2006, 66, 2700.
K. L. Calvert, K. P. Trumble, T. J. Webster, L. A. Kirkpatrick, J. Mater. Sci. Mater. Med. 2010, 21, 1453.
L. J. Gibson, M. F. Ashby, Proc. R. Soc. London, Ser. A Math. Phys. Sci. 1982, 382, 43.
L. Gibson, M. Ashby, Cellular Solids, Structure and Properties, Cambridge University Press, Camebridge, United Kingdom 1984.
C. W. Visser, D. N. Amato, J. Mueller, J. A. Lewis, Adv. Mater. 2019, 31, 1.
Shastri, V. P.; Martin, I.; Langer, R. Macroporous Polymer Foams by Hydrocarbon Templating. Proc. Natl. Acad. Sci. U. S. A. 2000, 97 (5), 1970-1975.
Lau, T. H. M.; Wong, L. L. C.; Lee, K. Y.; Bismarck, A. Tailored for Simplicity: Creating High Porosity, High Performance Bio-Based Macroporous Polymers from Foam Templates. Green Chem. 2014, 16 (4), 1931-1940.
Petchwattana, N.; Covavisaruch, S. Influences of Particle Sizes and Contents of Chemical Blowing Agents on Foaming Wood Plastic Composites Prepared from Poly(Vinyl Chloride) and Rice Hull. Mater. Des. 2011, 32 (5), 2844-2850.
Azcune, I. et al. Aromatic Disulfide Crosslinks in Polymer Systems: Self-Healing, Reprocessability, Recyclability and More. Eur. Polym. J. 2016, 84, 147-160.
Capelot, M. et al. "Metal-catalyzed transesterification for healing and assembling of thermosets." Journal of the american chemical society 134.18 (2012): 7664-7667.
Chen, X.; et al. A Thermally Re-Mendable Cross-Linked Polymeric Material. Science 2002, 295 (5560), 1698-1702. https://doi.org/10.1126/science.1065879.
Denissen, W.; et al. Vitrimers: Permanent Organic Networks with Glass-like Fluidity. Chem Sci 2016, 7 (1), 30-38.
Egorova, K. S.; et al. Which Metals Are Green for Catalysis? Comparison of the Toxicities of Ni, Cu, Fe, Pd, Pt, Rh, and Au Salts. Angew. Chem. Int. Ed. 2016, 55 (40), 12150-12162.
Fortman, D. J. et al. Approaches to Sustainable and Continually Recyclable Cross-Linked Polymers. ACS Sustain. Chem. Eng. 2018, 6 (9), 11145-11159.
Fortman, D. J. et al. Rapidly Reprocessable Cross-Linked Polyhydroxyurethanes Based on Disulfide Exchange. ACS Macro Lett. 2018, 7 (10), 1226-1231.
Heo, Y.; et al. Self-Healing Polyurethanes with Shape Recovery. Adv. Funct. Mater. 2014, 24 (33), 5261-5268.
Imbernon, L.; et al. From Landfilling to Vitrimer Chemistry in Rubber Life Cycle. Eur. Polym. J. 2016, 82, 347-376.
Imbernon, L.; et al. Stress Relaxation and Self-Adhesion of Rubbers with Exchangeable Links. Macromolecules 2016, 49 (6), 2172-2178.
Kloxin, C. J. et al. Covalent Adaptable Networks: Smart, Reconfigurable and Responsive Network Systems. Chem Soc Rev 2013, 42 (17), 7161-7173.
Sahoo, P. K. et al. Iron-Catalyzed Selective Etherification and Transetherification Reactions Using Alcohols. ACS Omega 2018, 3 (1), 124-136.
Taynton, P.; et al. Heat- or Water-Driven Malleability in a Highly Recyclable Covalent Network Polymer. Adv. Mater. 2014, 26 (23), 3938-3942.
Yang, W. et al. Recycling and Disposal Methods for Polyurethane Foam Wastes. Procedia Environ. Sci. 2012, 16, 167-175.
Zhang, Z. P. et al. Mechanically Robust, Self-Healable, and Highly Stretchable "Living" Crosslinked Polyurethane Based on a Reversible C-C Bond. Adv. Funct. Mater. 2018, 28 (11), 1706050.
Zou, W. et al. Dynamic Covalent Polymer Networks: From Old Chemistry to Modern Day Innovations. Adv. Mater. 2017, 29 (14), 1606100.

\* cited by examiner

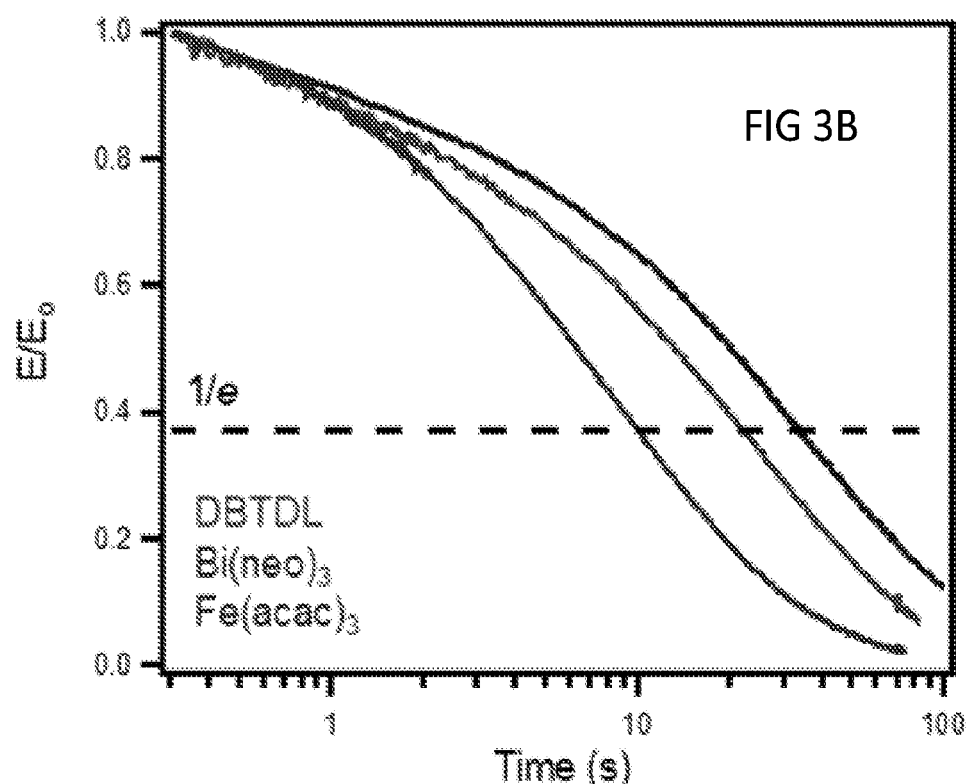
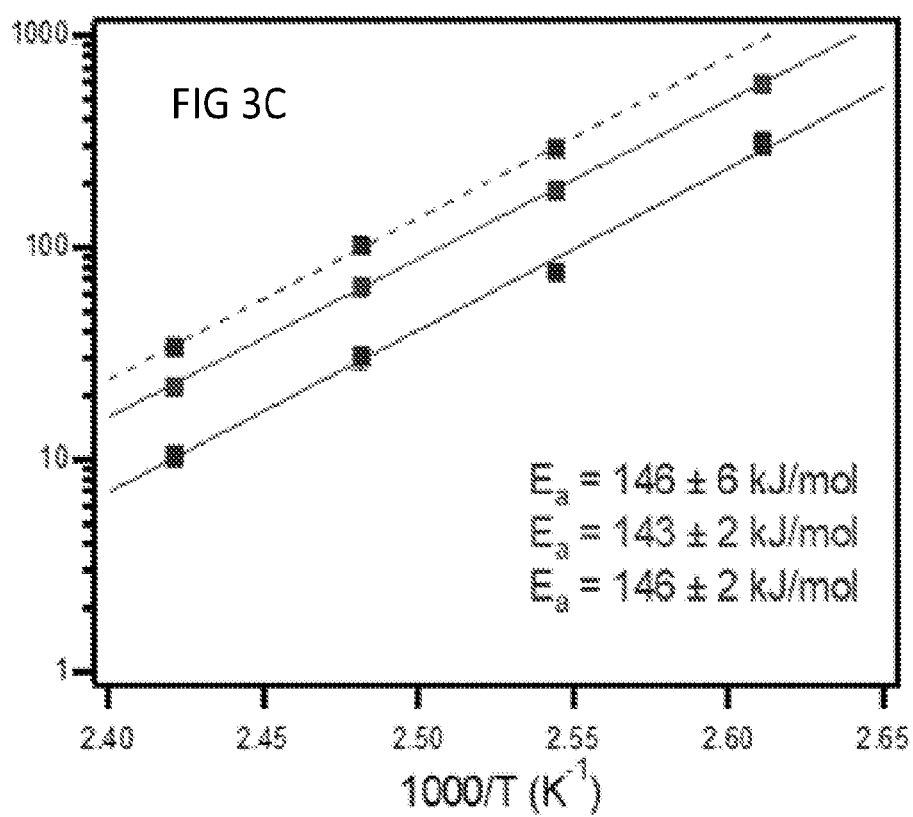

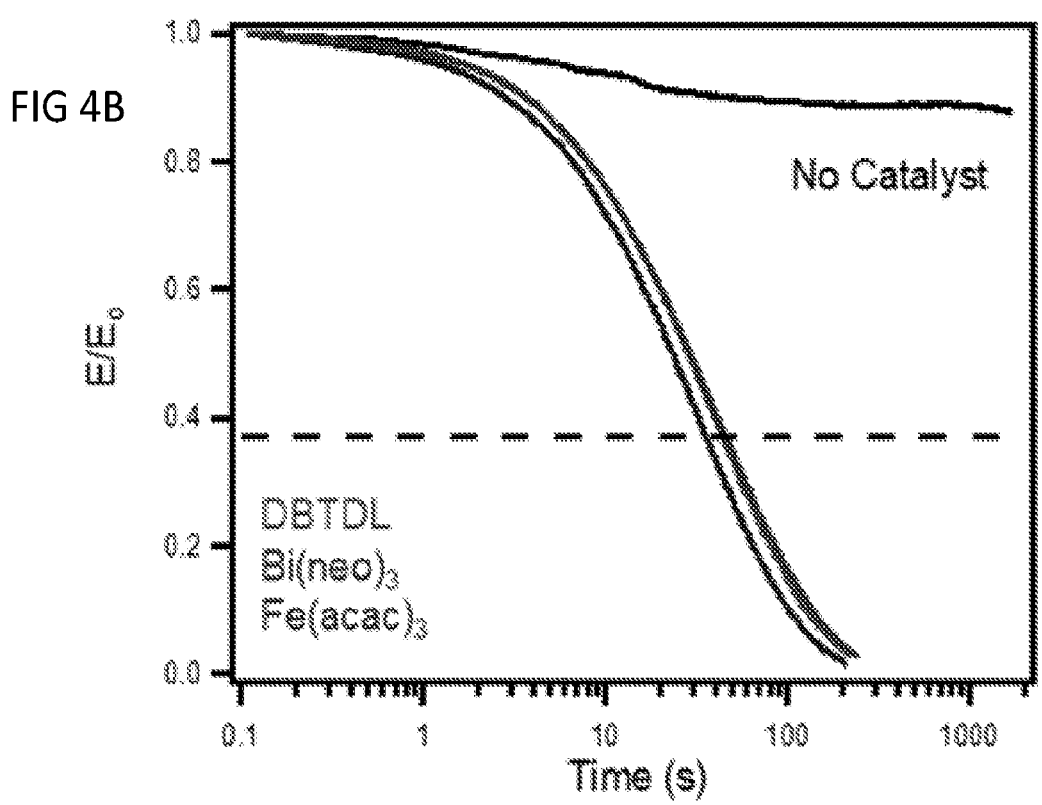
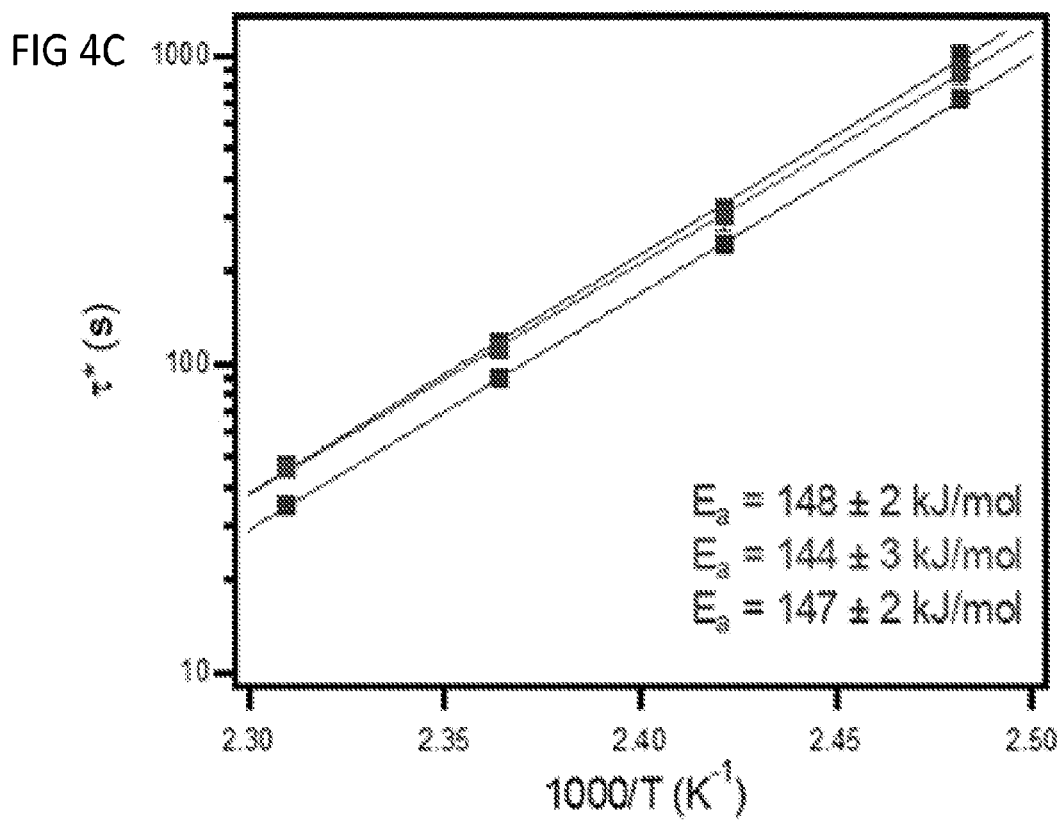

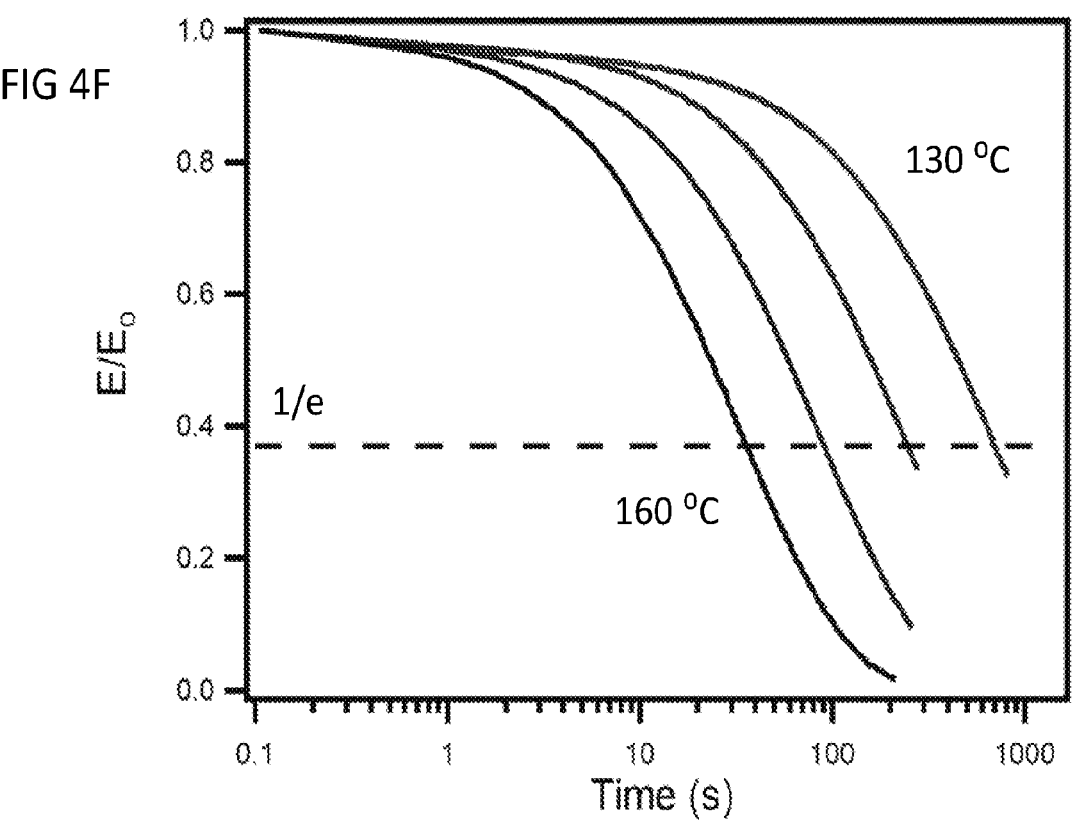

160 °C, 12 min

160 °C, 12 min

160 °C, 12 min

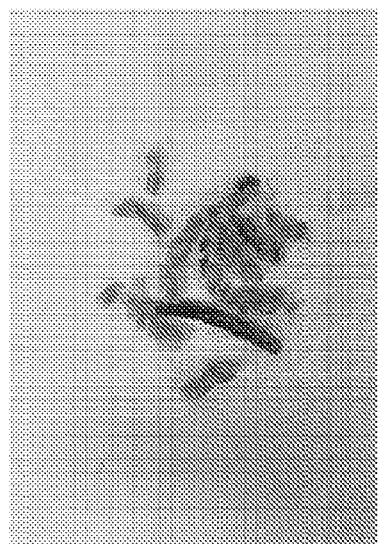
FIG 22
FIG 23A  FIG 23B  FIG 23C
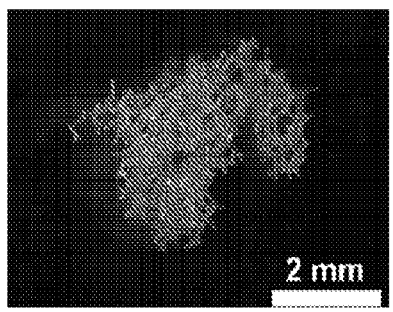 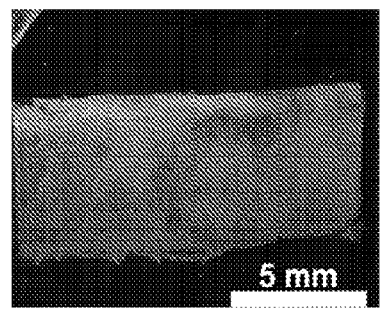 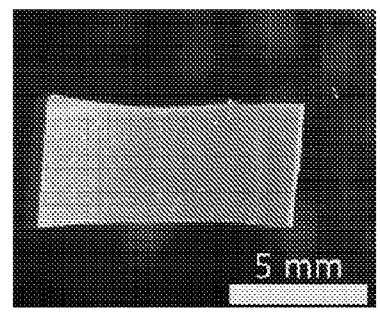

URETHANE EXCHANGE CATALYSTS AND METHODS FOR REPROCESSING CROSS-LINKED POLYURETHANE FOAMS

CROSS-REFERENCE TO RELATED APPLICATIONS

The present application is the U.S. National Stage of International Application No. PCT/US2020/029502, filed Apr. 23, 2020, which claims priority to U.S. Provisional Patent Application No. 62/837,606, filed Apr. 23, 2019, the entire contents of each are hereby incorporated by reference.

STATEMENT REGARDING FEDERALLY SPONSORED RESEARCH

This invention was made with government support under CHE-1413862 awarded by the National Science Foundation. The government has certain rights in the invention.

BACKGROUND OF THE INVENTION

Many cross-linked polymers are not recyclable. Incorporating dynamic covalent bonds into polymer networks can lead to materials that possess mechanical properties competitive with traditional static thermosets while displaying recyclability commonly associated with thermoplastics. Many dynamic covalent bonds, including imines, boronic esters, disulfides, and reversible Diels-Alder adducts have been incorporated into cross-linked polymer networks and been shown to enable their reprocessing. Although these approaches will potentially enable new technologies or sustainable reuse of cross-linked materials, these linkages are uncommon in commodity polymers such as polyurethanes (PUs).

PUs are the sixth largest class of polymers used worldwide, and are commonly used in cross-linked architectures as foams, adhesives, coatings, and structural components. PUs represent 31% of the thermoset materials market, and are widely incorporated into mattresses and furniture, thermal and sound insulation, automobiles, footwear, and construction materials. Although many of these applications represent durable goods, inevitable wear and replacement of PU-containing products generates a vast waste stream and necessitates the synthesis of new PUs, largely from toxic isocyanate-containing precursors. Methods to reprocess PUs, especially PU foams, are therefore attractive, but thermosetting foams are by definition chemically cross-linked, which precludes melt reprocessing and severely restricts their practical reuse.

The direct bulk reprocessing of PUs into similar value materials is not well-developed. Current approaches for repurposing and recycling PUs are limited to mechanical methods, including rebonding for carpeting, or chemically recycling via catalyzed glycolysis, which results in the formation of reactive oligomeric polyols. Both of these approaches are forms of downcycling rather than direct recycling of the PU waste into similar valued products. These limitations motivate alternative strategies to reprocess PU foams into similar or even higher value products, which will improve the sustainability and circularity of their manufacture and use.

These sustainability goals might be achieved if processes to controllably reconfigure the cross-links of commercial PU foams are introduced. One promising approach is to formulate these systems as covalent adaptable networks (CANs), whose cross-links undergo exchange in response to a stimulus, such as increased temperature or photoexcitation. An ideal CAN combines the robust mechanical properties associated with traditional thermosets along with the processability of thermoplastics. CANs generally rely on dynamic linkages that are not generally present in established commercial thermosets, which will require new materials to be developed and formulated within a commoditized marketplace that does not yet fully value circularity and sustainability. Recently, Manas-Zloczower and coworkers demonstrated that introducing dynamic cross-links into networks is possible by post-synthetically introducing transesterification catalysts into polyester networks via solution swelling methods. [Yue, L.; Bonab, V. S.; Yuan, D.; Patel, A.; Karimkhani, V.; Manas-Zloczower, I., Vitrimerization: A Novel Concept to Reprocess and Recycle Thermoset Waste via Dynamic Chemistry. *Global Challenges* 2019, 1800076] Most reported CANs rely on catalyzed dynamic exchange and are directly synthesized in the presence of these catalysts. Extending this processability to already synthesized static PUs remains largely unexplored, and will enable repurposing of vast amounts of already-deployed materials into equal or even higher value products.

Incorporation of other dynamic bonds into PUs is one strategy to directly recycle these cross-linked materials. Another strategy is to control the dynamic nature of urethane linkages to enable recycling of these materials on large scale. Tobolsky and coworkers demonstrated that urethane dissociation to isocyanates and alcohols at elevated temperatures causes cross-linked PUs to relax stress, [Offenbach, J. A. et al., *J. Colloid Sci.* 1956, 11, 39-47; Colodny, P. C. et al., *J. Am. Chem. Soc.* 1957, 79 (16), 4320-4323] a phenomenon which has recently been recognized as a feature of other useful dynamic cross-linked polymers. Xie and coworkers showed that incorporation of catalytic dibutyltin dilaurate (DBTDL)[Zheng, N. et al., *Angew. Chem. Int. Ed.* 2016, 55 (38), 11421-11425] or tertiary amines[Zheng, N. et al., *ACS Macro Lett.* 2017, 6 (4), 326-330] into cross-linked PUs causes more rapid stress relaxation via carbamate exchange reactions (FIG. 1A). Further work has demonstrated that tin-mediated urethane exchange is a way to achieve stress relaxation and some degree of reprocessability in cross-linked polyurethanes. [Yan, P. et al., *RSC Adv.* 2017, 7 (43), 26858-26866; Brutman, J. P. et al., *J. Phys. Chem. B* 2019, 123 (6), 1432-1441; Wen, Z. et al. *Macromolecules* 2018, 51 (15), 5812-5819; Wang, Y. et al., *Macromal. Rapid Commun.* 2019, 1900001; Solouki Bonab, V. et al., *Macromol. Mater. Eng.* 2019, 304 (1), 1800405] As a result, there is a need for improved, safer materials and methods for controlling the dynamic nature of linkages prevalent in commodity PUs for direct reprocessing of these materials.

The direct reprocessing of PUs using the dynamics of urethane bonds was demonstrated in polyhydroxyurethanes, which reprocess in the absence of external catalysts likely through hydroxyl-carbamate exchange reactions. [Fortman, D. J. el al., Mechanically activated, catalyst-free polyhydroxyurethane vitrimers. *J. Am. Chem. Soc.* 2015, 137 (44), 14019-14022; Fortman, D. J. et al., Structural effects on the reprocessability and stress relaxation of crosslinked polyhydroxyurethanes. *J. Appl. Polym. Sci.* 2017, 134 (45), 44984] More recently, Lewis acid and tertiary amine activated carbamate exchange reactions have been employed in cross-linked PU networks that exhibit rapid stress relaxation behavior. [Fortman, D. J. et al., Reprocessing Cross-Linked Polyurethanes by Catalyzing Carbamate Exchange. *Macromolecules* 2019, 52 (16), 6330-6335] Although very promising, previous examples of PU CANs involve rigid or elastomeric films, despite the fact that 67% of commercial PU materials are synthesized as foams. Consideration of PU foam gas content and cell morphology, additional commercial additives such as halogenated flame-retardants and surfactants, and various polymer backbone chemical functionalities, such as urea and isocyanurates, adds more processing complexities and potential side reactions that may hinder the breakage and reformation of carbamate cross-links. Due to the prevalence of cross-linked PU foam materials in daily life, coupled with the significant space polyurethane foams take up in landfills, developing bulk reprocessing methods for the recycling of cross-linked PU foam is essential to ensure the sustainable use of these materials.

BRIEF SUMMARY OF THE INVENTION

Disclosed herein are methods for reprocessing polyurethane compositions such as polyurethane foams. The method comprises introducing a polyurethane composition into a compounding device, heating the polyurethane composition to an effective bond-exchange temperature, and compounding the polyurethane composition for an effective bond-exchange time.

The polyurethane composition may comprise a network polymer and a polyurethane exchange catalyst permeated within the network polymer. The network polymer may comprise a dynamic network formed from an isocyanate constitutional unit and a second constitution unit having a hydroxyl group capable of reacting with an isocyanate group of the isocyanate constitutional unit to form a urethane bond. The polyurethane exchange catalyst may comprise a metal selected from Sn, Bi, Fe, Zr, Ti, Hf, Al, Zn, Cu, Ni, Co, Mn, V, Sc, Y, Ce, or Mo and a ligand coordinated with the metal atom. Suitably a mol % of the polyurethane exchange catalyst to total isocyanate functionality is less or equal to 5 mol %.

In some embodiments, the method may further comprise one or more of the following: providing the polyurethane composition by impregnating the network polymer with the catalyst; further comprising providing the polyurethane composition by mixing the network polymer with the catalyst; mechanically processing the polyurethane composition prior to heating; or mechanically processing the network polymer prior to impregnation.

In some embodiments, the compounding device is a continuous-service compounding device. Suitably, continuous-service compounding devices include extruders, such as single- and twin-screw extruders.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention.

FIG. 3B shows stress relaxation analysis of polyether PUs containing 1 mol % $Bi(neo)_3$ (bottom), DBTDL (middle), and $Fe(acac)_3$ (upper) performed at 140° C.

FIG. 3C shows Arrhenius plots of characteristic relaxation time of polyether PUs containing 1 mol % $Bi(neo)_3$ (bottom), DBTDL (middle), and $Fe(acac)_3$ (top). The line for samples containing $Fe(acac)_3$ is dashed since decomposition occurs during the relaxation process.

FIG. 4B shows stress relaxation analysis of polyether PUs containing $Bi(neo)_3$ (second from top), DBTDL (third from top), $Fe(acac)_3$ (bottom), or no catalyst (top) performed at 160° C.

FIG. 4C shows Arrhenius plots of characteristic relaxation time of polyester PUs containing 1 mol % $Bi(neo)_3$ (top), DBTDL (middle), and $Fe(acac)_3$ (bottom).

FIG. 4F shows representative stress relaxation curves of MDI polyester PU with 1 mol % $Fe(acac)_3$ performed from 130 to 160° C.

FIG. 22 shows an attempted microcompounding of commercial PU foam without introducing catalyst using solution swelling.

FIGS. 23A-23C show optical microscopic images of commercial PU flexible foam (FIG. 23A), compression molded commercial PU foam (FIG. 23B), and microcompounded commercial PU foam (FIG. 23C). Reprocessed materials were swollen in catalyst solution prior to processing.

DETAILED DESCRIPTION OF THE INVENTION

The reprocessing or recycling of cross-linked polymers by incorporating dynamic covalent cross-links has the potential to increase the sustainability associated with using these materials. Polyurethanes (PUs) are the largest class of polymers commonly used in cross-linked form; however, their direct recycling into similar value materials is not well-developed. We demonstrate that a variety of Lewis acid catalysts can mediate the exchange of urethane bonds selectively and at relatively mild conditions. Incorporating these catalysts into cross-linked polyether and polyester PUs with structures similar to commercial PUs gives cross-linked materials that relax stress very rapidly compared to most vitrimer networks at elevated temperatures. Due to their dynamic nature, these polymers can be reprocessed, for example, via compounding to give materials with similar cross-linking densities and mechanical properties, despite their covalently cross-linked architecture.

Here we reprocess cross-linked PU foams by post-synthetically introducing a exchange catalyst followed by melt reprocessing at elevated temperatures. This process is first demonstrated for a non-commercial rigid polyester PU foam without additives, and then for a flexible, open-cell commercial PU foam used in furniture. While catalyst-loaded model foams showed efficient dynamics during stress relaxation experiments, poor efficiency was observed in reprocessing by compression molding alone. Without wishing to be bound by theory, it is believes that this may be the result of poor mixing and the presence of trapped air in reprocessed materials. Compounding with a twin-screw extrusion methodology enables continuous reprocessing of PU foams into films with mechanical properties similar to other films made from the same monomers. These findings enable the recycling of post-consumer PUs to similar-value materials and will empower the use of cross-linked PU systems in emerging additive manufacturing techniques.

As demonstrated in the Examples, introducing an exchange catalyst such as dibutyltin dilaurate (DBTDL) into cross-linked PU foams and films enables their reprocessing at elevated temperatures via dynamic carbamate exchange reactions. Both model and commercial cross-linked PU foams were continuously reprocessed using twin-screw extrusion to remove gaseous filler and produce PU filaments or films with elastomeric or rigid thermoset mechanical properties. Compounded model PU foam properties are in excellent agreement with those of PU film synthesized using the same monomers, indicating that this process occurs with limited side reactions. These findings enable the bulk reprocessing of commercial thermoset PU waste.

Figure 1A:
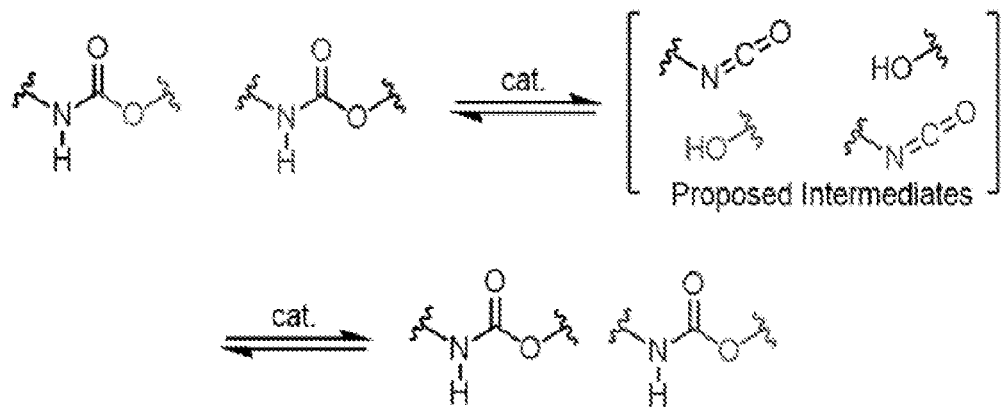
FIG. 1A provides a schematic of the carbamate exchange process.

As illustrated in FIG. 1A, introduction of an exchange catalyst into a PU allows for the control of the dynamic nature of urethane linkages to enable recycling of these materials. Introduction of the exchange catalyst allows for urethane dissociation into isocyanate and alcohol intermediates. The dynamic exchange of these bonds can be monitored by stress relaxation.

Figure 1B:
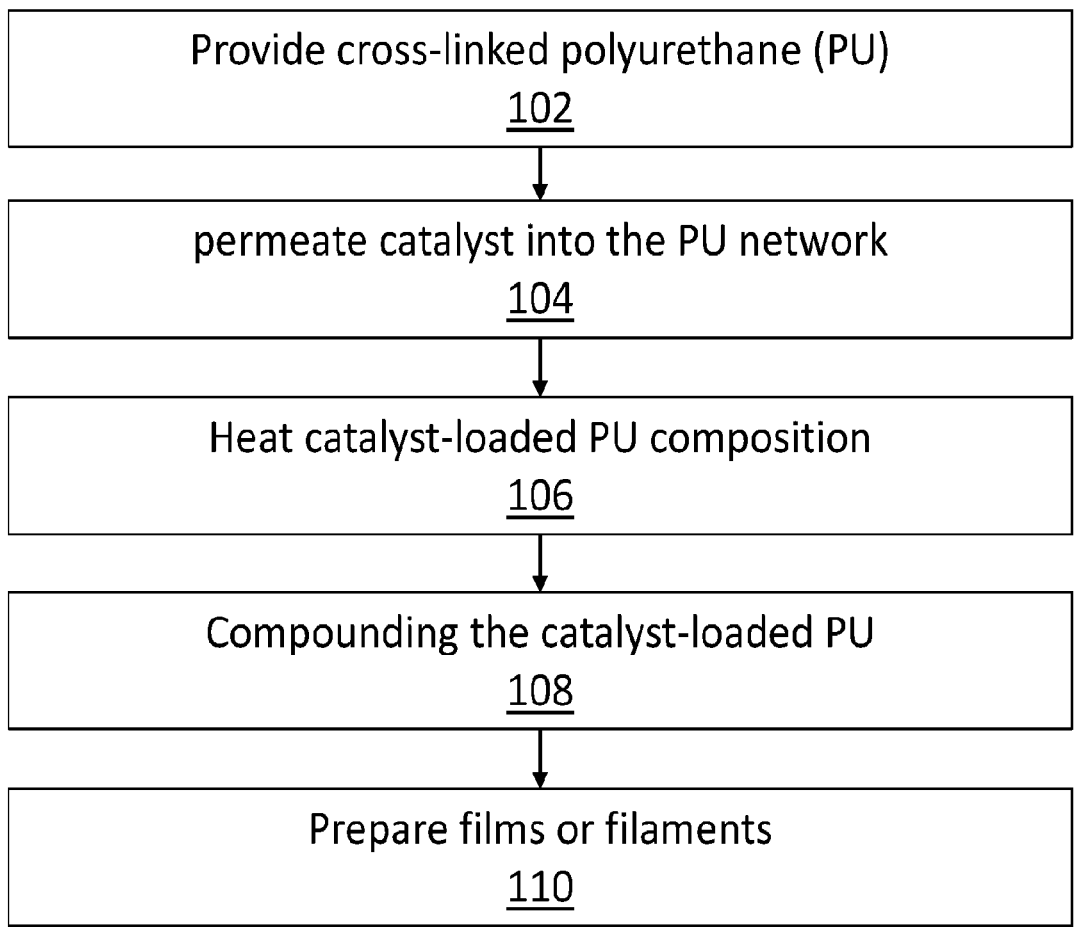
FIG. 1B illustrates a method of introduction of catalyst into static PU post-synthetically and processing the PU into filaments or films.
Figure 1C:
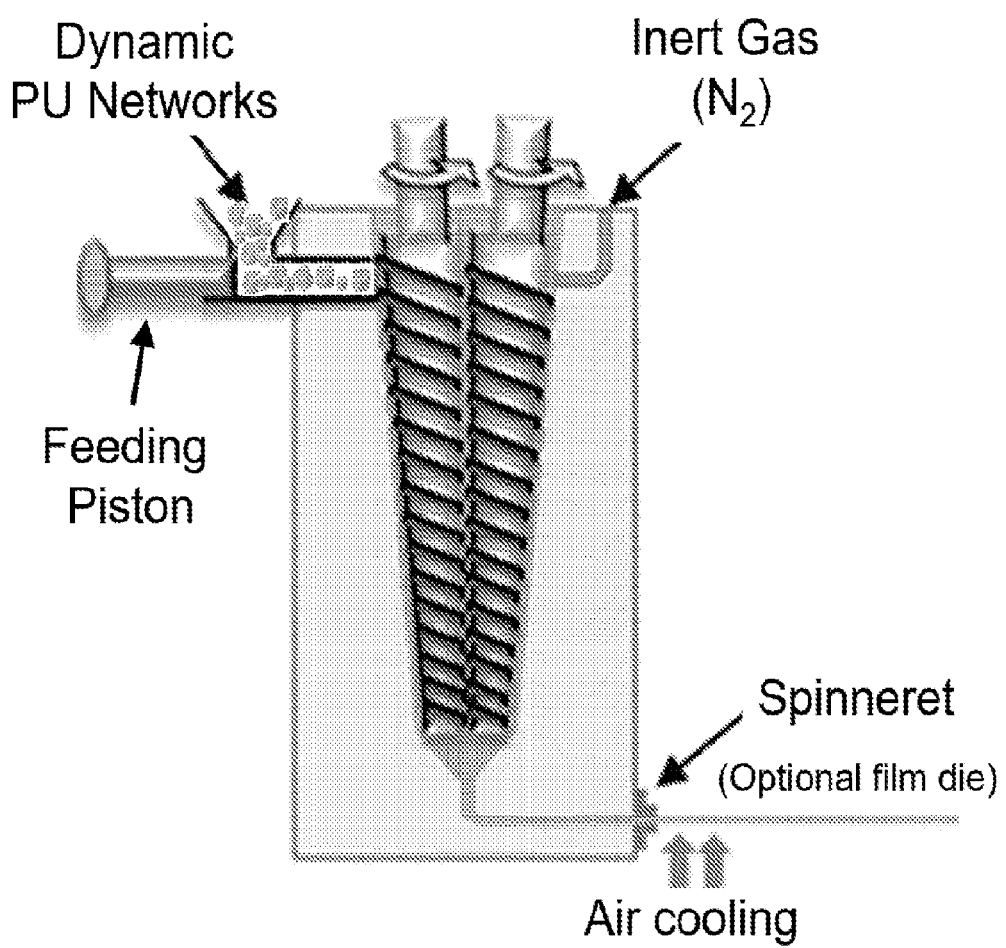
FIG. 1C schematically illustrates the microcompounding of a catalyst-loaded PU foam.

Referring to FIG. 1B, a diagrammatic representation of the method for reprocessing a polyurethane composition is provided. The method may comprise providing a cross-linked polyurethane 102 and preparing a polyurethane composition comprising a network polymer and a polyurethane exchange catalyst by permeating the catalyst into the PU network 104. The catalyst may be permeated into the PU network by any suitable method including impregnating the PU network by swelling or direct mechanical mixing. Suitably the PU network may be swelled by contacting the PU network with a catalyst containing solution. The catalyst-loaded PU composition may be heated to an effective bond-exchange temperature to prepare a dynamic network 106. Suitably, the dynamic network is formed from isocyanate constitutional unit and a second constitution unit having a hydroxyl group capable of reacting with an isocyanate group of the isocyanate constitutional unit to form a urethane bond. The PU composition may be compounded in a compounding device 108, allowing for the preparation of films or filaments from the reprocessed PU 110. In some embodiments, the PU composition is heated to the effective bond-exchange temperature prior to introduction to the compounding device. In other embodiments, the PU composition is heated to the effective bond-exchange temperature within the compounding device. In some embodiments, the compounding device is a twin-screw extruder as illustrated in FIG. 1C.

Although the exchange catalyst may be incorporated into the polymer network post-synthetically, the network polymer may be formed in the presence of the of the exchange catalyst. This may result in the network polymer having an exchange catalyst preimpregnated within the network, allowing for its direct reprocessing without the need to introduce exchange catalyst post-synthetically. In some embodiments, the network polymer may be mechanically processed prior to heating and/or impregnation.

Foam samples were synthesized from similar compositions by incorporating a physical or chemical blowing agent into the polyurethane compositions. FT-IR spectroscopy shows complete disappearance of the isocyanate stretch (2350 $cm^{-1}$), and appearance of a urethane C=O stretch in all cases, consistent with the desired PU foam structure. Samples were impregnated with catalyst by swelling samples in a concentrated catalyst solution, and subsequently removing the solvent by heating under vacuum. Stress relaxation analysis of a sample impregnated with catalyst shows a relaxation rate which is faster by multiple orders of magnitude than the control without catalyst, demonstrating the necessity of catalyst incorporation to achieve rapid bond exchange times in the urethane foam compositions. Reprocessed films of these samples show similarly fast relaxation, suggesting that the materials formed by this methodology still act as active reprocessable PU compositions, due to the activity of the embedded Lewis acid catalyst. Stress relaxation analysis was performed in catalyst-impregnated physically-blown and chemically-blown samples at a variety of temperatures and showed reproducible stress relaxation in all cases with an Arrhenius dependence of relaxation rate on temperature. These fast relaxation rates can still be achieved in compression molded PU foams with broad ranges of microscopic composition, revealed by the broad glass transition temperatures revealed by DMTA analysis, showing this method will enhance the dynamics of a variety of commercially relevant PU foam compositions.

To optimize the reprocessing of these foams and move towards higher throughput reprocessing techniques, compression molding and micro-compounding were compared as techniques for the direct reprocessing of these PU-catalyst compositions. Physically-blown PU foams were post-synthetically impregnated with catalyst and subjected to reprocessing conditions via static compression molding or microcompounding in a conical twin-screw batch mixer. Comparison of optical microscopy images of a synthesized PU film, and the materials obtained from compression molding and microcompounding shows a more homogeneous film in the film obtained by microcompounding, indicating that microcompounding is the preferred method for obtaining homogeneous materials after reprocessing. SEM imaging of the compression molded and microcompounded films, show that large scale inhomogeneities remain in the compression molded article but that a homogeneous microstructure develops in the microcompounded film, again showing that the mechanical agitation provided by microcompounding is preferred for obtaining useful, homogeneous materials. This is further supported by the narrower glass transition temperature observed in the DMTA of the microcompounded film compared to the compression molded film. The microcompounded film displays more rapid relaxation in this case, indicating that the homogeneous microstructure provides an additional benefit, in producing compositions with more rapid relaxation of benefit for further reprocessing cycles of the same material.

Definitions

Several definitions are provided to assist with the understanding of the technology.

"Block" means a portion of a macromolecule, comprising many constitutional units, that has at least one constitutional or configurational feature which is not present in the adjacent portions.

"Branch" means an oligomeric or polymeric offshoot from a macromolecular chain.

"Branch point" means a point on a chain at which a branch is attached.

"Branch unit" means a constitutional unit containing a branch point.

"Catalyst" means a substance that increases the rate of a reaction without modifying the overall Gibbs energy change in the reaction. Suitably the catalyst may be a coordination entity comprising a central atom and one or more ligands joined to the central atom. Suitably the central atom is a metal. "Ligand" means an atom or group joined to a central atom.

"Chain" means a whole or part of a macromolecule, an oligomer molecule, or a block, comprising a linear or branched sequence of constitutional units between two boundary constitutional units, each of which may be either an end-group, a branch point, or an otherwise-designated characteristic feature of the macromolecule.

"Compounding" means to blend or mix a substance, such as any of the polyurethane compositions described herein, within a compounding device. Suitably the substance is compounded at an effective bond-exchange temperature for an effective bond-exchange time.

"Compounding device" means a device for blending or mixing a substance, such as any of the polyurethane compositions described herein. In some embodiments, the compounding device is an extruder, such as a single screw or twin-screw extruder, a mixer, or a kneader. Suitably twin-screw extruders may be a co-rotating or counter-rotating twin-screw extruder. The compounding device may operate in batch or continuous service. Suitably a continuous service compound device may have an inlet, such as a feeding hopper or other suitable feeding mechanism, for introducing the substance into the compounding device, an outlet for extruding the compounded substance, and a compounding zone between the inlet and the outlet for mixing or blending the substance. Suitably the compounding zone is configured so that the substance may be compounded for an effective bond-exchange time. The compounding device may also comprise a heating element so that the substance may be compounded at an effective bond-exchange temperature.

"Constitutional unit" means an atom or group of atoms (with pendant atoms or groups, if any) comprising a part of the essential structure of a macromolecule, an oligomer molecule, a block, or a chain.

"Covalent network" or "covalent polymer network" means a network in which the permanent paths through the structure are all formed by covalent bonds.

"Dynamic network" or "dynamic polymer network" means a covalent network that is capable of undergoing bond-exchange reactions at a temperate above an effective bond-exchange temperature. A dynamic network may demonstrate viscoelastic liquid properties above the freezing transition temperature.

"Effective amount of a polyurethane exchange catalyst" means an amount of polyurethane exchange catalyst necessary for the urethane-bond exchange reactions to occur within an effective bond-exchange time at an effective bond-exchange temperature. In some embodiments, the effective amount of polyurethane exchange catalyst allows for an effective-bond exchange time less than or equal to 12 minutes at an effective bond-exchange temperature less than or equal to 160° C. In some embodiments, the mol % of the polyurethane exchange catalyst to the total isocyanate functionality may be less than or equal to 5 mol %. Suitably, the mol % may be less than or equal 4 mol %, 3 mol %, 2 mol %, 1 mol %, or less than 1 mol %. Some materials may contain small amounts of residual catalyst from their manufacture, often 0.1 mol % or less. Such limited quantities of catalyst are typically not enough to enable dynamic bond exchange on a practical time scale. As a result, the effective amount of polyurethane exchange catalyst may be increased post-synthetically by the methods described herein such as swelling or direct mechanical mixing.

"Effective bond-exchange temperature" means a temperature above the freezing transition temperature. The "freezing transition temperature" is the temperature where a material transitions from a viscoelastic solid to a viscoelastic liquid. The effective bond-exchange temperature is lower than the temperature where the dynamic network undergoes irreversible thermal instability or degradation. In some embodiments, the effective bond-exchange temperature is greater than the freezing transition temperature and less than or equal to 275° C. Suitably the effective bond-exchange temperature may be less than or equal to 250° C., 225° C., 200° C., 190° C., 180° C., 170° C., 160° C., 150° C., 140° C., 130° C., 120° C., 110° C., 100° C., or less than 100° C.

"Effective bond-exchange time" means a time sufficient for urethane-bond exchange reactions to occur. The effective bond-exchange time may be determined by monitoring the stress decay of a polyurethane composition. Suitably, a minimum effective bond-exchange time may be determined as the time necessary for the stress relaxation modulus to relax to at least 37% (1/e) of its initial value at an effective bond-exchange temperature. In some embodiments, the effective bond-exchange time is less than or equal to 60 minutes. The effective bond-exchange time may be less than or equal to 50 minutes, 45 minutes, 40 minutes, 35 minutes, 30 minutes, 25 minutes, 20 minutes, 15 minutes, 12 minutes, 10 minutes, or less than 10 minutes. In some embodiments, the effective-bond exchange time is less than or equal to 12 minutes at an effective bond-exchange temperature of less than or equal to 160° C.

"Foam" means a multiphasic material comprising gas dispersed in a polymer. The foam may be formed by trapping pockets of gas in a solid or liquid. Foams may be prepared by physical or chemically blowing. In some embodiments, the foam may be a closed-cell foam where the gas forms discrete, completely surrounded pockets. In other embodiments, the foam may be an open-cell foam where the gas pockets are interconnected. Suitably the polymer is a polyurethane ("polyurethane foam").

"Inorganic polymer" means a polymer or polymer network with a skeletal structure that does not include carbon atoms. Examples include, without limitation, polyphosphazenes, polysilicates, polysiloxanes, polysilanes, polysilazanes, polygermanes, and polysulfides.

"Isocyanate constitutional unit" means a constitutional unit comprising at least one isocyanate group, i.e., —NCO. Suitably the isocyanate constitutional unit may comprise more than one isocyanate group such as two, three, four, or more than four isocyanate groups. The isocyanate constitutional unit may be a prepolymer molecule or a branch unit. Suitably the second constitutional unit may function as both a prepolymer molecule and a branch unit. In some embodiments, the isocyanate constitutional unit is an aromatic isocyanate constitutional unit. As used herein, an "aromatic isocyanate constitutional unit" means an isocyanate constitutional unit having an isocyanate group pendant from an aryl group such a phenyl or other aromatic ring. In other embodiments, the isocyanate constitutional unit is an aliphatic isocyanate constitutional unit. As used herein, an "aliphatic isocyanate constitutional unit" means an isocyanate constitutional unit having an isocyanate group pendant from an aliphatic group such an acyclic or cyclic alkyl, an acyclic or cyclic alkenyl, or an acyclic or cyclic alkynyl group.

"Lewis acid" means a molecular entity (and the corresponding chemical species) that is an electron-pair acceptor and therefore able to react with a Lewis base to form a Lewis adduct, by sharing the electron pair furnished by the Lewis base.

"Linear chain" means a chain with no branch points between the boundary units.

"Macromolecule" or "polymer molecule" means a molecule of high relative molecular mass, the structure of which essentially comprises the multiple repetition of units derived, actually or conceptually, from molecules of low relative molecular mass.

"Mechanically processed" means to mechanically alter a substance, e.g., by mechanically mixing, grinding, cutting, chopping, or applying some other form of mechanical force. Suitably, the substance such as the polyurethane compositions described herein may be mechanically processed to fragment the substance into pieces or grains.

"Monomer" means a substance composed of monomer molecules.

"Monomer molecule" means a molecule which can undergo polymerization, thereby contributing constitutional units to the essential structure of a macromolecule.

"Monomeric unit" means the largest constitutional unit contributed by a single monomer molecule to the structure of a macromolecule or oligomer molecule.

"Network" means a highly ramified macromolecule in which essentially each constitutional unit is connected to each other constitutional unit and to the macroscopic phase boundary by many permanent paths through the macromolecule, the number of such paths increasing with the average number of intervening bonds; the paths must on the average be co-extensive with the macromolecule.

"Network polymer" means a polymer composed of one or more networks.

"Oligomer molecule" means a molecule of intermediate relative molecular mass, the structure of which essentially comprises a small plurality of units derived, actually or conceptually, from molecules of lower relative molecular mass.

"Organic polymer" means a polymer or polymer network with a skeletal structure that includes carbon atoms. Examples include, without limitation, polyethers, polyesters, polycarbonates, polyacrylates, polyolefins, and polybutadienes.

"Polymer" means a substance composed of macromolecules.

"Polymerization" means a process of converting a monomer or a mixture of monomers into a polymer.

"Prepolymer molecule" means a macromolecule or oligomer molecule capable of entering, through reactive groups, into further polymerization, thereby contributing more than one constitutional unit to at least one type of chain of the final macromolecules.

"Polyurethane composition" means a dynamic network formed from urethane bonds that are capable of undergoing urethane bond-exchange reactions. The polyurethane compositions comprise a network urethane-containing polymer and a polyurethane exchange catalyst permeated within the network polymer. The network polymer may be formed from isocyanate constitutional units and a second constitutional unit having two or more hydroxyl groups capable of reacting with the isocyanate group of the isocyanate constitutional unit. The second constitutional unit may be a prepolymer molecule or a branch unit. Suitably the second constitutional unit may function as both a prepolymer molecule and a branch unit. The prepolymer molecule is an organic polymer molecule or an inorganic polymer molecule such as a polyether, a polyester, a polycarbonate, a polyacrylate, a polyolefin, a polybutadiene, a polysulfide, or a polysiloxane having one or more hydroxyl groups capable of reacting with an isocyanate group. When the prepolymer molecule also functions as a branch unit, the prepolymer molecule has a three or more hydroxyl groups capable of reacting with isocyanate groups and typically a plurality of hydroxyl groups in proportion to the number of constitutional units of the prepolymer molecule. The network polymer may also be formed from urethane-containing monomers featuring other polymerizable groups, including but not limited to, acrylates, methacrylates, or other polymerizable olefins.

"Polyurethane exchange catalyst" means a catalyst that increases the rate of a polyurethane bond-exchange reaction.

In some embodiments, the polyurethane bond-exchange reaction is a carbamate-exchange reaction. Suitable metal for the catalyst include Sn, Bi, Fe, Zr, Ti, Hf, Al, Zn, Cu, Ni, Co, Mn, V, Sc, Y, Ce, or Mo. Suitable ligands for the catalyst include carboxylate, alkoxide, 1,3-diketone, 1,2-diketone, trifluoromethanesulfonate, trifluoromethanesulfonamide, amido, sulfonate, halide, catecholate, phosphine, salicylidene diamine, carbonate, phosphate, nitrate, cyclopentadiene, pyridine, hydroxide, or any combination thereof. Exemplary ligands include acetylacetonate (acac), isopropoxide (OiPr), neodecanoate (neo), laurate, ethylhexanoate, and 2,2,6,6-Tetramethyl-3,5-heptanedione (tmhd).

"Subchain" means an arbitrarily chosen contiguous sequence of constitutional units, in a chain.

"Thermosetting polymer" or "thermoset" is a polymer that is irreversibly hardened by curing from a soft solid of viscous liquid prepolymer or resin.

"Vitrimer" means a network polymer that can change its topology by thermally activated bond-exchange reactions. At elevated temperatures, the bond-exchange reactions occur at an effectively rapid rate and the network polymer has properties of a viscoelastic liquid. At low temperatures, the bond-exchange reactions are slow and the network polymer behaves like a thermosetting polymer.

Miscellaneous

Unless otherwise specified or indicated by context, the terms "a", "an", and "the" mean "one or more." For example, "a molecule" should be interpreted to mean "one or more molecules."

As used herein, "about", "approximately," "substantially," and "significantly" will be understood by persons of ordinary skill in the art and will vary to some extent on the context in which they are used. If there are uses of the term which are not clear to persons of ordinary skill in the art given the context in which it is used, "about" and "approximately" will mean plus or minus≤10% of the particular term and "substantially" and "significantly" will mean plus or minus >10% of the particular term.

As used herein, the terms "include" and "including" have the same meaning as the terms "comprise" and "comprising." The terms "comprise" and "comprising" should be interpreted as being "open" transitional terms that permit the inclusion of additional components further to those components recited in the claims. The terms "consist" and "consisting of" should be interpreted as being "closed" transitional terms that do not permit the inclusion additional components other than the components recited in the claims. The term "consisting essentially of" should be interpreted to be partially closed and allowing the inclusion only of additional components that do not fundamentally alter the nature of the claimed subject matter.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

All references, including publications, patent applications, and patents, cited herein are hereby incorporated by reference to the same extent as if each reference were individually and specifically indicated to be incorporated by reference and were set forth in its entirety herein.

Preferred aspects of this invention are described herein, including the best mode known to the inventors for carrying out the invention. Variations of those preferred aspects may become apparent to those of ordinary skill in the art upon reading the foregoing description. The inventors expect a person having ordinary skill in the art to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

EXAMPLES

Example 1: Reprocessing Cross-Linked Polyurethanes

Figure 2A:
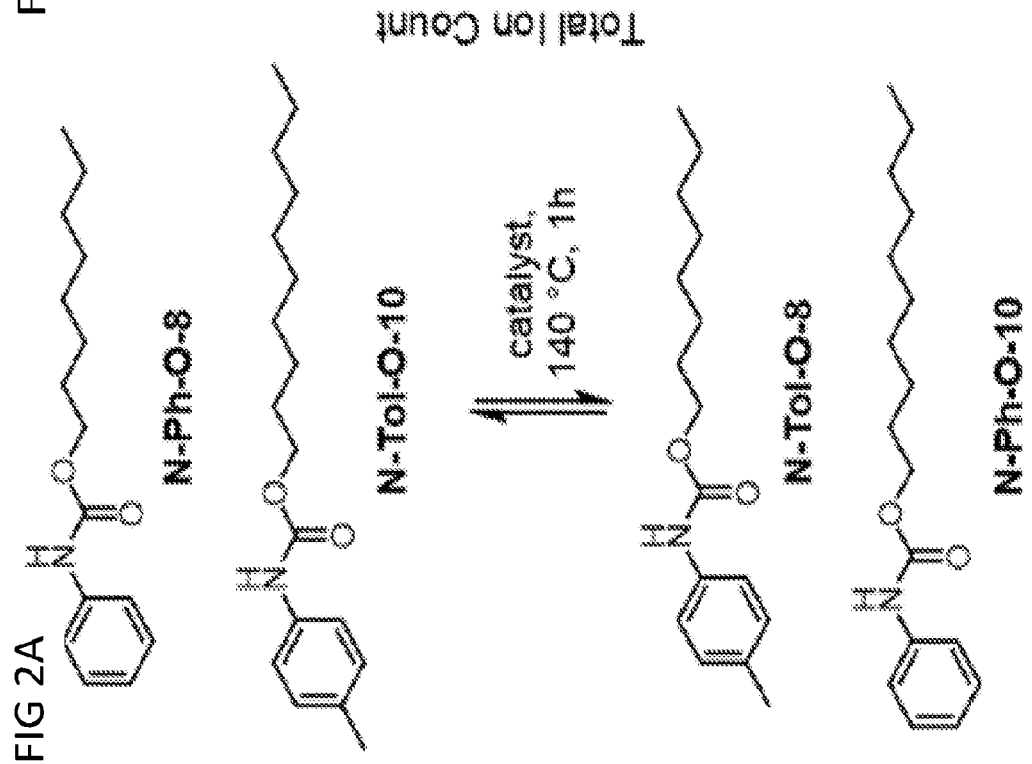
FIG. 2A illustrates urethane exchange of N-phenyl-O-octyl urethane and N-toly-O-decyl urethane to generate N-tolyl-O-octyl urethane and N-phenyl-O-decyl urethane.
Figure 2B:
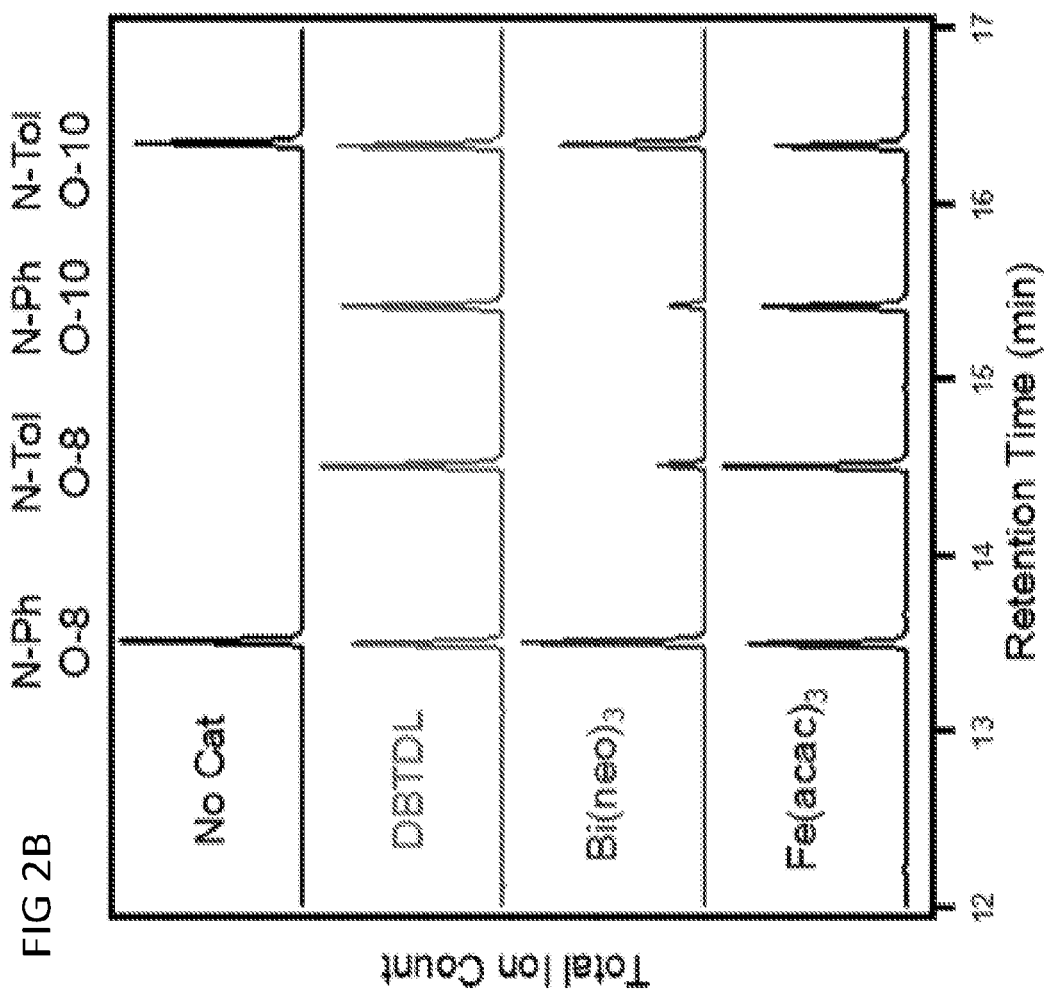
FIG. 2B provides gas chromatograms of the reaction mixture N-phenyl-O-octyl urethane and N-toly-O-decyl taken after heating for 1 hour in the presence or absence of 2.5 mol % catalyst at 140° C. The appearance of N-tolyl-O-octyl urethane (RT=14.52 min) and N-phenyl-O-decyl urethane (RT=15.43 min) are the result of urethane-urethane exchange.
Figure 2C:
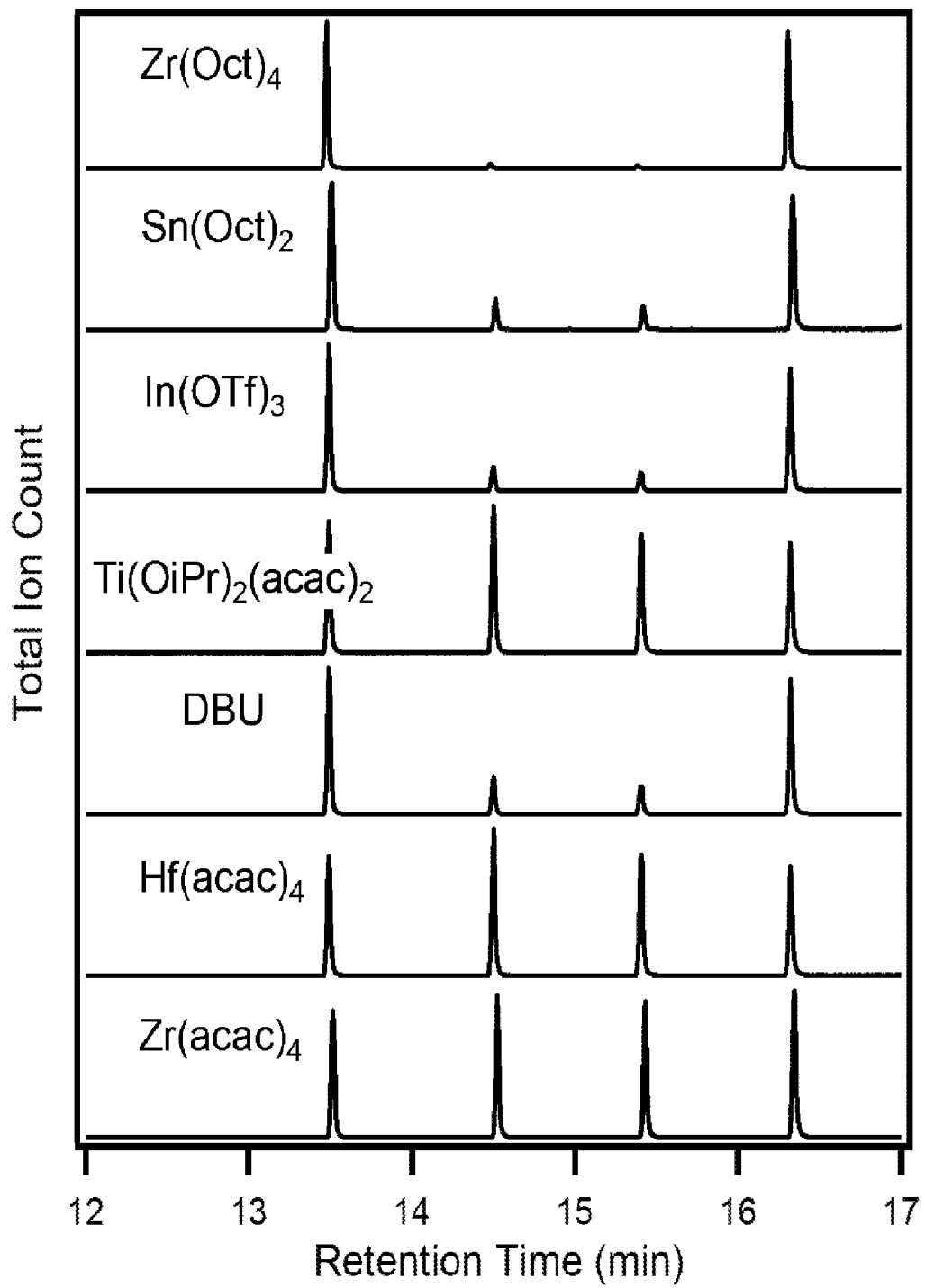
FIG. 2C shows normalized gas chromatograms of mixture of N-phenyl-O-octyl urethane (RT=13.51 min) and N-tolyl-O-decyl (RT=16.34 min) urethane heated to 140° C. for 1 h in the presence of 2.5 mol % catalyst. The appearance of N-tolyl-O-octyl urethane (RT=14.52 min) and N-phenyl-O-decyl urethane (RT=15.43 min) are the result of urethane-urethane exchange.
Figure 2D:
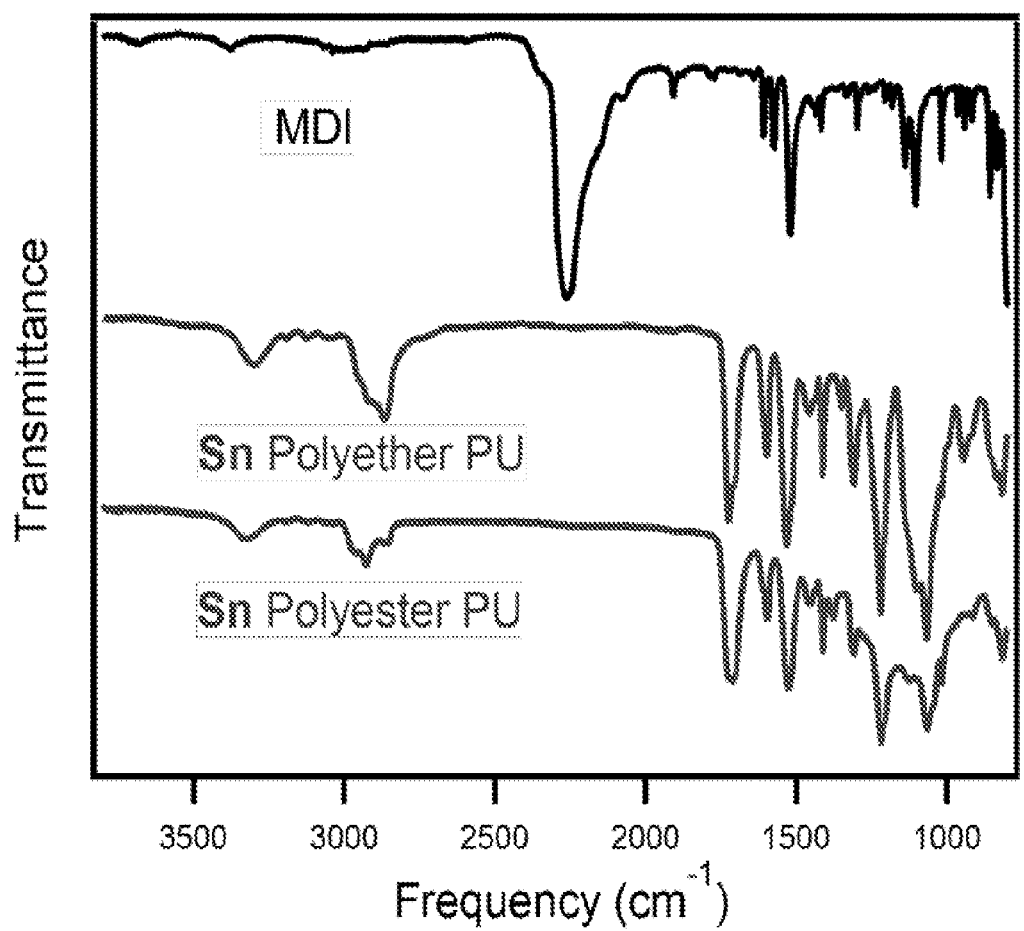
FIG. 2D shows FT-IR spectra of 4,4'-methylenebis(phenylisocyanate) (top), and polyether (middle) and polyester polyurethanes (bottom) synthesized with 1 mol % DBTDL, showing complete disappearance of —NCO stretch at 2285 $cm^{-1}$.

Stress relaxation of cross-linked PUs has been shown to occur on slow, multiple-hour timescales in the absence of catalyst or very rapidly (seconds to minutes) in the presence of DBTDL [Zheng 2016; Yan 2017] Therefore, additional catalytic species were sought to enable this behavior. To evaluate catalyst performance, N-phenyl-O-octyl urethane and N-tolyl-O-decyl urethane were combined with 2.5 mol % of catalyst relative to urethane and heated at 140° C. for 1 hour. The mixture was then analyzed via GC-MS to determine whether the exchange products, N-phenyl-O-decyl urethane and N-tolyl-O-octyl urethane, were formed (FIGS. 2A-2B). In the absence of catalyst, only the two starting materials are observed, consistent with slow stress relaxation observed in cross-linked PUs containing no additional catalyst. Use of DBTDL as a catalyst yielded a mixture of the four urethanes, an equilibrium mixture. A variety of Lewis acid catalysts and organocatalysts were screened, and many catalysts showed comparable activity to DBTDL in catalyzing this reaction. Zirconium(IV) acetylacetonate, iron(III) acetylacetonate, titanium(IV) diisopropoxide bis(acetyacetonate), and hafnium(IV) acetylacetonate showed apparent equilibration within 1 hour (FIGS. 2B-2C). Stannous ethylhexanoate, indium (III) triflate, and zirconium(IV) ethylhexanoate showed much lower or no conversion (FIG. 2C), suggesting that both the identity of the metal and its ligands play an important role in the catalyst's efficiency. There exists a positive correlation between a given catalyst's urethane exchange activity and its reported activity for catalyzing the reaction of isocyanates with alcohols, [Schellekens, Y. et al., *Green Chem* 2014, 16 (9), 4401-4407] which may support the reversion based mechanism of exchange.

Various catalysts incorporated into PU networks were evaluated. Examples include DBTDL, bismuth neodecanoate [Bi(neo)$_3$] and iron(III) acetylacetonate [Fe(acac)$_3$]. These catalysts were incorporated into both polyether- and polyester-based PUs, as these functional groups are common in commercial cross-linked PU materials.

Figure 3A:
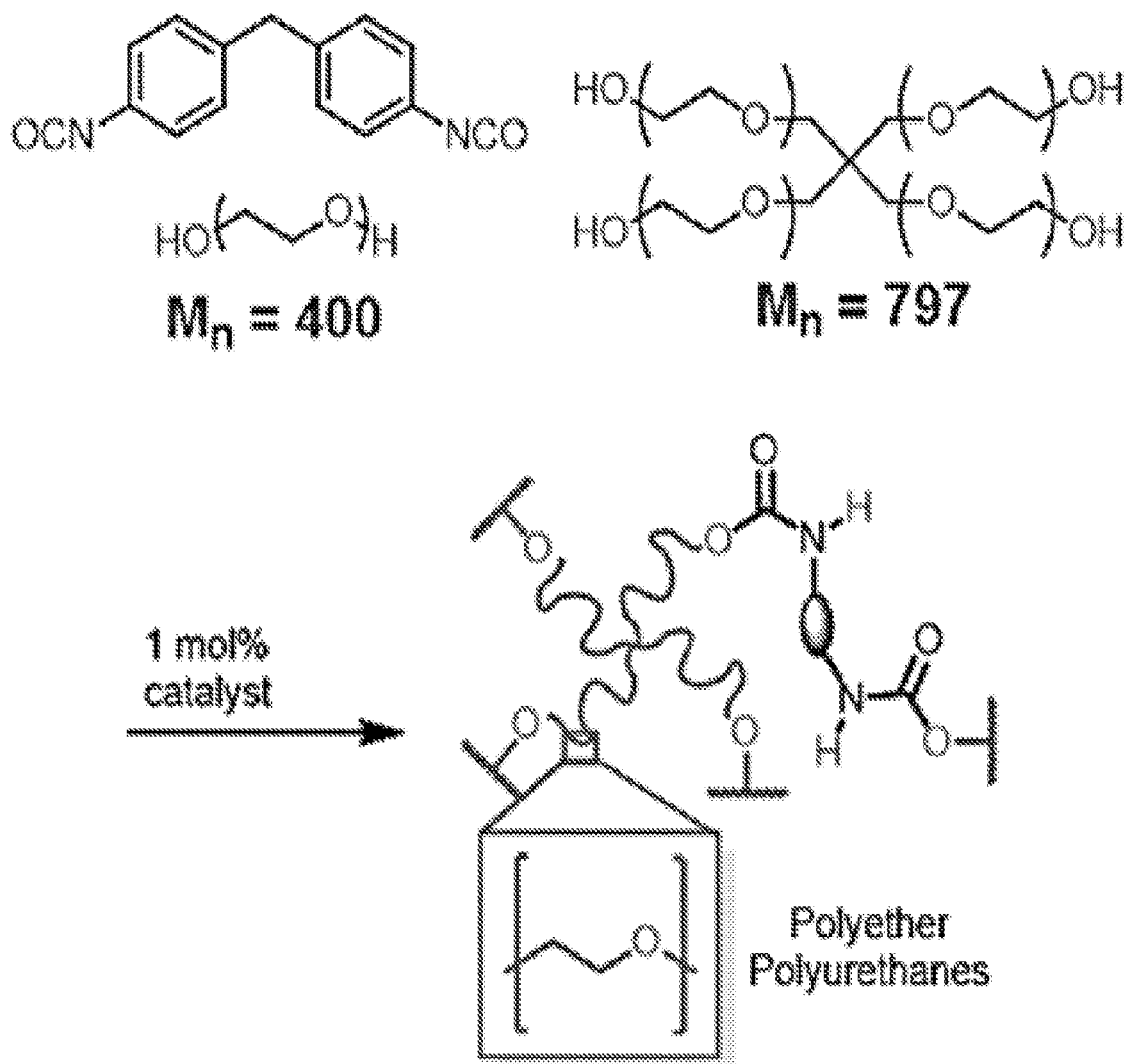
FIG. 3A illustrates the synthesis of polyether PUs.
Figure 3D:
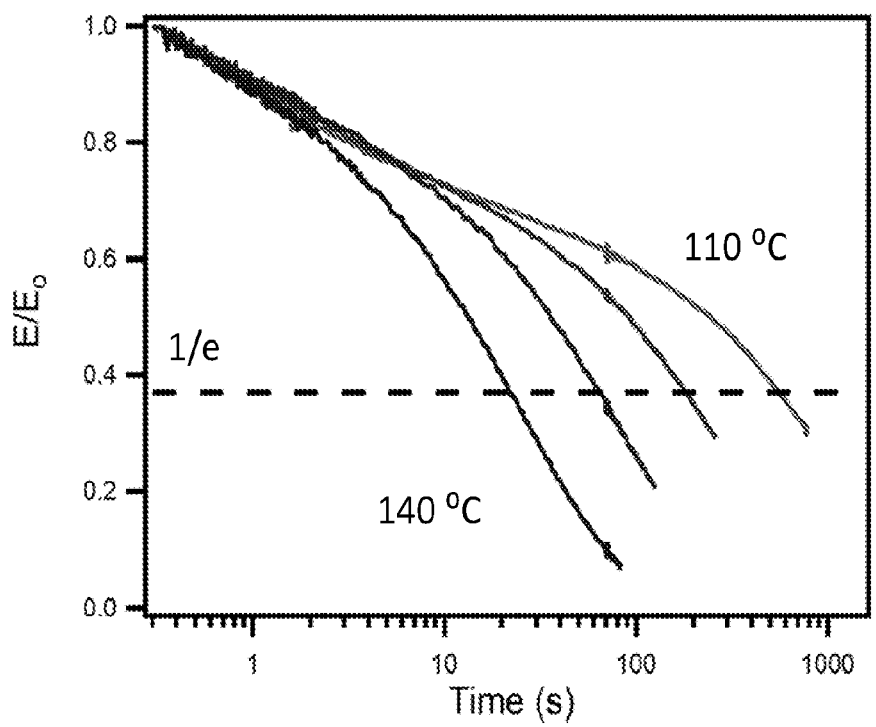
FIG. 3D shows representative stress relaxation curves of polyether PU with 1 mol % DBTDL performed from 110 to 140° C.
Figure 3E:
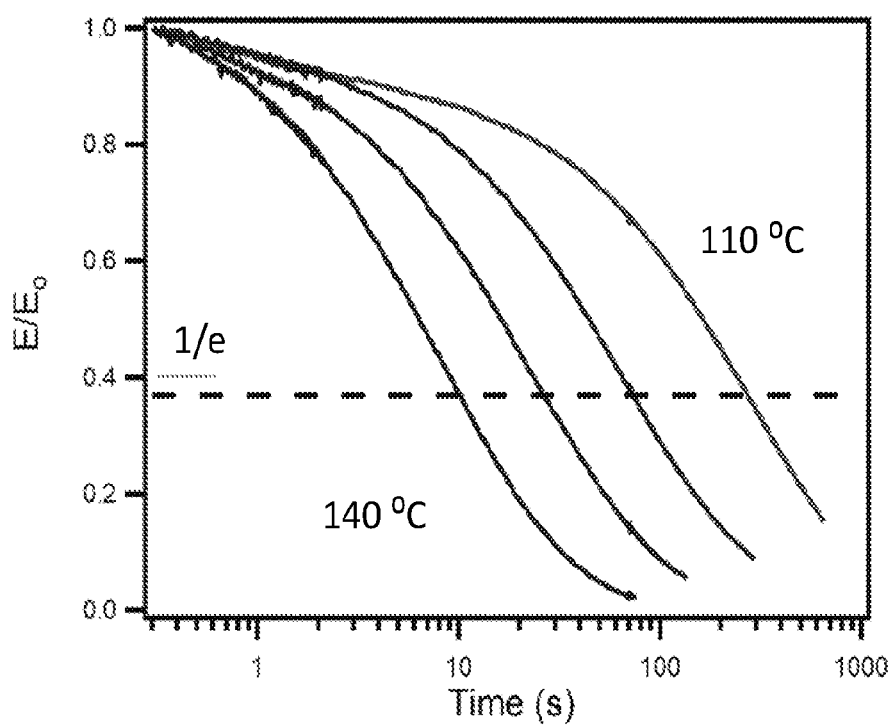
FIG. 3E shows representative stress relaxation curves of polyether PU with 1 mol % $Bi(neo)_3$ performed from 110 to 140° C.
Figure 3F:
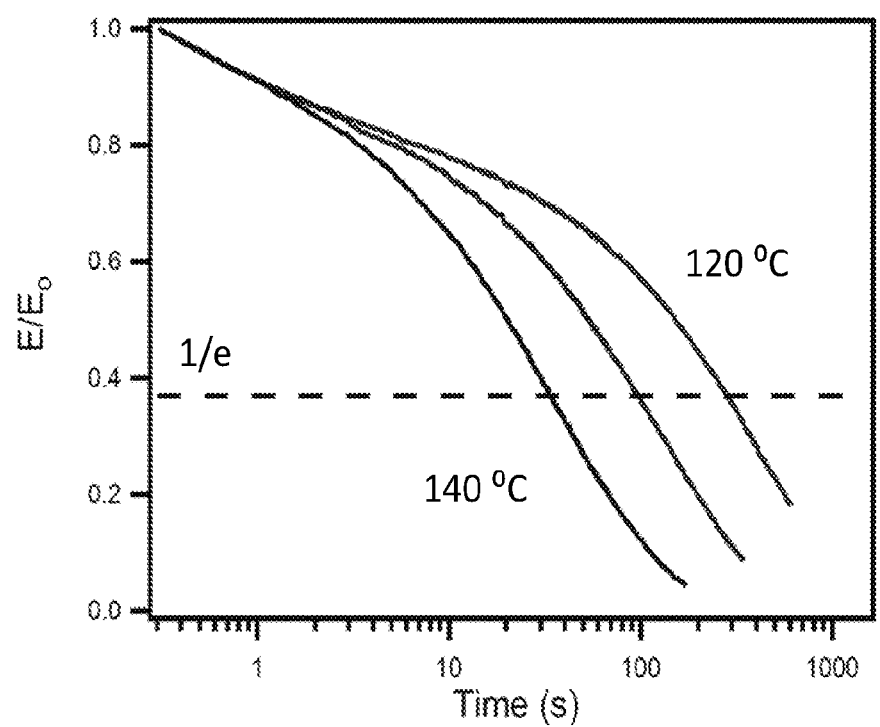
FIG. 3F shows representative stress relaxation curves of polyether PU with 1 mol % $Fe(acac)_3$ performed from 120 to 140° C.

Cross-linked polyether PU elastomers were synthesized by reacting 4,4'-methylenebis(phenyl isocyanate) (MDI) with a linear polyethylene glycol (PEG, $M_n \approx 400$ g/mol) and a 4-arm hydroxyl-terminated PEG ($M_n \approx 797$ g/mol) in the presence of 1 mol % catalyst (FIG. 3A). FT-IR spectroscopy of the cured polymers indicates complete disappearance of the —NCO stretching band (2285 cm$^{-1}$), and the appearance of both the urethane C=O stretching frequency (1690-1715 cm$^{-1}$, depending on the hydrogen bonding environment of the urethane) and N—H deformation (1530 cm$^{-1}$) (FIG.

2D). These polymers display low glass transition temperatures of ca. 10° C. as measured by differential scanning calorimetry (DSC) and thermal stability similar to most cross-linked PUs, with decomposition onset temperatures greater than 280° C. Dynamic mechanical thermal analysis (DMTA) shows a plateau storage modulus greater than the loss modulus above the glass transition temperature, indicative of the cross-linked architecture. A summary of the characterization of the polyether PUs is provided in TABLE 1.

TABLE 1

Characterization of Polyether Polyurethanes

| Polymer | Gel % | $T_d$ (° C., 5%) | $T_{g,\,DSC}$ (° C.) | $T_{g,\,DMTA}$ (° C.) | E' at 110° C. (MPa) | $E_a$ (kJ/mol) | $T_v$ (° C.) |
|---|---|---|---|---|---|---|---|
| DBTDL | 0.75 | 284 | 9 | 5 | 0.95 | 143 ± 2 | 49 |
| Bi(neo)$_3$ | 0.86 | 293 | 10 | 7 | 1.00 | 146 ± 6 | 46 |
| Fe(acac)$_3$ | 0.79 | 294 | 10 | 5 | 1.20 | 146 ± 2 | 54 |

Figure 3G:
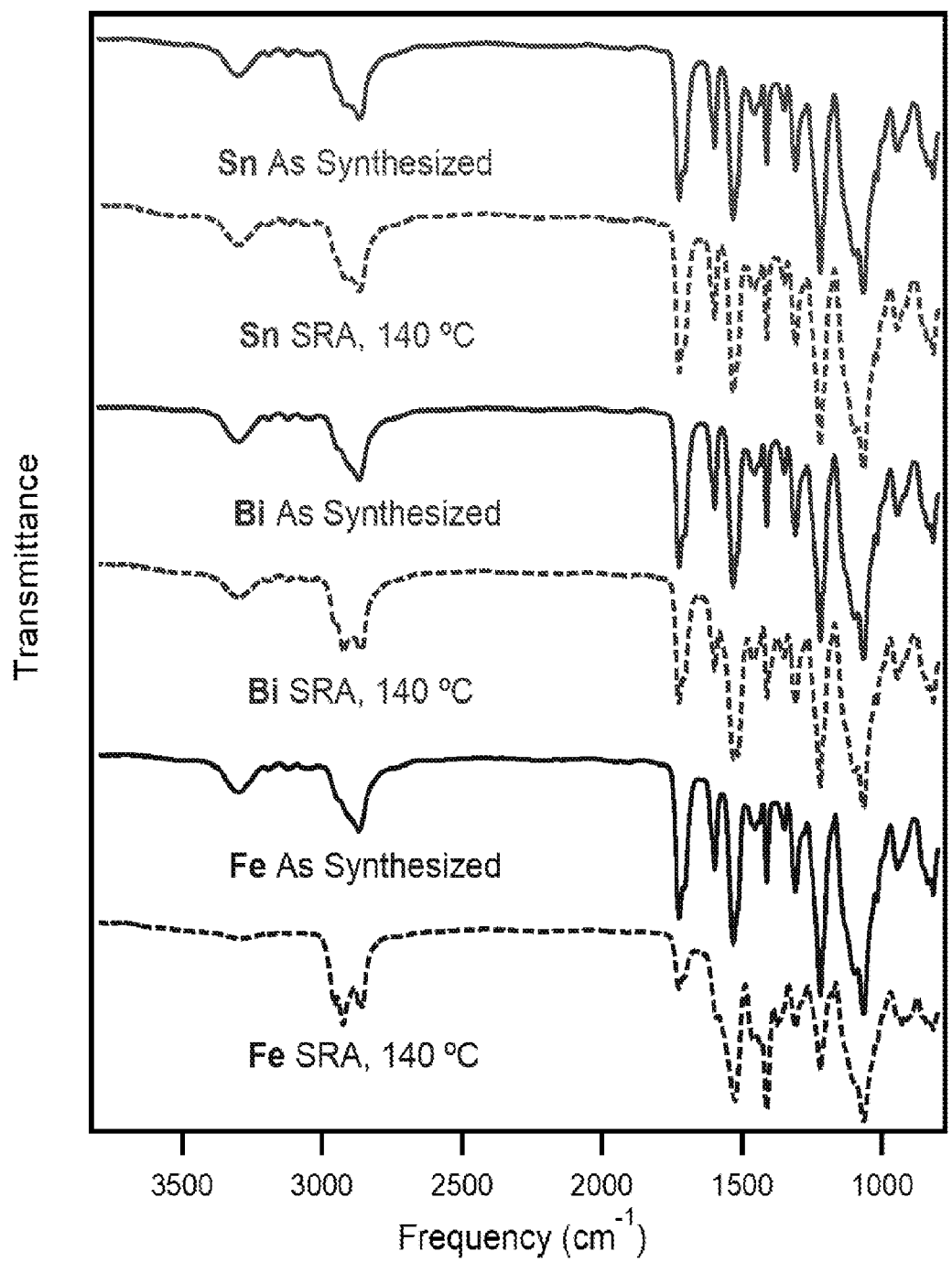
FIG. 3G shows FT-IR spectra for DBTDL (Sn), $Bi(neo)_3$ (Bi), and $Fe(acac)_3$ (Fe) containing samples before and after SRA at 140° C.

The rate of urethane exchange reactions at elevated temperatures within these networks were determined by elevated temperature stress relaxation experiments. Samples were equilibrated at a given temperature, a rapid 5% strain was applied, and the relaxation of the stress was monitored; this process was repeated multiple times for a given sample to understand the reproducibility of the process. All samples relaxed stress very rapidly and reproducibly with characteristic relaxation times (τ*, the time required to relax to 1/e of the initial stress) of less than 40 s for each sample at 140° C. (FIGS. 3B-3F). While FT-R analysis of samples containing Bi and Sn show no change afterwards, consistent with degenerate urethane exchange reactions as the cause of stress relaxation, the samples containing Fe showed marked changes in functional groups present (FIG. 3G), suggesting that side reactions contribute to relaxation in these samples. Fe(III) catalysts have been reported to cause exchange or dehydration reactions of ethers, so we suspect that these side reactions contribute most strongly to the decomposition. Surprisingly, all samples relax stress with similar Arrhenius activation energies (FIG. 3C), which strongly differs from the behavior observed in polyester vitrimers.

Figure 4A:
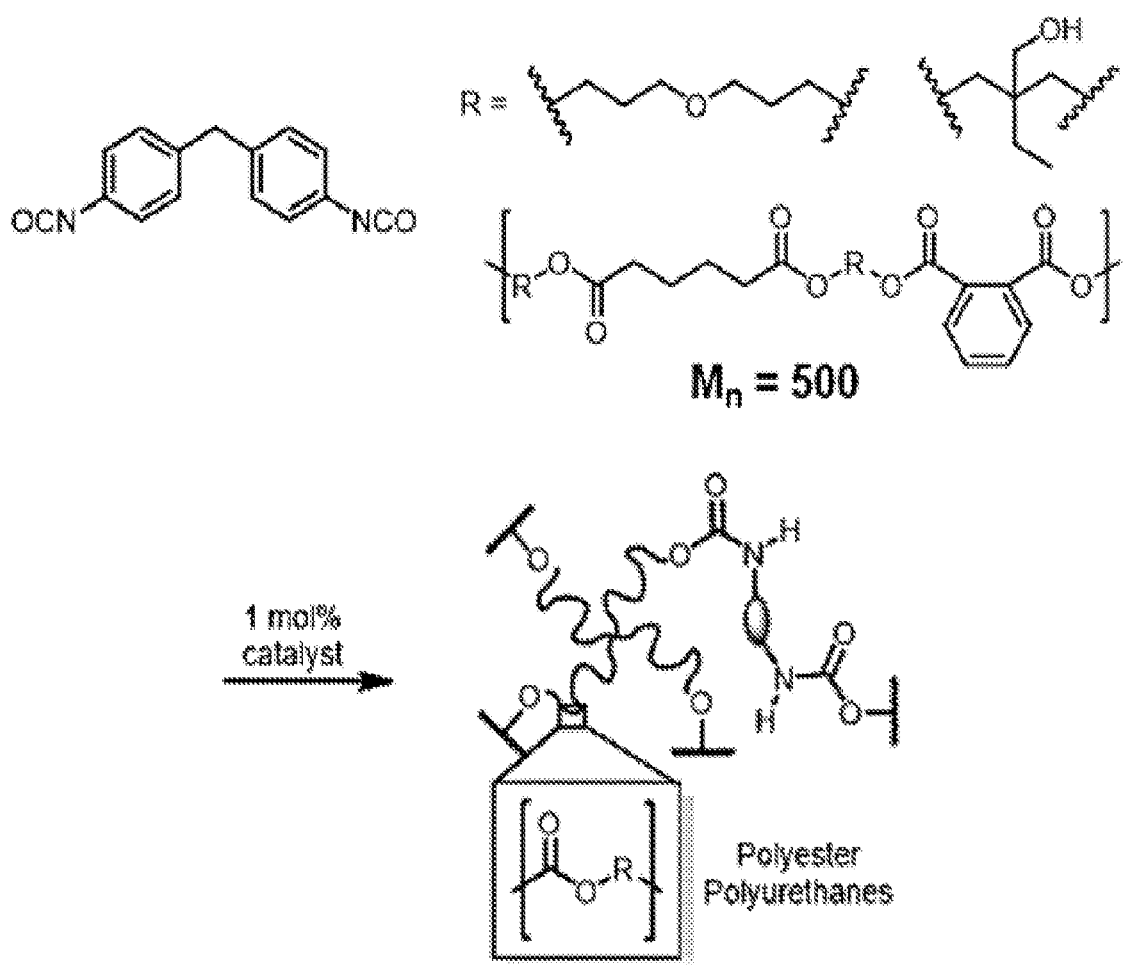
FIG. 4A illustrate the synthesis of polyester PUs.
Figure 4D:
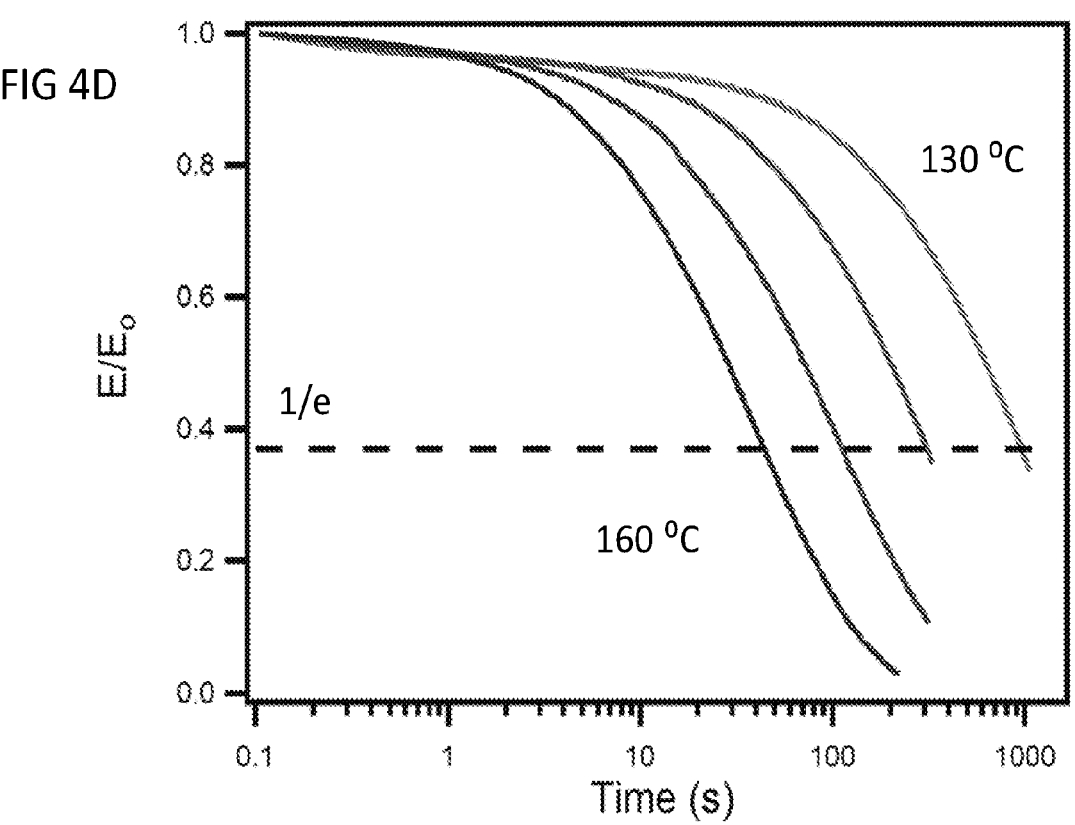
FIG. 4D shows representative stress relaxation curves of MDI polyester PU with 1 mol % DBTDL performed from 130 to 160° C.
Figure 4E:
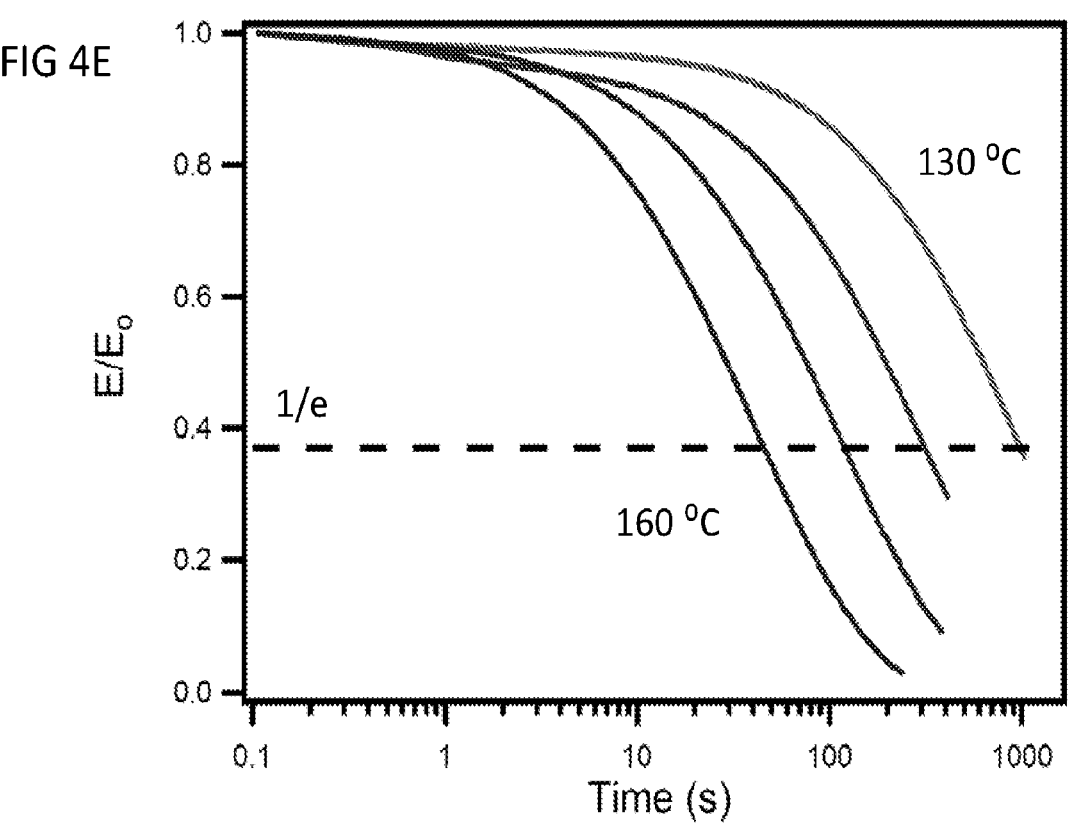
FIG. 4E shows representative stress relaxation curves of MDI polyester PU with 1 mol % $Bi(neo)_3$ performed from 130 to 160° C.

To determine whether this unexpected behavior was general across multiple classes of PUs, cross-linked polyester PUs were synthesized by reacting MDI with a commercially available polyester oligomer polyol ($M_n$≈500 g/mol, —OH functionality 2.5) in the presence of 1 mol % of catalyst (FIG. 4A). A control sample was synthesized in the absence of catalyst to determine its role on the properties of the material. All polymers show complete disappearance of the —NCO functionality by FT-IR spectroscopy (FIG. 4G), and swell in DCM to give relatively high gel fractions (>0.9), suggesting a cross-linked architecture. DSC indicates moderate glass transition temperatures of 45-50° C., and TGA shows thermal stability to temperatures greater than 250° C., even in the presence of catalyst. DMTA shows a rubbery plateau modulus consistent with the expected covalently cross-linked architecture, and all catalysts give similar values of the rubbery storage modulus (3.18-5.39 MPa) and tan S curves, suggesting that the different catalysts do not significantly affect the polymer curing reaction. A summary of the characterization of the polyester PUs is provided in TABLE 2.

TABLE 2

Characterization of Polyester Polyurethanes

| Polymer | Gel % | $T_d$ (° C., 5%) | $T_{g,\,DSC}$ (° C.) | $T_{g,\,DMTA}$ (° C.) | E' at 120° C. (MPa) | $E_a$ (kJ/mol) | $T_v$ (° C.) |
|---|---|---|---|---|---|---|---|
| DBTDL | 87 | 272 | 44 | 53 | 3.23 | 144 ± 3 | 71 |
| Bi(neo)$_3$ | 92 | 282 | 48 | 52 | 3.56 | 148 ± 2 | 73 |
| Fe(acac)$_3$ | 92 | 283 | 49 | 53 | 5.39 | 147 ± 2 | 71 |
| No Cat | 92 | 299 | 37 | 43 | 1.97 | — | — |

Figure 4G:
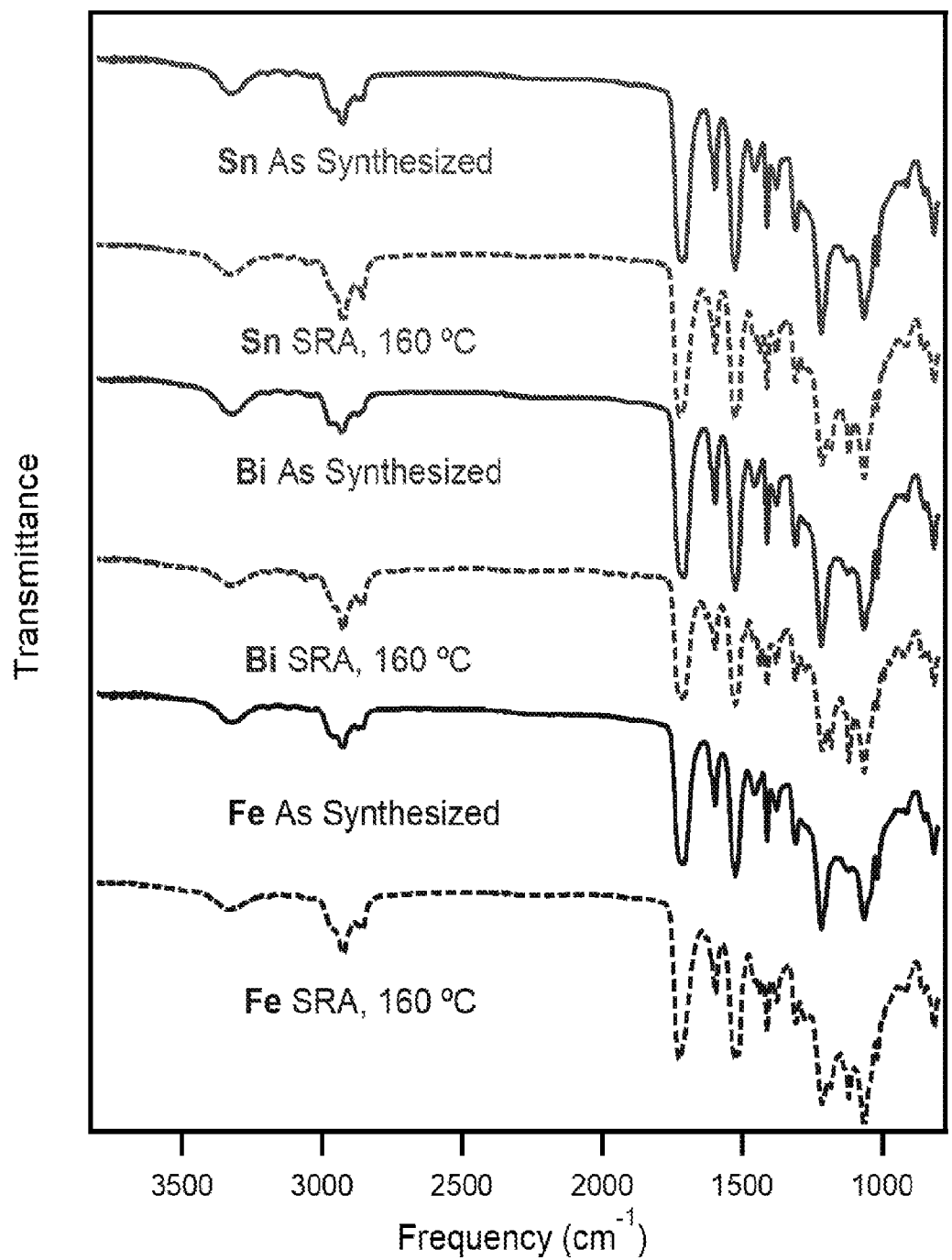
FIG. 4G shows FT-IR spectra of polyester polyurethanes as synthesized (solid) and after stress relaxation analysis at highest temperature measured (dashed).

Elevated temperature stress relaxation experiments were again used to evaluate the dynamic nature of the polymers. In all polymers containing catalyst, rapid, reproducible stress relaxation is observed, with characteristic relaxation times of 35-47 s at 160° C. depending on the catalyst (FIG. 4B). FT-IR analysis of polymers containing each of the three catalysts before and after stress relaxation suggests no chemical changes (FIG. 4G). Remarkably similar rates and Arrhenius activation energies of stress relaxation are observed with all catalysts (FIGS. 4C-4F). These activation energies agree quantitatively with those obtained for polyether PU stress relaxation. Samples in which the aromatic polyisocyanate was replaced with an aliphatic isocyanate showed slower relaxation rates and similar activation energies of stress relaxation, consistent with the higher thermal stability of aliphatic-isocyanate-derived polyurethanes, and suggesting the general applicability of the chosen catalysts to catalyze exchange of any urethane bond (TABLE 3-4). A control sample synthesized in the absence of catalyst shows little to no stress relaxation at the same temperature (FIG. 4B), indicating that the presence of catalyst is essential for rapid stress relaxation, consistent with our model compound studies and providing support for urethane exchange as the mechanism for relaxation in these materials.

TABLE 3

Characteristic Relaxation Times of MDI Polymers at Various Temperatures

| Polymer | 160° C. | 150° C. | 140° C. | 130° C. | 120° C. | 110° C. |
|---|---|---|---|---|---|---|
| Ether-Sn | | | 22 ± 1 s | 65 ± 2 s | 184 ± 11 s | 587 ± 45 s |
| Ether-Bi | | | 10 ± 1 s | 30 ± 4 s | 77 ± 6 s | 308 ± 38 s |
| Ether-Fe | | | 33 ± 1 s | 101 ± 3 s | 290 ± 8 s | |
| Ester-Sn | 46 ± 2 s | 111 ± 1 s | 305 ± 35 s | 887 ± 88 s | | |
| Ester-Bi | 47 ± 1 s | 117 ± 3 s | 321 ± 9 s | 1006 ± 27 s | | |
| Ester-Fe | 35 ± 1 s | 90 ± 1 s | 246 ± 6 s | 727 ± 35 s | | |

TABLE 4

Characteristic Relaxation Times of HMDI Polymers at Various Temperatures

| Polymer | 190° C. | 180° C. | 170° C. | 160° C. | 150° C. |
|---|---|---|---|---|---|
| Ester-Sn | | 72 ± 2 s | 168 ± 2 s | 418 ± 6 s | 1256 ± 43 s |
| Ester-Bi | | 97 ± 1 s | 226 ± 4 s | 542 ± 8 s | 1409 ± 13 s |
| Ester-Fe | 82 ± 3 s | 197 ± 3 s | 520 ± 22 s | 1089 ± 116 s | |

Figure 5A:
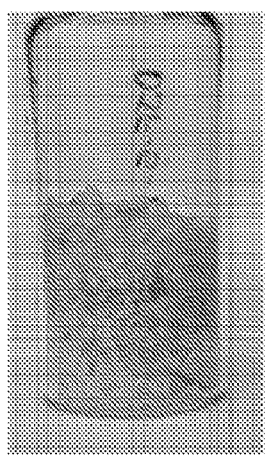
FIG. 5A shows photographs of ground and reprocessed polyester PUs containing 1 mol % $Bi(neo)_3$.
Figure 5A:
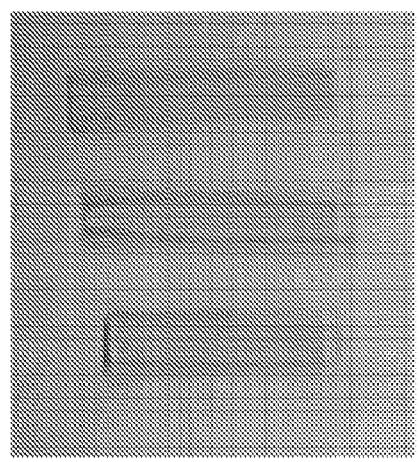
Figure 5B:
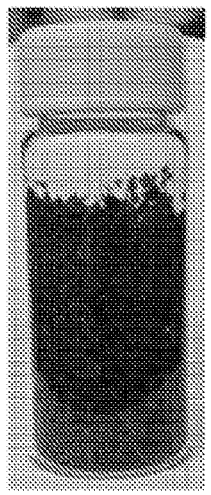
FIG. 5B shows photographs of ground and reprocessed polyester PUs containing 1 mol % Fe(acac)$_3$.
Figure 5B:
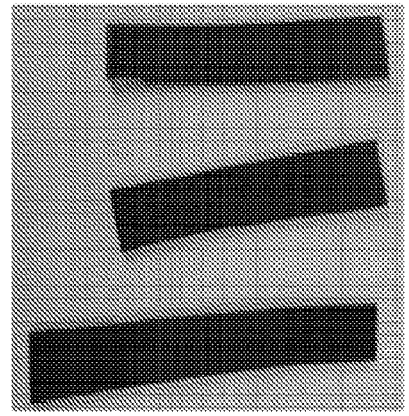
Figure 5C:
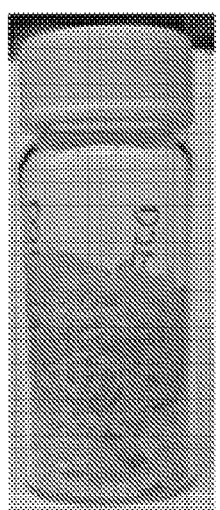
FIG. 5C shows photographs of ground and reprocessed polyester PUs containing 1 mol % DBTDL.
Figure 5C:
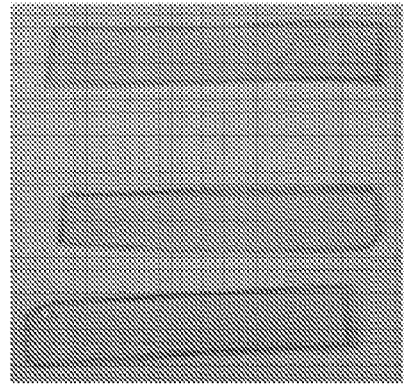
Figure 5D:
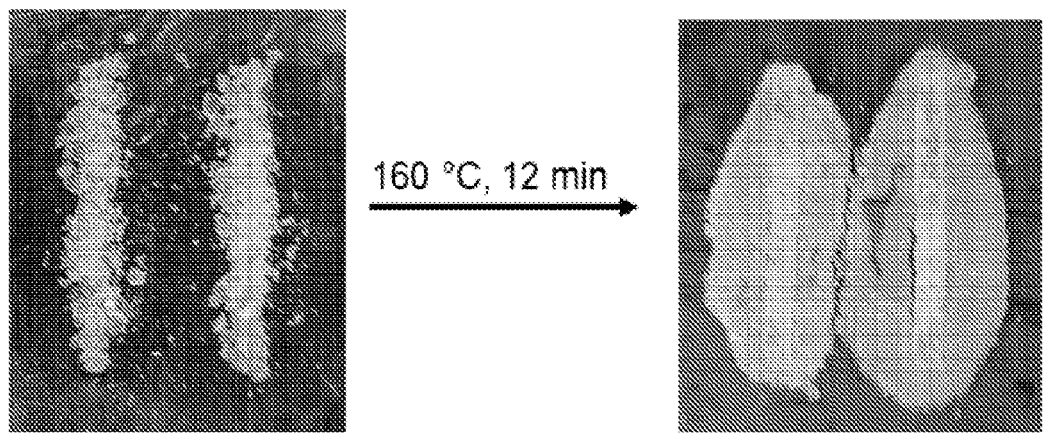
FIG. 5D shows photographs of attempted reprocessing of control sample containing no catalyst via compression molding for 12 minutes at 160° C. Inhomogeneous samples are obtained.
Figure 6:
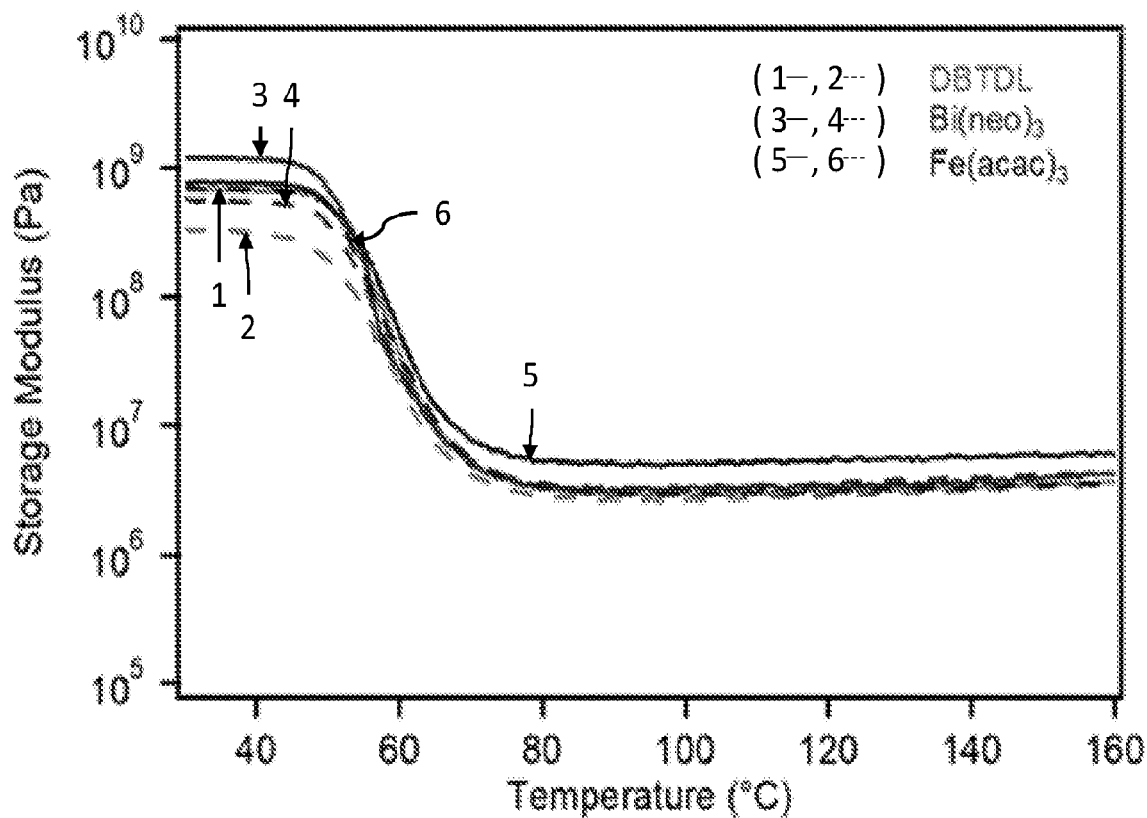
FIG. 6 shows DMTA of as-synthesized PUs (solid) containing DBTDL (1), Bi(neo)$_3$ (3), and Fe(acac)$_3$ (5), and DBTDL (2), Bi(neo)$_3$ (4), and Fe(acac)$_3$ (6) samples after reprocessing for 12 min at 160° C. (dashed).

The fast and reproducible relaxation dynamics of these materials at elevated temperatures suggest that direct reprocessing of these cross-linked materials should be possible. Polyester PU samples were ground to small pieces, and then reprocessed via compression molding at elevated temperature. In all cases, compression molding samples for 12 minutes at 160° C. gave homogeneous samples with similar properties to the virgin materials (FIGS. 5A-5C). In contrast, attempted reprocessing of control sample containing no catalyst via compression molding for 12 minutes at 160° C. resulted in inhomogeneous samples being obtained (FIG. 5D). DMTA of the reprocessed polymers indicated similar glass transition temperatures and plateau moduli of the reprocessed Bi and Sn samples and moderate cross-link density recovery of Fe samples (Sn 92% recovery, Bi 105% recovery, Fe 57% recovery) (FIG. 6). Tensile testing of pristine samples and samples after reprocessing once indicated moderate recovery of tensile strengths for all catalysts (39-67%) (TABLES 5-7).

Figure 7:
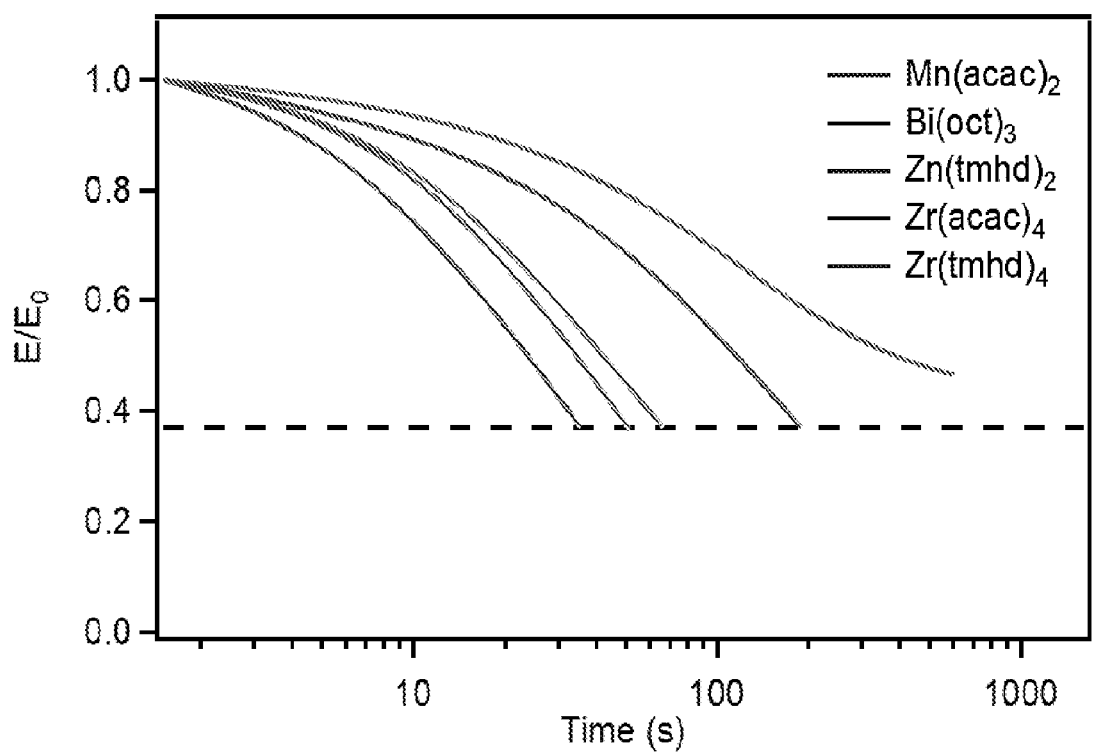
FIG. 7 shows representative SRA traces at 160° C. of synthesized PU film with various different Lewis acid catalysts. Curves are from bottom to top: Bi(oct)$_3$, Zr(tmhd)$_4$, Mn(acac)$_2$, Zr(acac)$_4$, and Zn(tmhd)$_2$.

Films synthesized containing other Bi, Zn, Zr, and Mn-based catalysts also show rapid relaxation (FIG. 7), demonstrating the utility of a variety of Lewis acid catalysts for the development of reprocessable PU-catalyst compositions.

Example 2: Reprocessing Post-Consumer Polyurethane Foams

To determine if our proposed methodology of post-synthetically introducing catalyst and directly reprocessing foams would be practical, we first developed a model system to better understand how carbamate exchange occurs in both PU foams and films. Using methylene diphenyl diisocyanate and a commercially available polyester polyol (f=2.5), cross-linked PU films were first cast from toluene at 60° C. with no added catalyst to serve as comparatives to model foams (Scheme 1). The stress relaxation and thermomechanical properties of both catalyst-free and catalyst-loaded films were compared to foams synthesized using the same monomers to understand how the foam morphology influences reprocessability. Rigid, cross-linked PU foams were synthesized by reacting the same monomers used in film synthesis in the presence of either isopentane or water as physical (PB) or chemical blowing (CB) agents, respectively. CB foams lose cross-link density through generation of $CO_2$ and contain urea functional groups. Although mechanical properties will differ in CB foams, it is important to probe their stress relaxation because most foams are chemically blown with water. The synthesis of foams

TABLE 5

Tensile Testing of $Bi(neo)_3$ Polyester Polyurethanes Before and After Reprocessing

| $Bi(neo)_3$ | Room Temperature | | | Elevated Temperature (90° C.) | | |
|---|---|---|---|---|---|---|
| | $\sigma_b$ (MPa) | $\varepsilon_b$ (%) | E (GPa) | $\sigma_b$ (MPa) | $\varepsilon_b$ (%) | E (MPa) |
| AS | 53.5 ± 1.5 | 4.2 ± 0.2 | 1.70 ± 0.05 | 2.24 ± 0.22 | 64.7 ± 9.5 | 6.44 ± 0.41 |
| RP1 | 23.9 ± 5.7 | 1.9 ± 0.4 | 1.48 ± 0.19 | 0.69 ± 0.10 | 29.6 ± 5.2 | 3.37 ± 0.35 |
| RP2 | 24.2 ± 8.6 | 1.5 ± 0.5 | 1.63 ± 0.11 | | | |

AS, as-sythesized; RP1, reprocessed once; RP2, reprocessed twice

TABLE 6

Tensile Testing of $Fe(acac)_3$ Polyester Polyurethanes Before and After Reprocessing

| $Fe(acac)_3$ | Room Temperature | | | Elevated Temperature (90° C.) | | |
|---|---|---|---|---|---|---|
| | $\sigma_b$ (MPa) | $\varepsilon_b$ (%) | E (GPa) | $\sigma_b$ (MPa) | $\varepsilon_b$ (%) | E (MPa) |
| AS | 35.8 ± 5.1 | 2.1 ± 0.4 | 1.78 ± 0.04 | 1.10 ± 0.10 | 61.7 ± 14.0 | 2.25 ± 0.82 |
| RP1 | 13.8 ± 3.7 | 0.9 ± 0.2 | 1.65 ± 0.13 | 0.36 ± 0.12 | 23.9 ± 9.7 | 2.26 ± 0.27 |
| RP2 | 20.6 ± 4.5 | 1.7 ± 0.4 | 1.39 ± 0.10 | | | |

AS, as-sythesized; RP1, reprocessed once; RP2, reprocessed twice

TABLE 7

Tensile Testing of DBTDL Polyester Polyurethanes Before and After Reprocessing

| DBTDL | Room Temperature | | | Elevated Temperature (90° C.) | | |
|---|---|---|---|---|---|---|
| | $\sigma_b$ (MPa) | $\varepsilon_b$ (%) | E (GPa) | $\sigma_b$ (MPa) | $\varepsilon_b$ (%) | E (MPa) |
| AS | 49.7 ± 1.6 | 4.8 ± 1.0 | 1.57 ± 0.09 | 0.72 ± 0.12 | 103.1 ± 7.9 | 1.26 ± 0.33 |
| RP1 | 32.7 ± 8.4 | 3.0 ± 1.2 | 1.35 ± 0.07 | 0.81 ± 0.29 | 72.6 ± 9.2 | 1.56 ± 0.23 |
| RP2 | 16.1 ± 0.5 | 5.2 ± 1.3 | 0.76 ± 0.09 | | | |

Figure 8A:
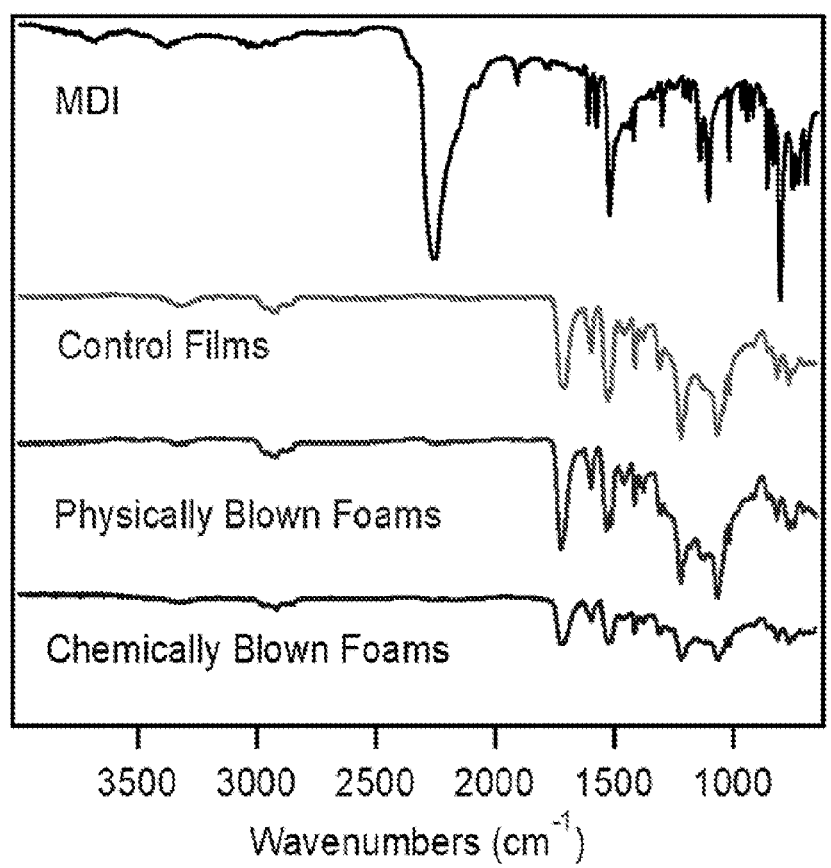
FIG. 8A shows FT-IR spectra of 4,4'-methylenebis(phenylisocyanate), as-synthesized PU films, physically blown PU foam, and chemically blown PU foam.
Figure 8B:
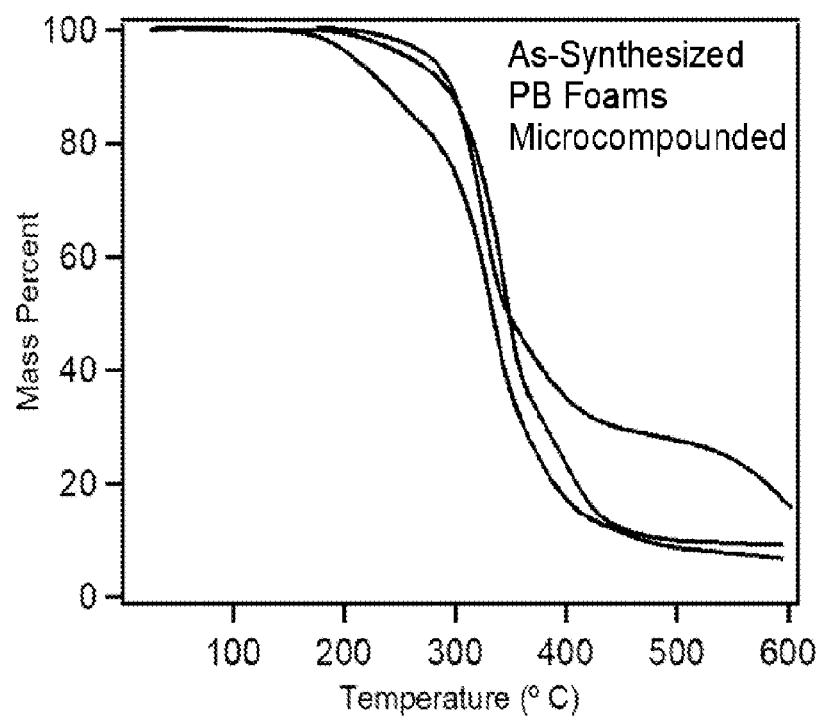
FIG. 8B shows a thermogravimetric analysis of as-synthesized films (top trace at 600° C.), physically blown PU foams (middle trace at 600° C.), and microcompounded physically blown PU foams (bottom trace at 600° C.). Reprocessed materials were swollen in catalyst solution prior to processing.
Figure 8C:
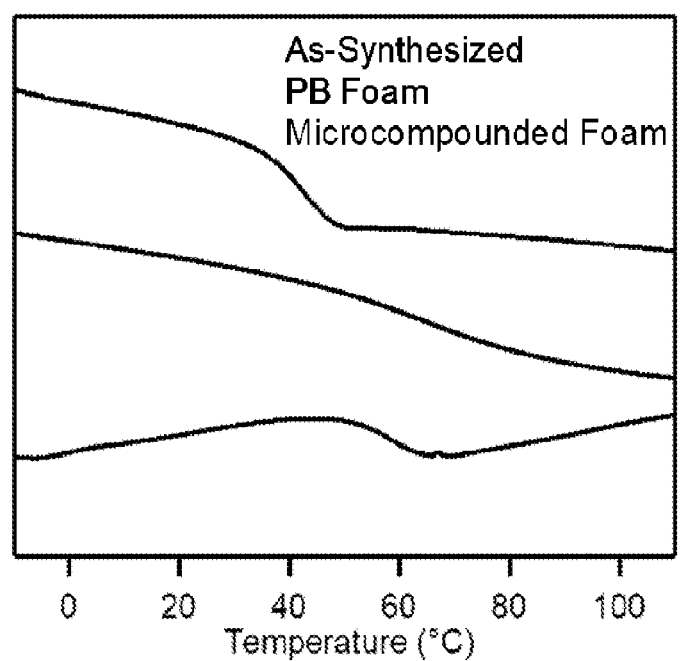
FIG. 8C shows differential scanning calorimetry of as-synthesized films (top trace), physically blown PU foams (middle trace), and microcompounded physically blown PU foams (bottom). Reprocessed materials were swollen in catalyst solution prior to processing.
Figure 9A:
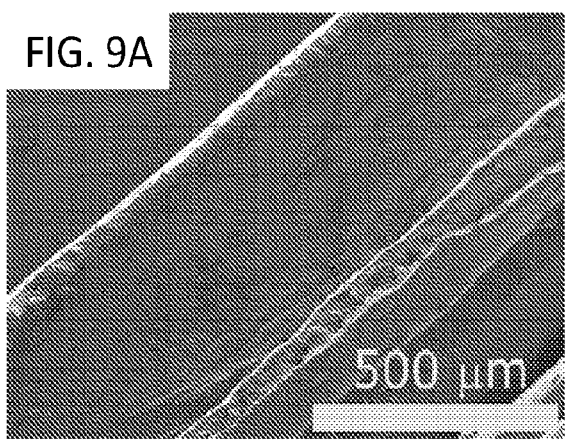
FIGS. 9A-9D show SEM images of synthesized model PU film (FIG. 9A), model PB foam (FIG. 9B), model PB foam compression molded (FIG. 9C), and model PB foam microcompounded (FIG. 9D). Reprocessed materials were swollen in catalyst solution prior to processing.
Figure 9B:
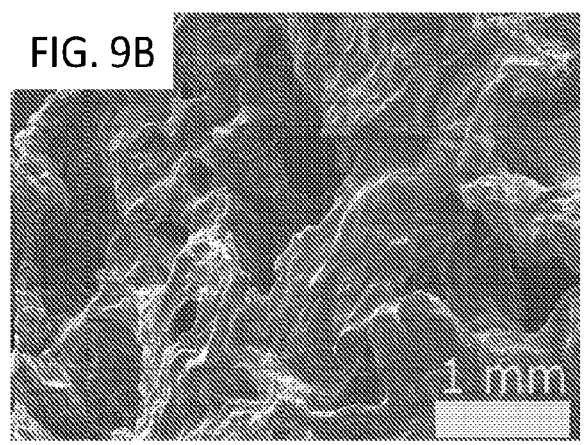
Figure 9C:
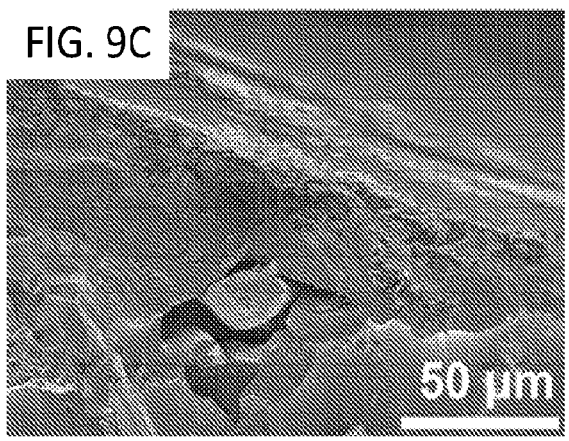
Figure 9D:
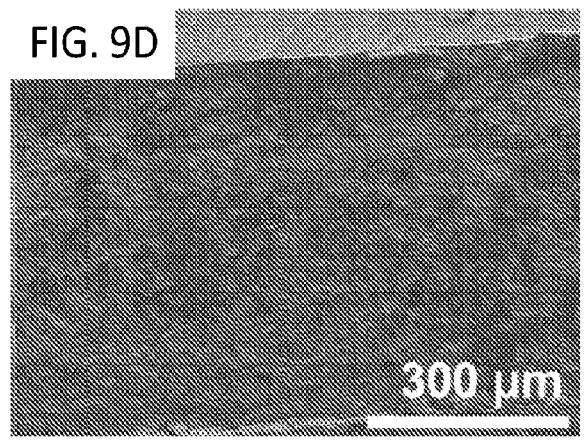

AS, as-sythesized; RP1, reprocessed once; RP2, reprocessed twice required low concentrations of a DBTDL catalyst (0.35 mol %) to appropriately balance the rates of polymerization and gas generation. These model PU foams were evaluated prior to testing commercial PU foam formulations because the commercial products contain proprietary additives that might complicate carbamate exchange stress-relaxation. Both foams and films showed complete disappearance of the isocyanate stretch at 2285 cm$^{-1}$ and appearance of a carbamate stretch at 1708-1724 cm$^{-1}$ by Fourier-transform infrared spectroscopy (FT-IR), indicating complete curing of the polymer networks (FIG. 8A). The films and foams both degraded to volatile byproducts between $T_d$=260-284° C., as characterized by thermogravimetric analysis (TGA) (FIG. 8B), which is typical of cross-linked PUs. Differential scanning calorimetry (DSC) showed that the PB foams had higher glass transition temperatures ($T_g$=61° C.) compared to control films $T_g$=45° C., (FIG. 8C) which was initially attributed to the air in foam. Gel fractions of model PU films and PB foams were 87% and 89%, respectively, which is consistent with a well-cured polymer network. Both PB and CB foams exhibit closed cell morphologies with many cells collapsed, likely because silicone surfactants typically used to prevent this behavior were omitted (FIGS. 9A-D). However, the exclusion of common foam additives means that the synthesized PU films and PB foams are chemically similar, enabling a more direct comparison of the differences in reprocessing between film and foam morphologies.

Figure 10A:
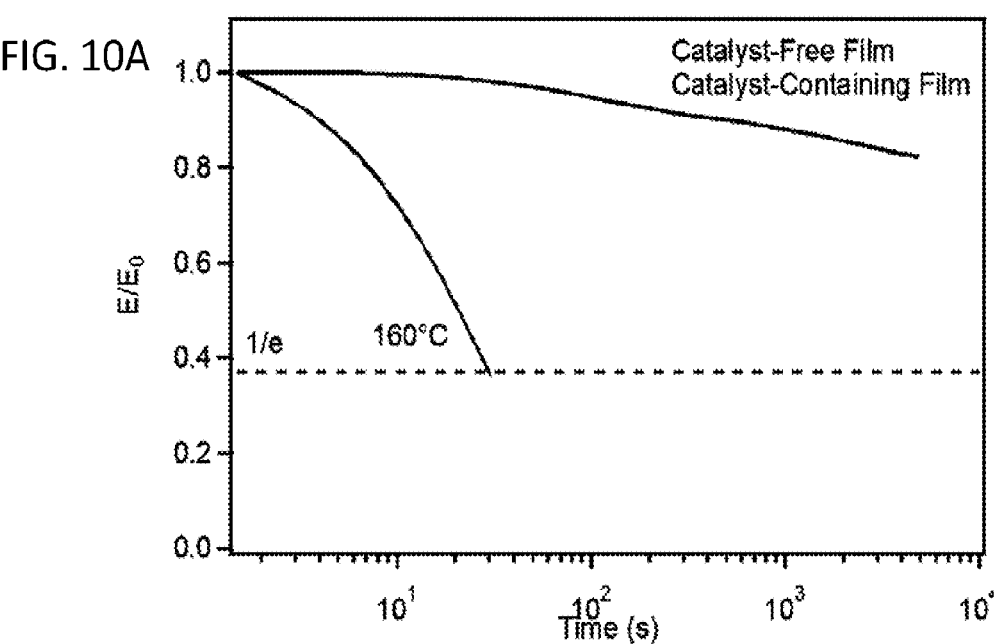
FIG. 10A shows SRA of PU films without catalyst treatment (top trace) and with catalyst treatment (bottom) at 160° C.

To determine if diffusing DBTDL into cross-linked PUs by post-synthetically swelling in a concentrated catalyst solution would provide processable PU networks, we first evaluated this method using catalyst-free PU films. PU film was ground and stirred (100 mg PU/mL) in a solution of DBTDL in CH$_2$Cl$_2$ (30 mg/mL), after which the PU was filtered, collected, and dried under vacuum. Inductively coupled plasma-optical emission spectrometry (ICP-OES) was used to determine that the PU film contained 0.56 wt % of Sn after swelling in catalyst solution (Table 8). The catalyst-loaded, powdered PU sample was subjected to compression molding at 160° C. for 12 min, during which the sample fused into a homogenous solid film. Stress relaxation analysis (SRA) was performed to compare the viscoelastic properties of the as-synthesized PU film with no catalyst and compression molded catalyst-containing PU films. Films treated with catalyst solution relaxed stress rapidly (t*=28 s at 160° C.), suggesting that the material undergoes rapid dynamic exchange under these conditions. Films lacking the catalyst relaxed stress much more slowly and showed poor processability, suggesting that carbamate exchange only occurs rapidly in catalyst-treated PU (FIG. 10A). DBTDL was next introduced to both physically blown and chemically blown foams, and the foams were compression molded using the previous procedure. ICP-OES con- Scheme 1. Synthesis of PU film with no DBTDL, physically blown foam with 0.35 mol % DBTDL, and chemically blown foam with 0.35 mol % DBTDL.

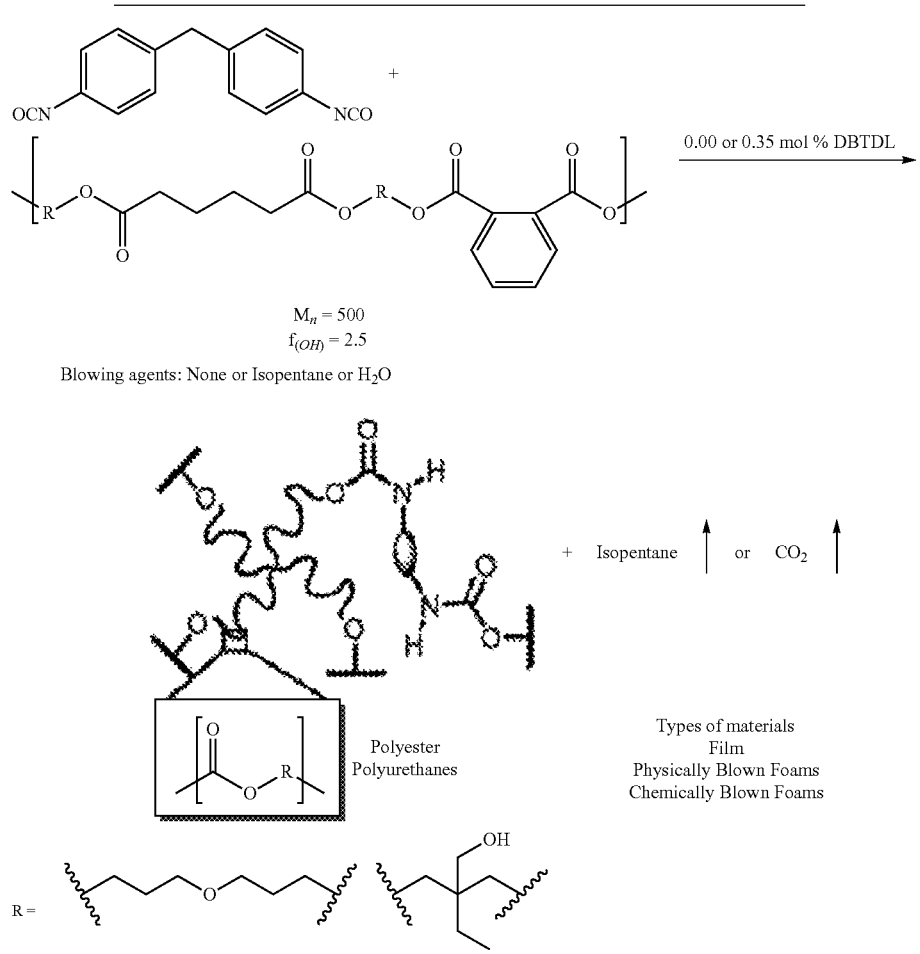

firmed the presence of Sn at a concentration of 0.92 wt % in PB PU foam which is notably higher than the PU film results (0.56 wt %). Despite being chemically identical to PU control films and containing higher Sn by weight, PB foams relaxed stress more slowly than PU films (71 s at 160° C., FIG. 10B). CB foams relaxed more rapidly (53 s at 160° C.) than the PB foams, indicating that dynamic carbamate exchange is not hindered by other functional groups formed in PU foams blown with water (e.g., ureas). At all temperatures measured, stress relaxation times were significantly slower in compression molded PU foams compared to compression molded PU films. Activation energies of relaxation in both compression molded PB PU foam (159±6 kJ/mol) and CB PU foam (188±16 kJ/mol) are higher than PU film (143±4 kJ/mol) suggesting that foam morphology increases the temperature dependence of stress relaxation in reprocessed PU material. Overall, the stress relaxation differences between compression molded foams and films could be due to that the PUs initial foam morphology restricts the viscous flow of the resulting compression molded material.

TABLE 8

The weight percent of Sn measured in various PU materials using ICP-OES.

| PU materials | Before Post-synthetic treatment | After Post-synthetic treatment | After microcompounding |
| --- | --- | --- | --- |
| As-Synthesized PU Films | <0.01% | 0.56% | — |
| As-Synthesized PB Foam | 0.14% | 0.92% | 0.79% |
| Commercial Foam | 0.02% | 0.64% | 0.47% |

Figure 10B:
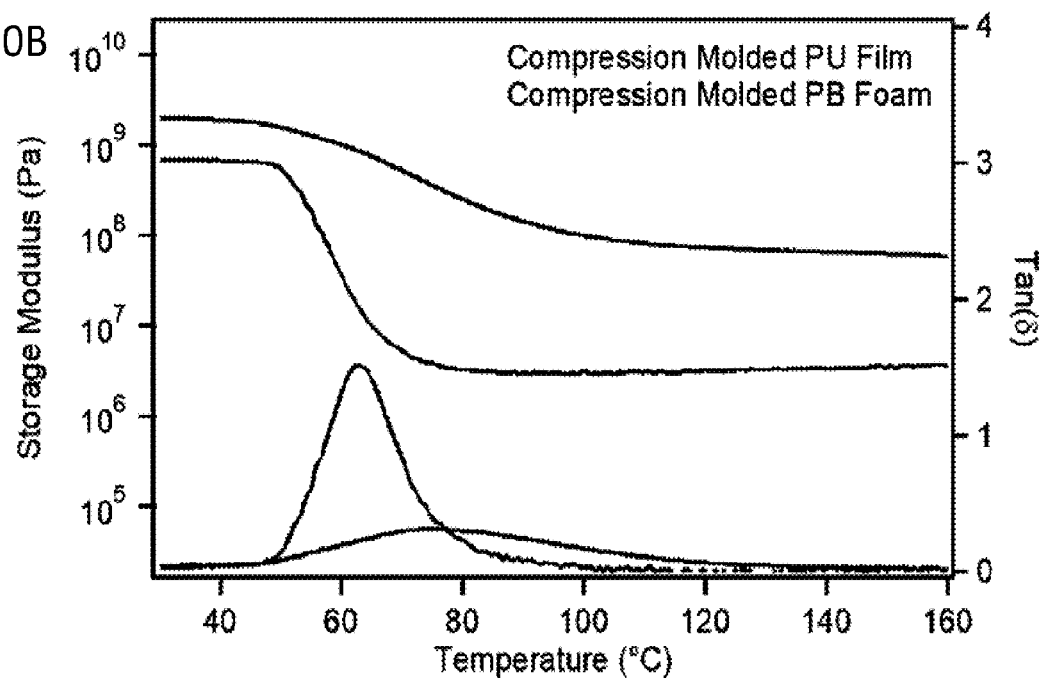
FIG. 10B shows a DMTA of compression molded post-synthetically treated PU films (middle traces 60° C.) and PB foams (uppermost and lowermost traces at 60° C.).
Figure 11:
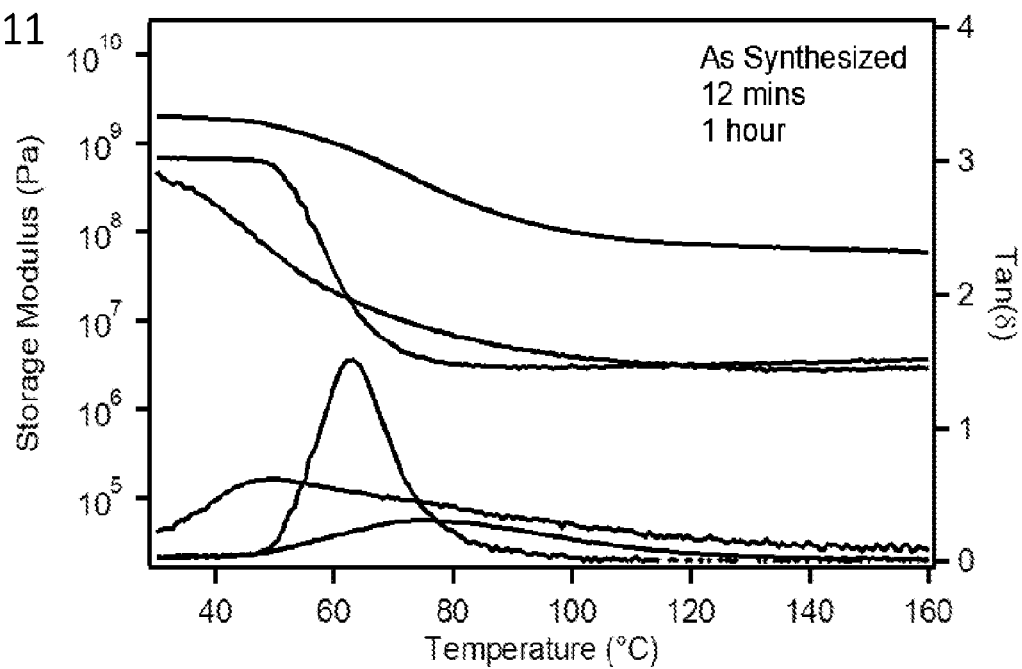
FIG. 11 shows a DMTA of compression molded PU film (middle traces at 70° C.), compression molded PB foams for 12 mins (uppermost and lowermost traces at 70° C.), and compression molded PB foams for 1 hour (second and fifth traces from the top at 70° C.). Compression molded materials were swollen in catalyst solution prior to processing.
Figure 12:
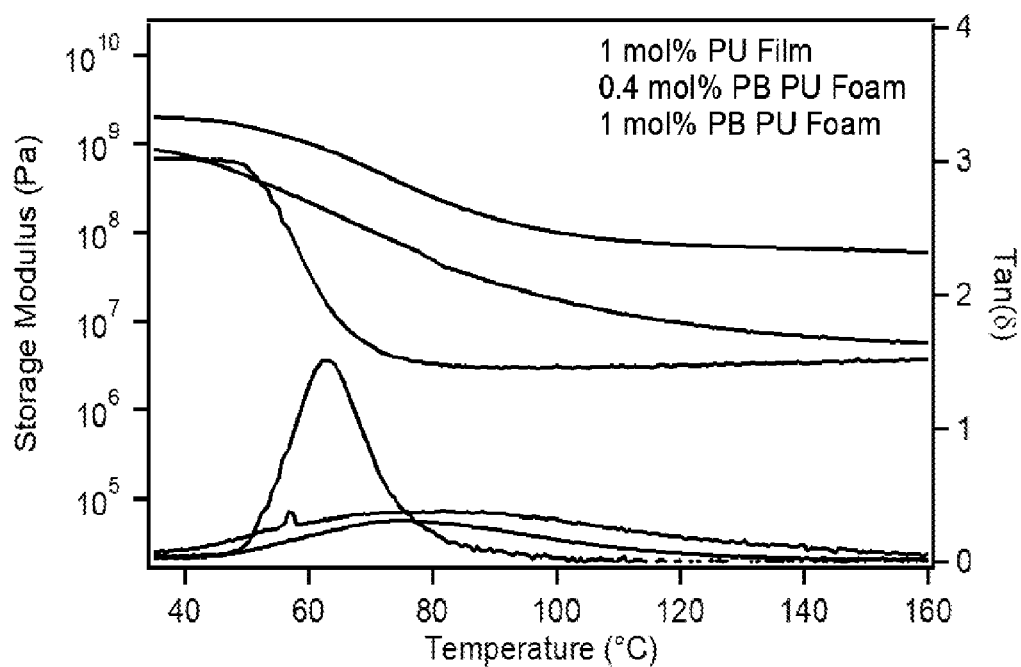
FIG. 12 shows a DMTA of compression molded PU film containing 1 mol % DBTDL per carbamate (middle traces at 60° C.), compression molded PB PU foam containing 0.4 mol % DBTDL (uppermost and lowermost traces at 60° C.), and compression molded PB PU foams containing 1 mol % DBTDL (second and fifth traces from the top at 60° C.). Foams and films were directly synthesized with the catalyst and were not post-synthetically treated with DBTDL solution.
Figure 13A:
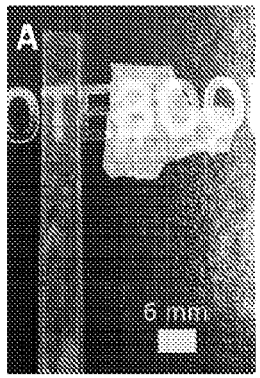
FIG. 13A shows an image of compression molded PU film (left) and compression molded physically blown (PB) PU foam (right). Reprocessed materials were swollen in catalyst solution prior to processing.
Figure 13B:
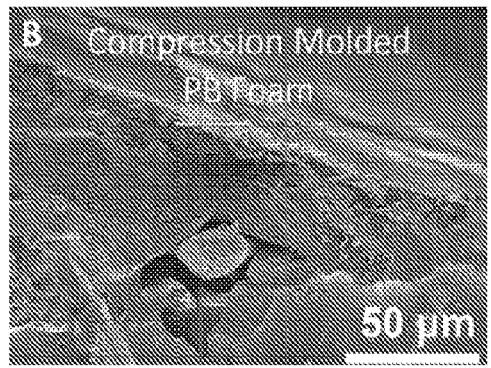
FIG. 13B shows an SEM image of reprocessed PB foam using compression molding. Reprocessed materials were swollen in catalyst solution prior to processing.

In addition to influencing reprocessability, the initial foam morphology of the PU negatively impacts the thermomechanical properties of the materials reprocessed by compression molding. The $T_g$ and rubbery plateaus of the reprocessed materials were determined by dynamic mechanical thermal analysis (DMTA) (FIG. 10B). Compression molded PB foams exhibited broader peaks in tan(δ), with only 61% integrated area relative to compression molded PU films. Area under the tan(δ) curve is thought to correspond to the chain mobility, damping, and impact strength of the network. Even when compression molding was performed for longer time (1 hour), the resulting films exhibited broad glass transitions (FIG. 11). To see if catalyst loading was responsible for the broad glass transitions, PU film and PB PU foam were synthesized with 1 mol % DBTDL and subsequently compression molded. The glass transition remained broad in compression molded foam suggesting that foam morphology is the major contributing factor (FIG. 12). We attributed the broader glass transitions of the compression molded foams to inhomogeneity caused by trapped air still present within the resulting films (FIG. 13A). Indeed, scanning electron microscopy (SEM) revealed voids in films derived from compression molded PU foams (FIG. 13B). Optical microscopy of the molded foam samples showed cracking and greater inhomogeneity compared to samples derived from film-to-film reprocessing (FIGS. 14A-14D). These findings suggest that compression molding is not an effective reprocessing method for reprocessing PU foams, although it is effective for film-to-film PU reprocessing.

Although the compression molded foam-to-film PU samples have inferior thermomechanical properties and stress relaxation rates compared to their film-to-film counterparts, foam-to-film samples nevertheless exhibit relatively rapid stress relaxation at elevated temperatures associated with dynamic carbamate exchange, suggesting that PU foam is still reprocessable. The broad glass transitions, higher rubbery plateaus, and higher glass transition temperatures are similar to those of polymer networks containing fillers. In these systems, fillers occupy free volume of the polymer network and interfere with segmental motion, which broadens the glass transition and increases the rubbery plateau modulus. Foams are formally gas-solid composite materials, and their processing into films therefore requires the removal of air from the network. Therefore, we turned our attention to alternatives to compression molding that would provide improved mixing and gas removal to achieve more homogenous films.

Figure 13C:
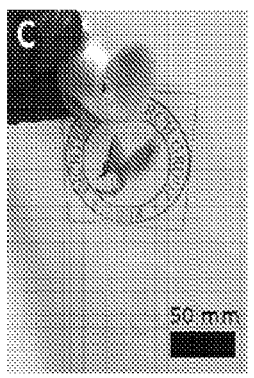
FIG. 13C shows an image of continuously extruded PB foam into film. Reprocessed materials were swollen in catalyst solution prior to processing.
Figure 13D:
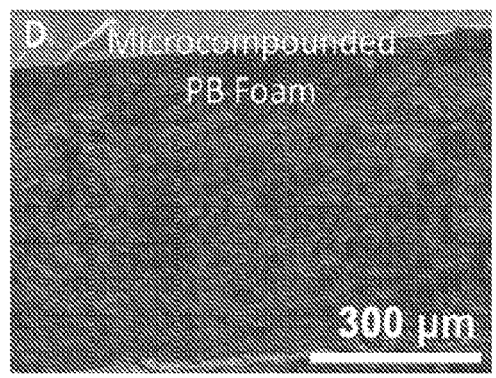
FIG. 13D shows an SEM image of reprocessed PB foam using twin-screw microcompounding. Reprocessed materials were swollen in catalyst solution prior to processing.
Figure 14A:
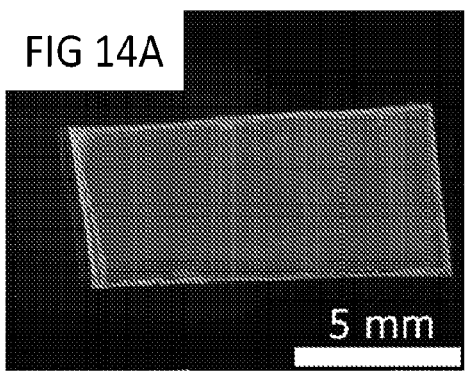
FIGS. 14A-14D show optical microscopic images of as-synthesized PU film (FIG. 14A), PB PU foam (FIG. 14B), model PB foam compression molded (FIG. 14C), and PB PU foam microcompounded (FIG. 14D). Reprocessed materials were swollen in catalyst solution prior to processing.
Figure 14B:
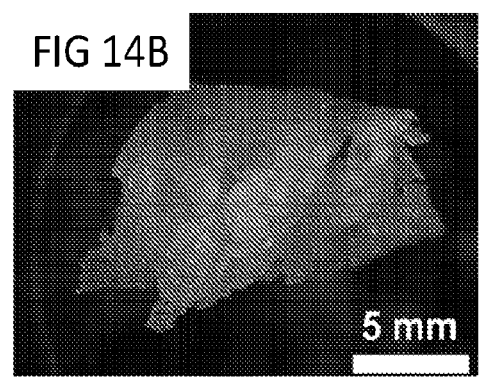
Figure 14C:
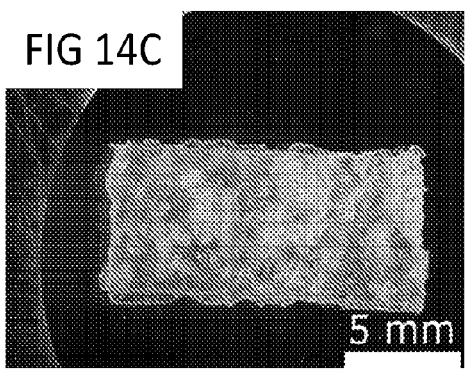
Figure 14D:
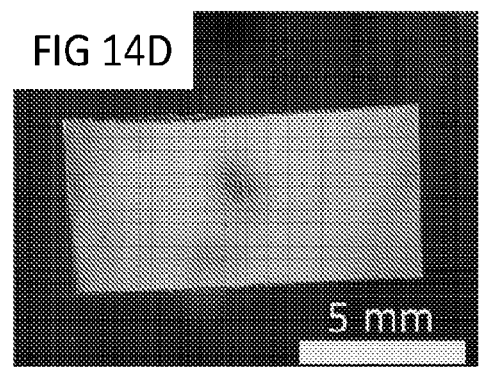

Microcompounding refers to mixing of polymer formulations in the melt state on a small scale and is commonly accomplished with continuous mixing in a twin-screw extruder. We hypothesized that distributive and dispersive mixing mechanisms involved in microcompounding would cause the PU to homogenize more effectively and more efficiently expel air from the extrudate. Therefore, catalyst-loaded PB foam was microcompounded in a twin-screw batch mixer and extruded as a film, whose rheological properties and microscopic morphology were directly tested (FIG. 13C). The extrusion was performed at 200° C. under nitrogen with a residence time of ~1 minute. The voids observed in the SEM images of compression molded PB foams were notably absent in images of the microcompounded PB foams (FIG. 13D), which appear uniform.

Figure 15A:
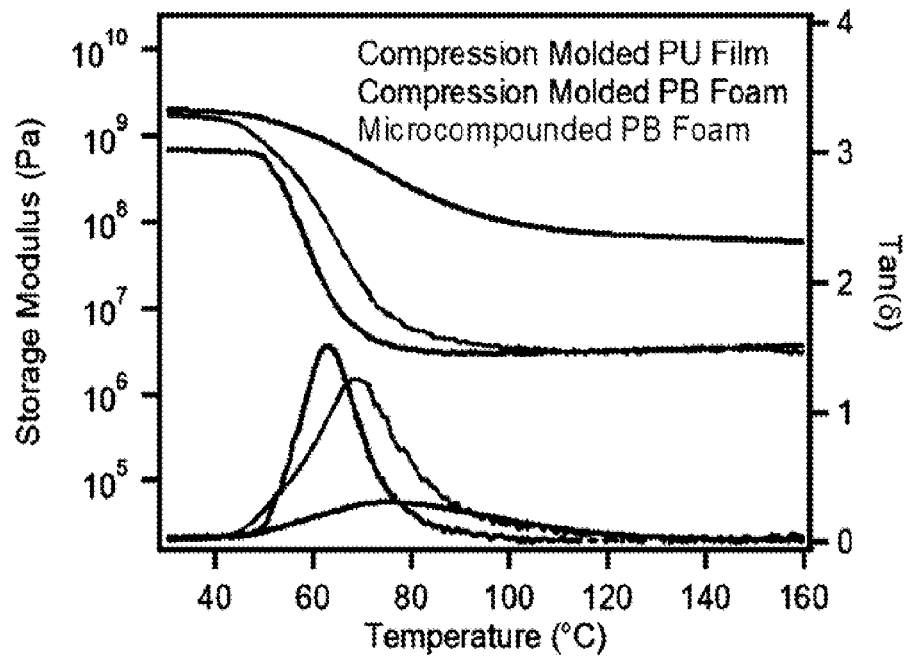
FIG. 15A shows a DMTA of compression molded PU films (middle traces at 60° C.), compression molded physically blown (PB) PU foams (uppermost and lowermost traces at 60° C.), and microcompounded PB PU foams (second and fifth traces from the top). Reprocessed materials were swollen in catalyst solution prior to processing.

Given the microscopic evidence of air removal in microcompounded PB foam, DMTA was used to quantitatively evaluate the reprocessing efficiency. Compared to compression molded PB foam, microcompounded PB foams exhibited drastically sharper tan (δ) responses more similar to compression molded PU films (FIG. 15A). The area under the tan (δ) curve exceeds that of the compression molded PU film (1.27 normalized to that of compression molded films), demonstrating that the inherent damping behavior and molecular motion of the PU is largely recovered. Microscopic evidence coupled with rheology strongly suggests that microcompounding results in superior reprocessing of PU foams into films, compared with compression molding methods.

Figure 15B:
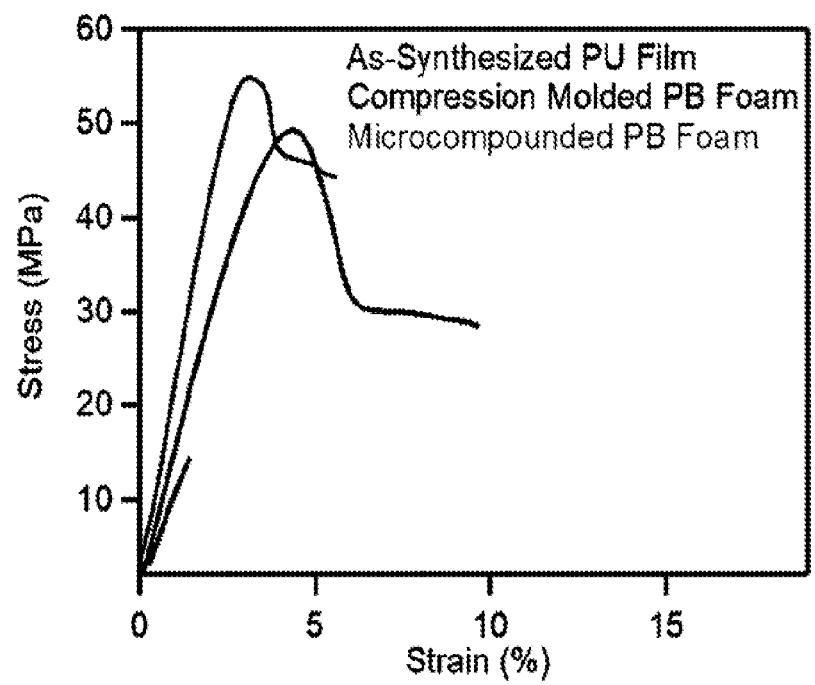
FIG. 15B shows tensile properties of as-synthesized PU films (middle trace), compression molded PB PU foams (bottom trace), and microcompounded PB PU foams (top trace) into continuous films. Reprocessed materials were swollen in catalyst solution prior to processing.
Figure 16:
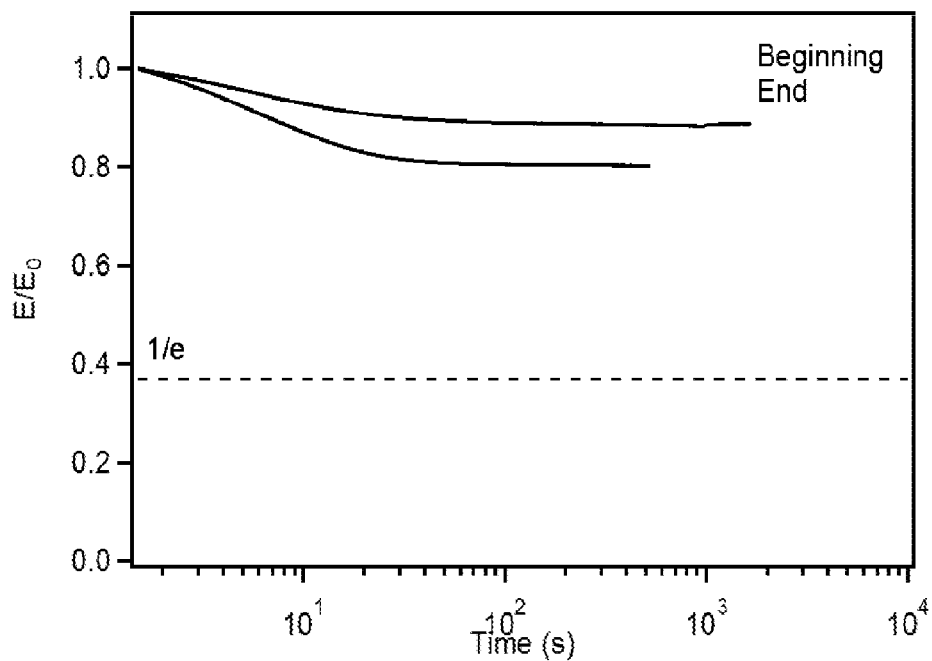
FIG. 16 shows a representative SRA traces at 160° C. of microcompounded physically blown foam at the start (bottom) and end (top) of the extrudate. Reprocessed materials were swollen in catalyst solution prior to processing.
Figure 17:
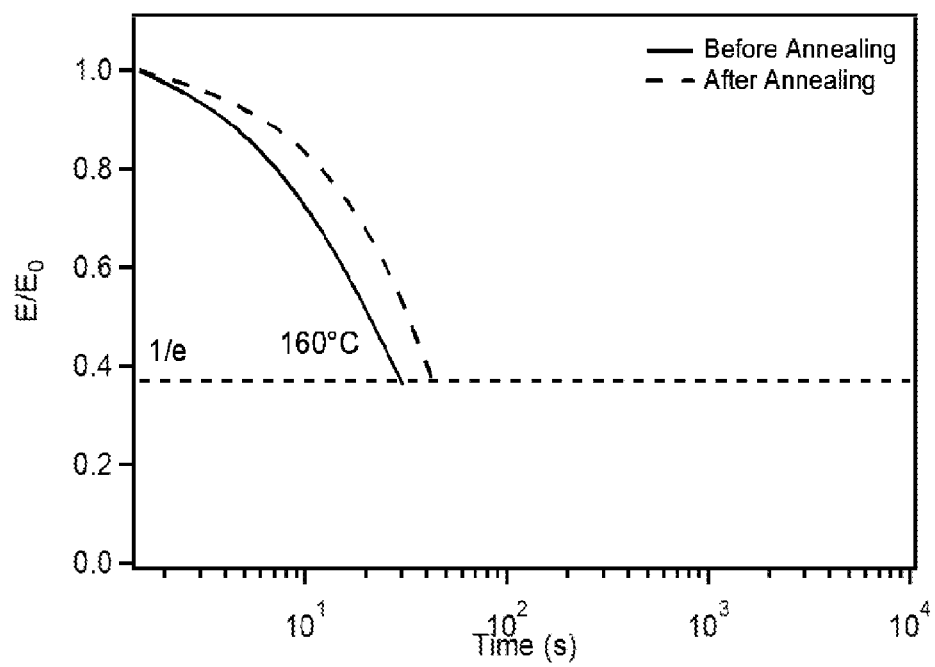
FIG. 17 shows representative SRA of PU film containing DBTDL before annealing (solid line) and after annealing (dashed line) at 200° C. for 2 minutes under air. Temperature was chosen to mimic microcompounding temperature.
Figure 18:
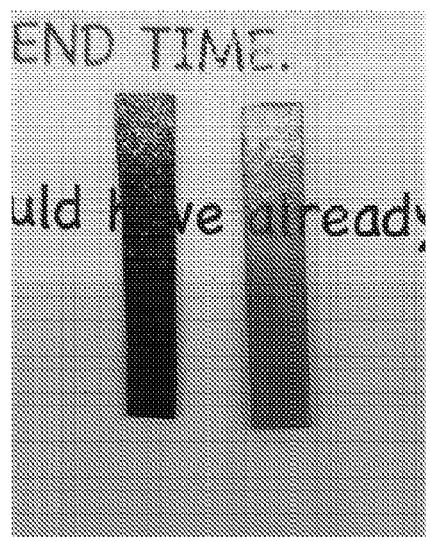
FIG. 18 shows representative images of microcompounded PB PU foam loaded with Bi(neo)$_3$. The light portions are the earliest portion of the extrudate whereas the darker portions of the extrudate are the latest portion. Extrusion is non-continuous and stops when the microcompounder reaches its torque limit.
Figure 19:
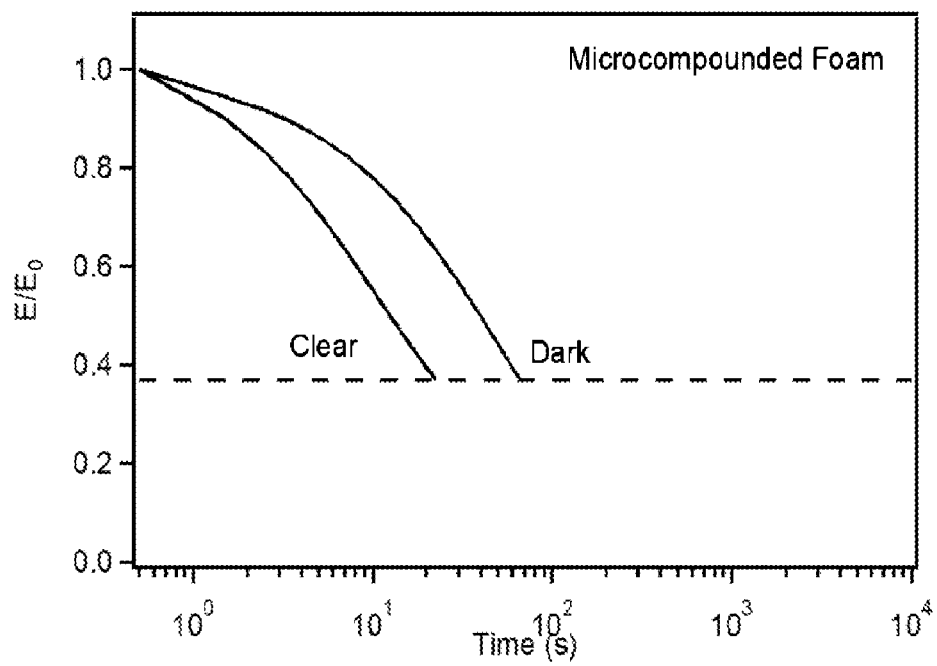
FIG. 19 shows a representative SRA of microcompounded PB PU foam containing Bi(neo)$_3$ at 200° C. until the torque limit is reached. The clear portion of the extrudate is the earliest part of the extrudate whereas the dark portion of the extrudate is the late portion.

To determine the practical implications of this improved mixing methodology, tensile testing was performed on a continuously extruded film and compared to both as-synthesized PU films and compression molded PB foam-to-film samples (FIG. 15B). The tensile strengths and yield points of both early and late portions of microcompounded PB foams were within error of those of as-synthesized PU films (Table 9), demonstrating excellent recovery of these material mechanical properties throughout the extrudate. In contrast, compression molded PB foams exhibited drastically lower tensile strengths and elongations at break, which supports our hypothesis that improved mixing and air removal is essential for obtaining desirable mechanical properties in foam-to-film reprocessed samples. Despite its excellent reprocessability, we observed that the extrudate does not relax stress significantly after microcompounding (FIG. 16). To determine the major source of this behavior, PU films with catalyst were annealed at 200° C. for 2 minutes in air, which mimic the temperature of screw extrusion conditions but lack the mechanical agitation. SRA of these samples indicated only mild reduction of the stress relaxation, such that we speculate that high shear followed by subsequent air cooling may be the cause of this behavior (FIG. 17). This attribute can be a desirable feature if films with minimal creep and maximum shape stability are desired, at the expense of multiple reprocessing cycles. However, these results suggest that other carbamate exchange catalysts should be investigated if materials capable of many reprocessing operations are desired. Based on our previous study, DBTDL was replaced with the less toxic and greener catalyst, bismuth neodecanoate (Bi(neo)$_3$). Reprocessing via microcompounding was possible, but led to non-continuous extrusion and discoloration of the resulting materials (FIG. 18). Interestingly, the materials retained stress relaxation in both clear and dark portions of the PU film (FIG. 19). Nevertheless, despite the loss of dynamic behavior after extrusion, the DBTDL-catalyzed films extrude continuously while maintaining excellent mechanical properties.

TABLE 9

Tensile testing of DBTDL polyester polyurethanes before and after reprocessing

| Model Foams | $\sigma_b$ (MPa) | $\gamma_p$(%) | E (GPa) |
|---|---|---|---|
| As-Synthesized | 49.7 ± 1.6 | 4.8 ± 1.0 | 1.57 ± 0.09 |
| Compression Molded | 13.6 ± 1.4 | 1.4 ± 0.1 | 1.04 ± 0.11 |
| Start of Extrudate | 50.8 ± 6.7 | 3.6 ± 1.0 | 1.89 ± 0.18 |
| End of Extrudate | 47.1 ± 12.1 | 3.2 ± 1.1 | 2.20 ± 0.30 |

Figure 20A:
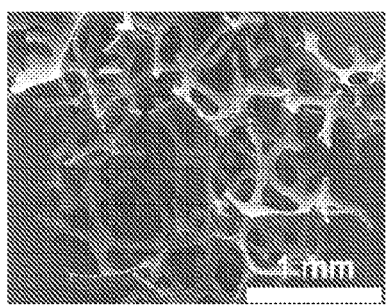
FIGS. 20A-20C show SEM images of commercial PU flexible foam (FIG. 20A), compression molded commercial PU foam (FIG. 20A), and microcompounded commercial PU foam (FIG. 20C). Reprocessed materials were swollen in catalyst solution prior to processing.
Figure 20B:
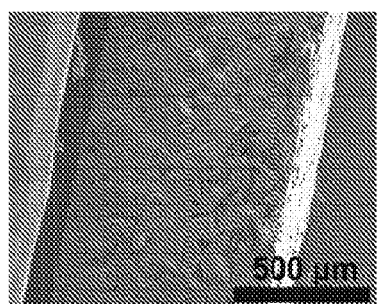
Figure 20C:
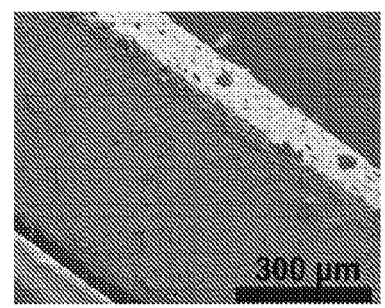
Figure 21A:
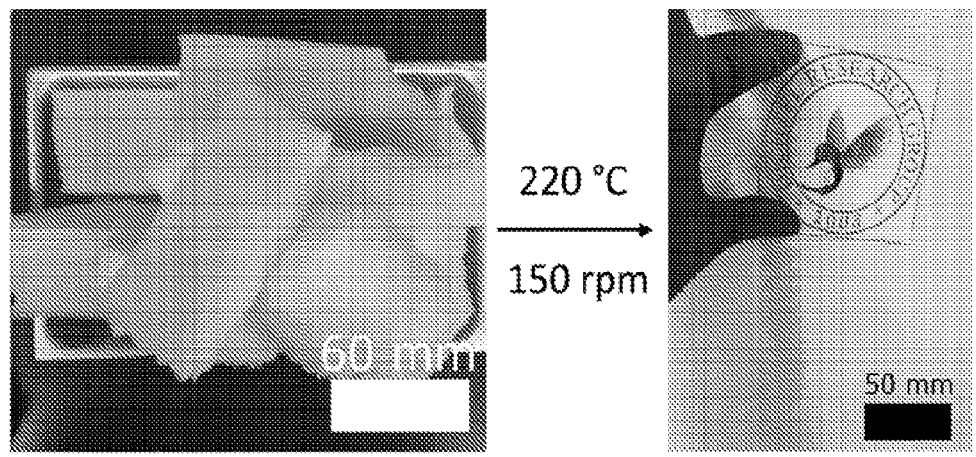
FIG. 21A shows images of the PU foam reprocessed into films by microcompounding. Reprocessed materials were swollen in catalyst solution prior to processing.
Figure 21B:
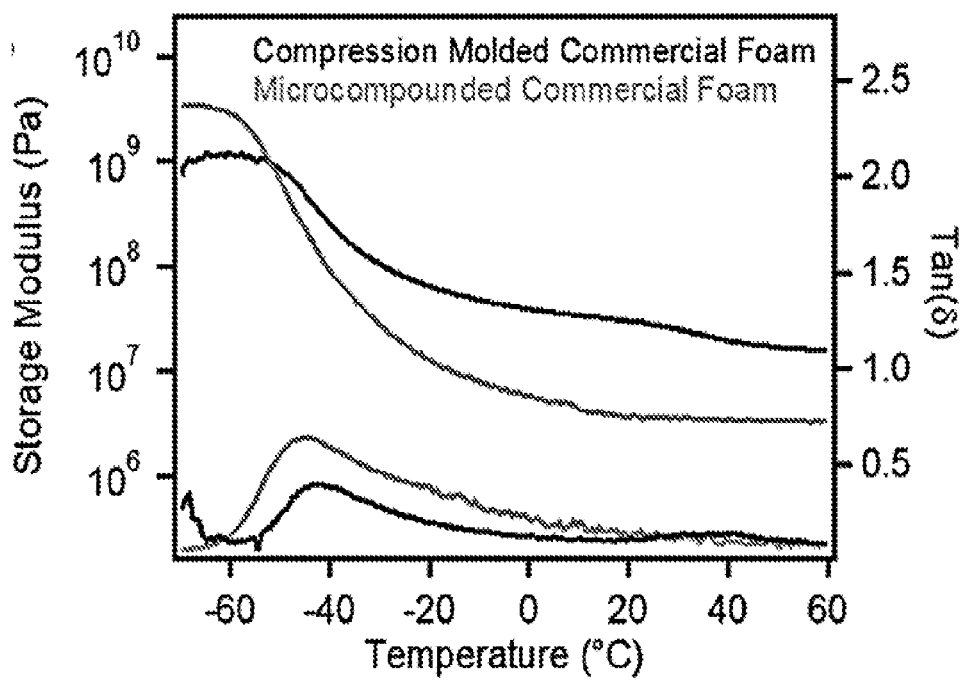
FIG. 21B shows DMTA of compression molded commercial PU foam (upper most and lower most trace at −40° C.) and microcompounded PU foam (middle traces at −40° C.). Reprocessed materials were swollen in catalyst solution prior to processing.
Figure 24:
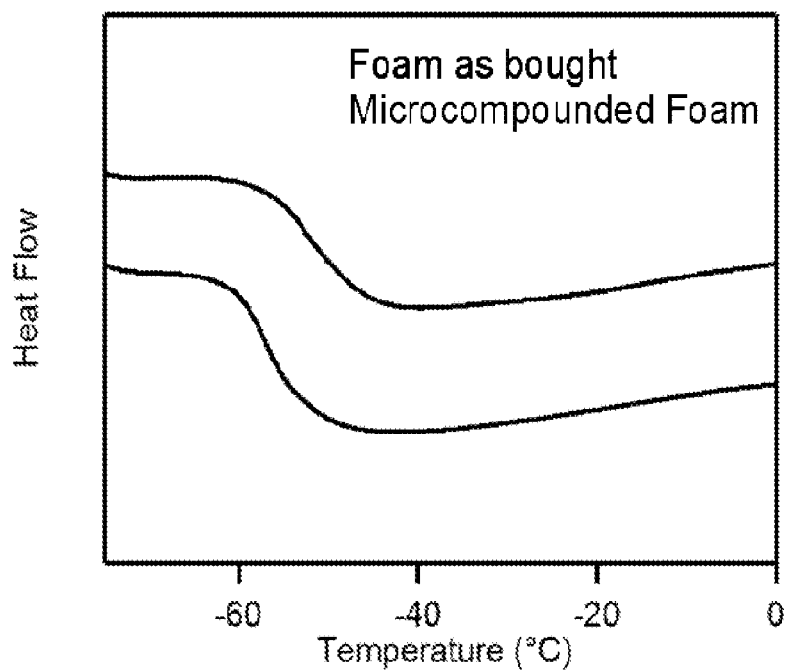
FIG. 24 shows differential scanning calorimetry of commercial foam as bought (top) and after microcompounding (bottom). Reprocessed materials were swollen in catalyst solution prior to processing.
Figure 25:
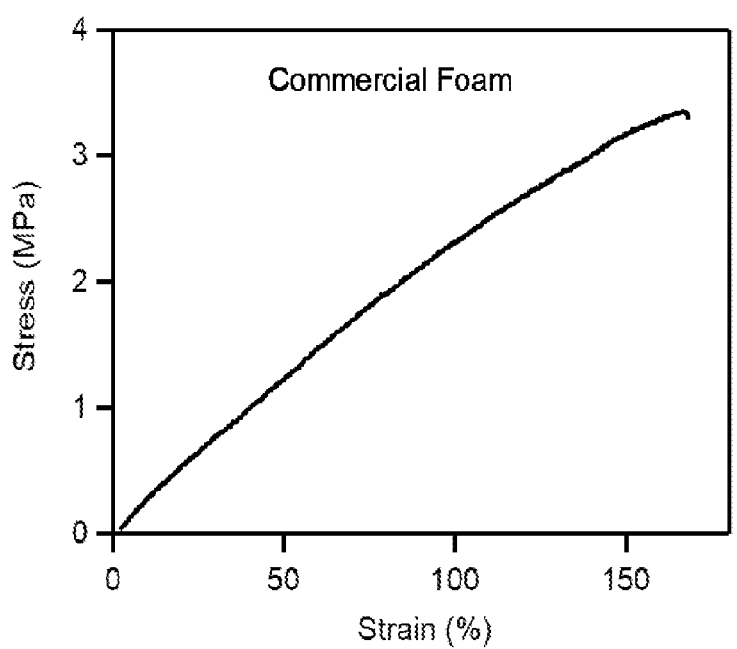
FIG. 25 shows tensile testing of microcompounded commercial (AirLite) foam. Reprocessed materials were swollen in catalyst solution prior to processing.
Figure 26:
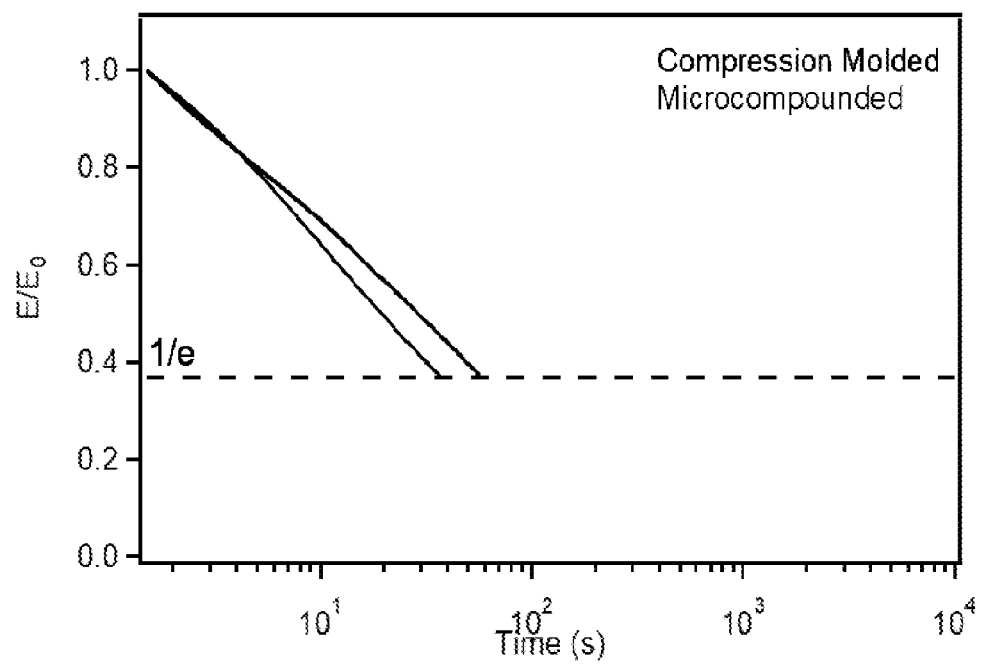
FIG. 26 shows SRA of compression molded (top) and microcompounded (bottom) commercial (AirLite) foam at 160° C. Reprocessed materials were swollen in catalyst solution prior to processing.

Having established reprocessing conditions for model PB PU foams, we applied this method to PU foams taken from consumer products, envisioning that this methodology could be applied to reprocess the vast amounts of PU waste created annually (1.3 million tons of PU waste in the US alone). Commercial PU foam (Air Lite) was purchased, infused with DBTDL catalyst, and microcompounded under similar conditions. ICP-OES confirmed that the Sn catalyst was present in treated commercial PU foams at similar weight percentages (0.64 wt %). As with the model PB PU foam, compression molding the commercial PU foam yielded inhomogeneous films with broad glass transitions, as well as obvious air voids observed by SEM (FIG. 20), The catalyst-loaded commercial PU foam, despite containing a proprietary mixture of additives, such as surfactants, flame retardants, and stabilizers, underwent microcompounding and extrusion similar to the model PB PU foams (FIG. 21A), suggesting this methodology is tolerant of commercial PU formulations. Efforts to microcompound foams without added DBTDL failed, demonstrating the importance of introducing the catalyst to facilitate dynamic exchange and malleability into commercial PU foam (FIG. 22). Optical microscopy and SEM of the extruded film indicated relatively homogeneous materials that were free of trapped air (FIG. 23). DMTA of microcompounded films indicate much more homogenous films with a near 50% increase in the area under the tan(δ) curve relative to compression molded samples (FIG. 21B). Microcompounded foams exhibited a 5° C. lower glass transition by DSC compared to as-supplied foams, which is similar to the glass transition decrease in microcompounded PB PU model foams (FIG. 24). Tensile strength of microcompounded commercial PU foam was 3.4 MPa with average elongation of break of 168%, values typical of loosely cross-linked elastomeric materials (FIG. 25). Interestingly, the microcompounded commercial foams relax stress after microcompounding (FIG. 26) which is in stark contrast to model PB PU foam, suggesting that these commercial materials may be capable of further reprocessing cycles and demonstrating the promise of this methodology for continuous recycling of commercial PU foam waste.

Conclusions: We have demonstrated that PU thermosets can be made continuously processable via post-synthetic introduction of an exchange catalyst. This process imparts malleability into cross-linked PU materials traditionally considered as thermosets. DMTA and SEM imaging indicates that reprocessing via compression molding is inefficient at removing air from foam materials. Microscopy and thermomechanical experiments show that air can be efficiently removed from PU foam using industrially relevant twin-screw extrusion which allows for continuous quantitative reprocessing of cross-linked PU foam into film. Additionally, we demonstrate the efficacy of this reprocessing method with commercial PU foams, suggesting its applicability to continuous recycling of the large amounts of PU waste currently produced. We expect that post-synthetic introduction of catalyst combined with twin-screw extrusion mixing will enable recycling of a wide variety of PU waste into high value materials and will inspire the development of similar methodology for the recycling of other commodity thermosets. These findings demonstrate that exchange catalysts can withstand multiple reprocessing cycles and therefore, potentially limit the use of hazardous isocyanates for synthesis of new PUs.

Materials and General Methods

Materials. All reagents were purchased from Sigma-Aldrich or Fisher Scientific. Polyols were dried at 90° C. under 20 mTorr vacuum for at least 24 hours prior to use for film synthesis. All other reagents were used without further purification unless otherwise specified. Dichloromethane (CH$_2$Cl$_2$) and toluene were purchased from Fisher Scientific and purified using a custom-built alumina-column based solvent purification system.

Infrared spectra were recorded on a Thermo Nicolet iS10 equipped with a ZnSe ATR attachment. Spectra were uncorrected.

Solution-phase NMR spectra were recorded on a Varian 400 MHz or an Agilent DD MR-400 400 MHz spectrometer using a standard 41/X Z-PFG probe at ambient temperature.

Thermogravimetric analysis (TGA) was performed on a Mettler Toledo SDTA851 Thermogravimetric Analysis System using 5-10 mg of sample. Samples were heated under a nitrogen atmosphere at a rate of 5 or 10° C./min from 25° C. to 600° C.

Differential scanning calorimetry (DSC) was performed on a Mettler Toledo DSC822 or TA Instruments DSC250 Differential Scanning calorimeter. Samples (5-10 mg) were heated at a rate of 10° C./min to at least 90 or 150° C. to erase thermal history, cooled to −30 or −80° C. at 10° C./min, and then heated to at least 110 or 120° C. All data shown are taken from the second heating ramp. The glass transition temperature (T$_g$) was calculated from the maximum value of the derivative of heat flow with respect to temperature.

Dynamic mechanical thermal analysis (DMTA) was performed on a TA Instruments RSA-G2 analyzer (New Castle, DE) using rectangular films (ca. 0.75 mm (T)×5 mm (W)×20 mm (L) and a gauge length of 10 mm). The axial force was adjusted to 0 N and a strain adjust of 30% was set with a minimum strain of 0.05%, a maximum strain of 5%, and a maximum force of 1 N in order to prevent the sample from buckling or going out of the specified strain. Furthermore, a force tracking mode was set such that the axial force was twice the magnitude of the oscillation force. A temperature ramp was then performed from 30° C. to 200° C. at a rate of 5° C./min, with an oscillating strain of 0.05% and an angular frequency of 6.28 rad s$^{-1}$ (1 Hz). The $T_g$ was calculated from the maximum value of the loss modulus (E").

Stress relaxation analysis (SRA) was performed on a TA Instruments RSA-III analyzer (New Castle, DE) using rectangular films (ca. 1.0 mm (T)×5 mm (W)×15 mm (L) and a Gauge length of 8-9 mm. The SRA experiments were performed with strain control at specified temperature (110 to 160° C.). The samples were allowed to equilibrate at this temperature for approximately 10 minutes, after which the axial force was then adjusted to 0 N. Each sample was then subjected to an instantaneous 5% strain. The stress decay was monitored, while maintaining a constant strain (5%), until the stress relaxation modulus had relaxed to at least 37% (1/e) of its initial value. This was performed three consecutive times for each sample. The activation energy (Ea) and freezing transition temperature (Tv) were determined using the methodology in literature. [Capelot, M. et al., *ACS Macro Lett.* 2012, 1, 789-792; Brutman, J. P. et al., *ACS Macro Lett.* 2014, 3, 607-610; Brutman, J. P.; Delgado, P. A.; Hillmyer, M. A., Polyactide Vitrimers. *ACS Macro Letters* 2014, 3 (7), 607-610]

Figure 27:
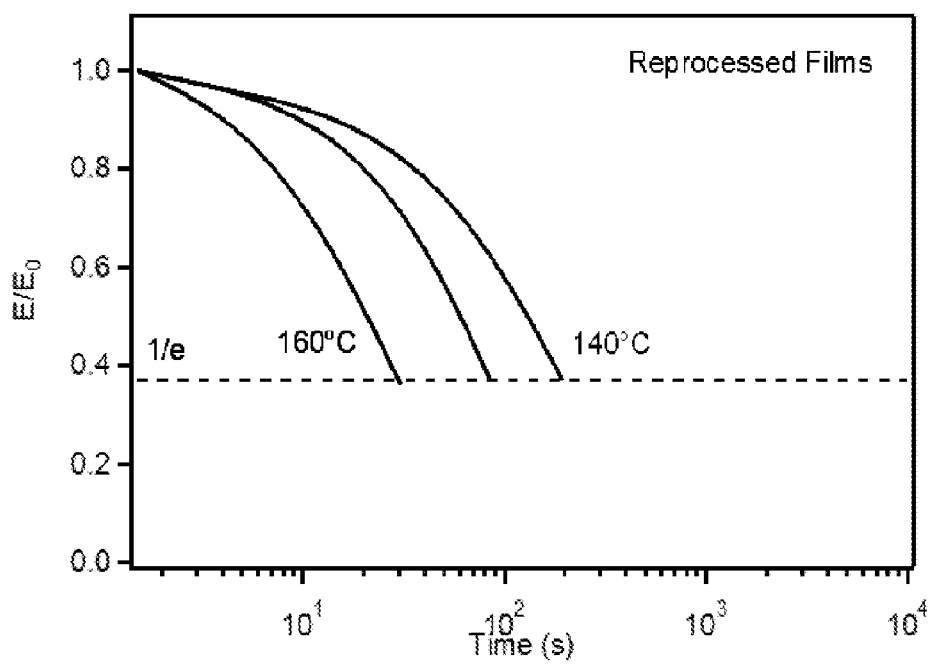
FIG. 27 shows representative SRA traces (140, 150, and 160° C.) of model PU films post-synthetically treated with DBTDL, then compression molded for 12 min at 160° C.
Figure 28:
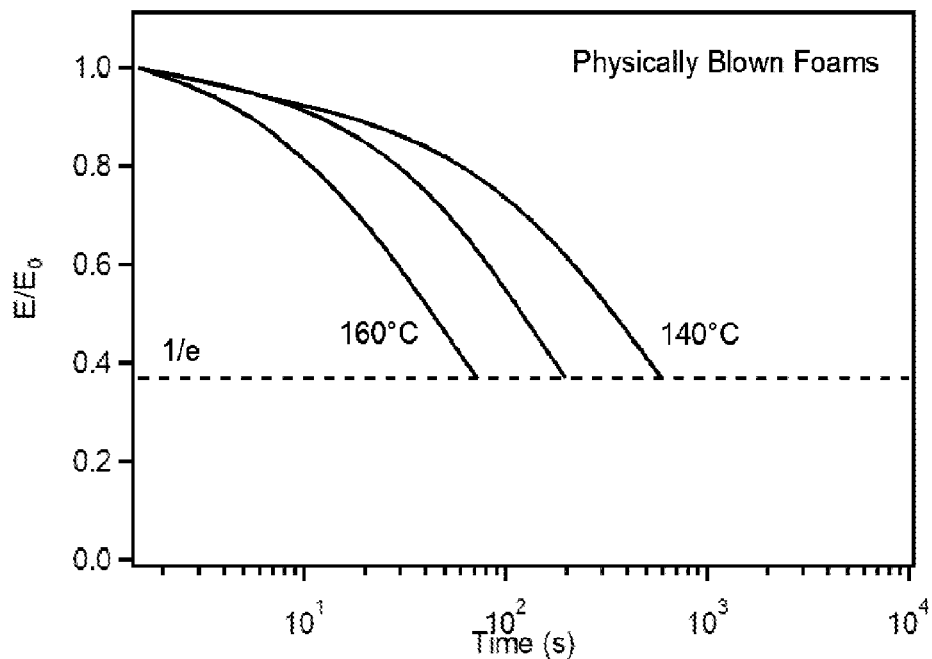
FIG. 28 shows representative SRA traces (140, 150, and 160° C.) of model physically blown PU foams post-synthetically treated with DBTDL, then compression molded for 12 min at 160° C.
Figure 29:
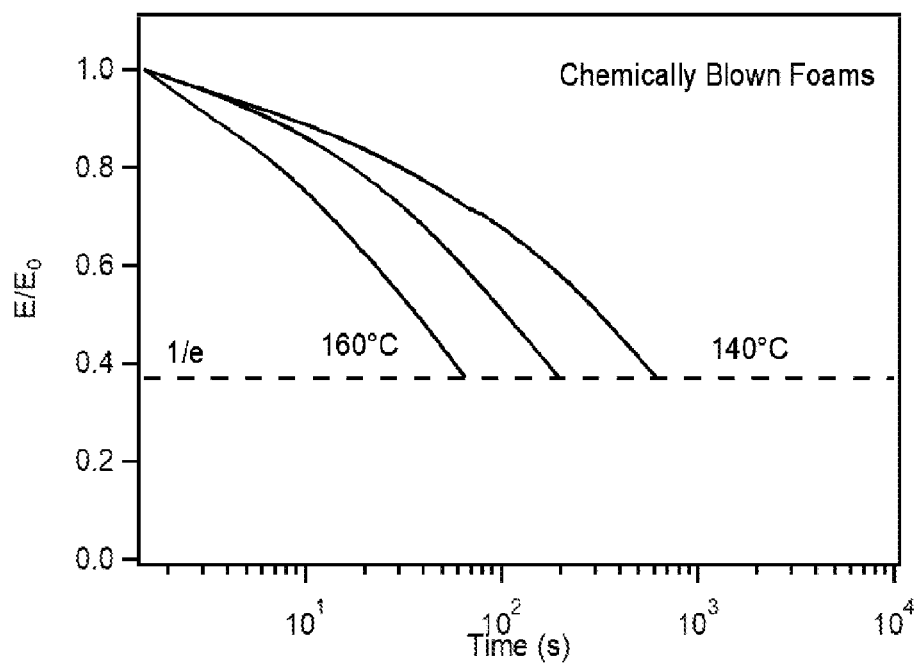
FIG. 29 shows representative SRA traces (140, 150, and 160° C.) of model chemically blown PU foams post-synthetically treated with DBTDL, then compression molded for 12 min at 160° C.

FIGS. 27-29 show representative SRA traces at (140, 150, and 160° C.) of model PU films post-synthetically treated with DBTDL (FIG. 27), physically-blown PU foams post-synthetically treated with DBTDL, (FIG. 28), and chemically-blown PU foams post-synthetically treated with DBTDL (FIG. 29), then compression molded for 12 min at 160° C. Table 10 summarizes the characteristic relaxation times.

TABLE 10

Characteristic relaxation times of compression molded model PU materials at various temperatures.

| Material Type | 160° C. | 150° C. | 140° C. |
|---|---|---|---|
| Films | 28 ± 1 s | 82 ± 3 s | 194 ± 9 s |
| PB Foam | 71 ± 4 s | 226 ± 20 s | 605 ± 11 s |
| CB Foam | 53 ± 16 s | 206 ± 25 s | 642 ± 113 s |

Material reprocessing. To reprocess the materials, the polymer was ground into small pieces using a Cuisinart Grind Central© coffee grinder. The ground polymer was spread between two aluminum plates in a 1.0 mm thick aluminum mold. This assembly was placed in PHI 30-ton manual press preheated to the desired temperature and allowed to thermally equilibrate for 1 minute. The material was compressed at 5-10 MPa of pressure for 30 s, then the pressure was released, and this was repeated 2× to enable removal of air bubbles. The material was then compressed at 5-10 MPa for 12 or 30 minutes. The homogenous polymer was removed from the mold, and specimens for DMTA were cut into rectangular films or tensile bars. Reprocessed materials may be indicated by the designation "RP#" where # indicates the number of times the material has been reprocessed.

Reprocessing via microcompounding: Ground polyurethane powders were fed into a recirculating, conical twin-screw batch mixer (DSM Xplore, 5 mL capacity) operated at 100 rpm with a steady nitrogen purge. The operating temperatures for model and commercial PU foams were 200 and 220° C., respectively. The residence time was estimated to be ~1 min. The material was then extruded through a 2.5 mm diameter die (into a cylinders) or a 1 mm thick film die (into continuous films) and air cooled.

Scanning Electron Microscopy: Polyurethane foams and films were secured to a flat or 90° aluminum sample holder, coated with 5 nm of osmium, and imaged with a Hitachi S4800-II cFEG SEM.

Optical microscopy was performed on an Olympus SZX16 microscope.

Characterization Tables and Figures: Area under tan(δ) calculation using the rectangle method:

$$\int_{T_i}^{T_f} \tan(\delta) dT$$

where $T_f$ is the final temperature and $T_i$ is the initial starting temperature $$\sum_{n=1}^{T_f} \left( \frac{\tan(\delta)_n + \tan(\delta)_{n+1}}{2} \right) * (T_{n+1} - T_n).$$

All areas were calculated over the entire temperature range of the measurement using the rectangular method.

Synthetic Procedures

Scheme 2. Synthesis of N-phenyl-O-octyl urethane

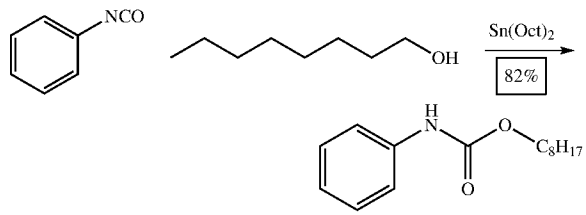

Synthesis of N-phenyl-O-octyl urethane: To a flame-dried round-bottom flask under nitrogen atmosphere was added 1-octanol (2.19 g, 2.65 ml, 16.8 mmol) and anhydrous tetrahydrofuran (20 mL). A solution of Sn(Oct)$_2$ (130 mg, 0.34 mmol, 2 mol %) dissolved in anhydrous tetrahydrofuran (1 mL) was added, followed by addition of phenyl isocyanate (2.00 g, 1.82 ml, 16.8 mmol) using a syringe. The resulting solution was stirred at room temperature for 24 h, and solvent was removed at reduced pressure to yield a white solid. The crude solid was chromatographed on silica gel in 20% ethyl acetate/hexanes to yield the product as a white solid (3.4 g, 82% yield). $^1$H NMR (400 MHz, CDCl$_3$) δ 7.38 (d, J=8.0 Hz, 2H), 7.35-7.23 (m, 2H), 7.05 (tt, J=7.1, 1.2 Hz, 1H), 6.56 (br s, 1H), 4.16 (t, J=6.7 Hz, 2H), 1.71-1.63 (m, 2H), 1.43-1.23 (m, 10H), 0.89 (t, J=7.8 Hz, 3H). $^{13}$C NMR (100 MHz, CDCl$_3$) δ 153.7, 138.0, 128.9, 123.2, 118.5, 65.4, 31.7, 29.19, 29.15, 28.9, 25.8, 22.6, 14.0. IR (neat, ATR) 3304, 2956, 2920, 2853, 1698, 1599, 1544, 1444, 1236, 1055, 747 cm$^{-1}$.

Scheme 3. Synthesis of N-tolyl-O-decyl urethane

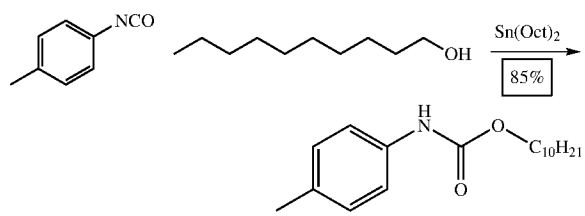

Synthesis of N-tolyl-O-decyl urethane: To a flame-dried round-bottom flask under nitrogen atmosphere was added 1-decanol (2.66 g, 3.20 ml, 16.8 mmol) and anhydrous tetrahydrofuran (20 mL). A solution of Sn(Oct)$_2$ (130 mg, 0.34 mmol, 2 mol %) dissolved in anhydrous tetrahydrofuran (1 mL) was added, followed by addition of p-tolyl isocyanate (2.24 g, 2.12 ml, 16.8 mmol) using a syringe. The resulting solution was stirred at room temperature for 24 h, and solvent was removed at reduced pressure to yield a white solid. The crude solid was chromatographed on silica gel in 20% ethyl acetate/hexanes to yield the product as a white solid (4.16 g, 85% yield). $^1$H NMR (400 MHz, CDCl$_3$) δ 7.28-7.22 (m, 2H), 7.10 (d, J=8.3 Hz, 2H), 6.49 (br s, 1H), 4.14 (t, J=6.7 Hz, 2H), 2.30 (s, 3H), 1.72-1.60 (m, 2H), 1.44-1.24 (m, 14H), 0.92-0.84 (m, 3H). $^{13}$C NMR (100 MHz, CDCl$_3$) δ 153.8, 135.4, 132.8, 129.4, 118.7, 65.3, 31.9, 29.51, 29.50, 29.27, 29.25, 28.9, 25.8, 22.6, 20.7, 14.1. IR (neat, ATR) 3327, 2919, 2851, 1696, 1596, 1531, 1314, 1235, 1071, 814 cm$^{-1}$.

Synthesis of Crosslinked Polyester Polyurethanes with Catalyst: To a vial was added poly[trimethylolpropane/di(propylene glycol)-alt-adipic acid/phthalic anhydride], polyol (200 eq. wt., 3.60 g, 18.0 mmol —OH) and dissolved in 12.0 ml anhydrous CH$_2$Cl$_2$. Solid 4,4'-methylenebis(phenyl isocyanate) (MDI) (2.253 g, 9.0 mmol) or liquid hexamethylene diisocyanate (HMDI) was added (1.514 g, 9.0 mmol), and the solution was vortexed until the isocyanate was totally dissolved. An aliquot of a solution of catalyst (50-100 mg/ml in anhydrous CH$_2$Cl$_2$) was added to give a total concentration of 1 mol % catalyst to total —NCO functionality. The resulting solution was vortexed for 60 seconds, then the mixtures were poured into an aluminum pan (104 mm D×15 mm H), covered with aluminum foil, and allowed to stand at room temperature for 16-24 h. The resulting films were cut & heated at 80° C. under 20 mtorr

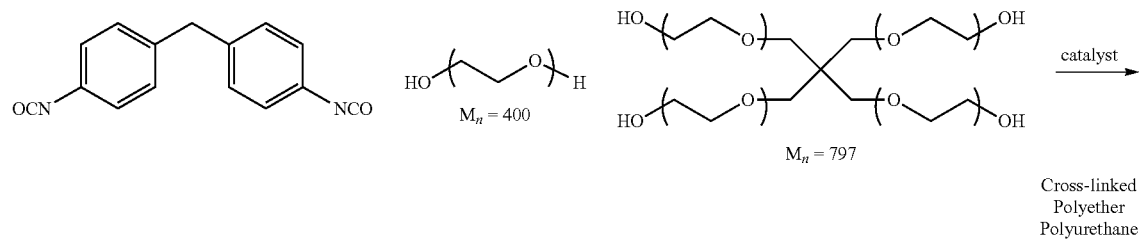

Scheme 4. Synthesis of Cross-linked Polyether Polyurethanes

Synthesis of Cross-linked PUs: To a vial was added pentaerythritol ethoxylate (15/4 EO/OH, average M$_n$≈797 g/mol, 150 mg, 0.19 mmol), polyethylene glycol (M$_n$≈400 g/mol, 1.500 g, 3.75 mmol), and 7.5 ml anhydrous CH$_2$Cl$_2$. Solid 4,4'-methylenebis(phenyl isocyanate) (MDI) (1.033 g, 4.13 mmol) was added, and the solution was vortexed until the MDI was totally dissolved. An aliquot of a solution of catalyst (50-100 mg/ml in anhydrous CH$_2$Cl$_2$) was added to give a total concentration of 1 mol % catalyst to total —NCO functionality. The resulting solution was vortexed for 20 seconds, then poured into aluminum pans (75 mm D×15 mm H), covered with aluminum foil, and allowed to stand at room temperature for 16-24 h. The resulting films were cut & heated at 80° C. under 20 mtorr vacuum for 48 h. Indistinguishable FT-IR spectra were obtained with samples containing different catalysts. FT-IR (solid, ATR) 3299 (N—H stretch), 2868, 1725-1706 (C=O stretch), 1598, 1532 (N—H deformation), 1412, 1309, 1220, 1067, 946, 816, 768 cm$^{-1}$.

vacuum for 48 h. Indistinguishable FT-IR spectra were obtained with samples containing different catalysts.

MDI polyester PU: FT-IR (solid, ATR) 3326 (N—H stretch), 2933, 1716-1705 (C=O stretch), 1597, 1525 (N—H deformation), 1412, 1309, 1219, 1066, 1017, 816, 766 cm$^{-1}$.

HMDI polyester PU: FT-IR (solid, ATR) 3349 (N—H stretch), 2917, 2850, 1716 (C=O stretch), 1521 (N—H deformation), 1455, 1378, 1258, 1069, 1019, 801, 703 cm$^{-1}$.

Synthesis of Catalyst-Free Cross-linked Polyester Polyurethane: To a vial was added poly[trimethylolpropane/di(propylene glycol)-alt-adipic acid/phthalic anhydride], polyol (200 eq. wt., 4.224 g, 21.1 mmol —OH) and dissolved in 8.0 ml anhydrous toluene. Solid 4,4'-methylenebis(phenyl isocyanate) (2.643 g, 10.56 mmol) was added, and the solution was heated to 60° C. until fully dissolved. The resulting mixture was vortexed for 30 s, poured into an aluminum pan (104 mm D×15 mm H), covered with aluminum foil, and heated at 60° C. for 18 h. The resulting

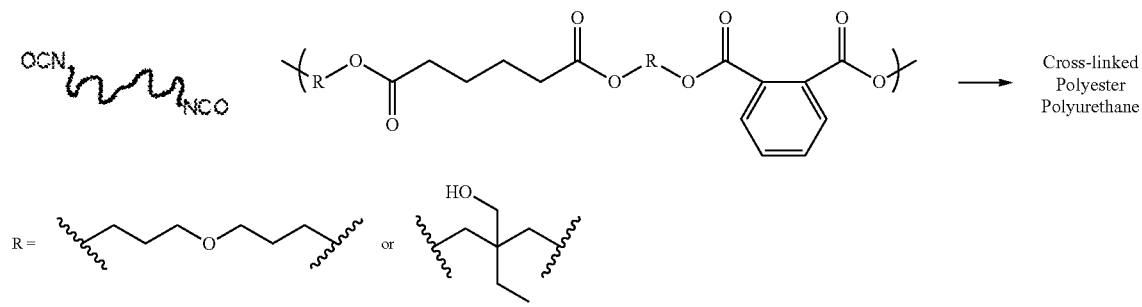

Scheme 5: Synthesis of Cross-linked Polyester Polyurethanes polymer was post-cured at 100° C. for 4 h, then 140° C. for 2 h, then 80° C. under vacuum for 12 h to ensure full curing and removal of solvent. FT-IR (solid, ATR) 3326 (N—H stretch), 2933, 1716-1705 (C=O stretch), 1597, 1525 (N—H deformation), 1412, 1309, 1219, 1066, 1017, 816, 766 cm$^{-1}$.

Post-synthetic introduction of Catalyst to PU: One gram of model PU was suspended in 10 mL of benchtop dichloromethane. To the suspension, Bi(neo)$_3$ (300 mg), DBTDL (300 mg), or Fe(acac)$_3$ (100 mg) was added and the resulting catalyst solution was stirred overnight. The resulting swollen polymer was filtered, collected, and placed in a vacuum oven at 90° C. at 20 mTorr for 24 hours to remove residual dichloromethane. The PU film was processed as collected. Microcompounding was executed in a conical twin-screw batch mixer (DSM Xplore, 5 mL capacity) operated at 200° C., 150 rpm for 30 seconds with a steady nitrogen purge.

Control PU Film: FT-IR (solid, ATR) 3307 (N—H stretch), 2917, 1708 (C=O stretch), 1597, 1529 (N—H deformation), 1457, 1412, 1377, 1308, 1219, 1066, 1017, 816, 766 cm$^{-1}$.

Physically Blown PU Foam: FT-IR (solid, ATR) 2932, 1723 (C=O stretch), 1596, 1530 (N—H deformation), 1511, 1456, 1412, 1377, 1307, 1219, 1124, 1063, 1017, 816, 767, 745, 705 cm$^{-1}$.

Chemically Blown PU Foam: FT-IR (solid, ATR) 3334 (N—H stretch), 2918, 1724 (C=O stretch), 1596, 1531 (N—H deformation), 1511, 1459, 1412, 1377, 1309, 1220, 1065, 1017, 816, 766 cm$^{-1}$.

Post-synthetic introduction of Catalyst to model PU Foam or Film: One gram of model foam was suspended in 10 mL of benchtop dichloromethane. To the suspension, Bi(neo)$_3$ (300 mg) or DBTDL (300 mg) was added and the resulting catalyst solution was stirred overnight. The resulting swol-

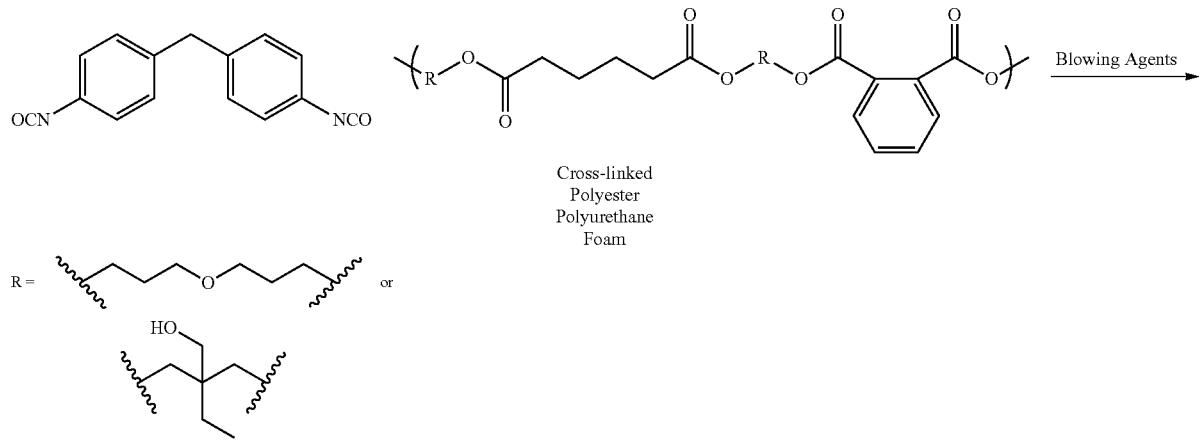

Synthesis of Model Crosslinked Polyester Polyurethane Foam: To a plastic cup was added poly [trimethylolpropane/di(propylene glycol)-alt-adipic acid/phthalic anhydride], polyol (200 eq. wt., 10 g, 50 mmol —OH), blowing agents isopentane (300 mg) or H$_2$O (300 mg, 16.7 mmol), and dibutyltin dilaurate (200 mg, 0.6 mol % with respect to —NCO). Ground solid 4,4'-methylenebis(phenyl isocyanate) (MDI) (6.26 g, 25.0 mmol) was added and mixed at 2000 rpm using an overhead mechanical mixer. The mixture was allowed to sit for one hour to gel and rise. The resulting bulk polymer was transferred to an aluminum pan (104 mm D×15 mm H) and placed in a vacuum oven at 90° C. at 20 mTorr to immediately expand and cure for 24 hours.

Synthesis of Crosslinked Polyester Polyurethane Foam: To a plastic cup was added poly[trimethylolpropane/di(propylene glycol)-alt-adipic acid/phthalic anhydride] polyol (200 eq. wt., 10 g, 50 mmol —OH), blowing agents isopentane (300 mg) or H$_2$O (300 mg, 16.7 mmol), and dibutyltin dilaurate (111 mg, 0.35 mol % with respect to —NCO). Ground solid 4,4'-methylenebis(phenyl isocyanate) (MDI) (6.26 g, 25.0 mmol) was added and mixed vigorously. The mixture was allowed to sit for one hour to gel and rise. The resulting bulk polymer was transferred to an aluminum pan (104 mm D×15 mm H) and placed in a vacuum oven at 90° C. at 20 mTorr to immediately expand and cure for 48 hours. The foam was post cured at 150° C. for 1 hour to ensure full cross-linking.

len polymer was filtered, collected, and placed in a vacuum oven at 90° C. at 20 mTorr for 24 hours to remove residual dichloromethane. The PU foam was processed as collected. Microcompounding was executed in a conical twin-screw batch mixer (DSM Xplore, 5 mL capacity) operated at 200° C., 150 rpm for 30 seconds with a steady nitrogen purge. When scaling up to multigram amounts, the amount of 30 mg/mL solvent was adjusted to match the polymer to solvent ratio of 100 mg/mL Post-synthetic introduction of catalyst to commercial PU film or foam: Thirty grams of commercial foam was suspended in 1.5 L of benchtop dichloromethane. To the suspension DBTDL (4.5 grams) was added and the resulting 30 mg/mL catalyst solution was stirred overnight. The resulting swollen polymer was filtered, collected, and placed in a vacuum oven at 90° C. at 20 mTorr for 24 hours to remove residual dichloromethane.

The invention claimed is:

1. A method for reprocessing a polyurethane composition, the method comprising introducing a polyurethane composition into a compounding device, heating the polyurethane composition to an effective bond-exchange temperature, and compounding the polyurethane composition for an effective bond-exchange time, wherein the polyurethane composition comprises a network polymer and an effective amount of a polyurethane exchange catalyst permeated within the network polymer, wherein the network polymer comprises a dynamic network formed from an isocyanate constitutional unit and a second constitutional unit having a hydroxyl group capable of reacting with an isocyanate group of the isocyanate constitutional unit to form a urethane bond.

2. A method of claim 1, wherein the polyurethane composition is prepared from a polyurethane foam.

3. The method of claim 2, further comprising providing the polyurethane composition by impregnating the polyurethane foam with the catalyst by swelling.

4. The method of claim 2, further comprising providing the polyurethane composition by mixing the polyurethane foam with the catalyst.

5. The method of claim 2, wherein the network polymer is formed in the presence of the catalyst.

6. The method of claim 1, wherein the polyurethane exchange catalyst comprises a metal selected from Sn, Bi, Fe, Zr, Ti, Hf, Al, Zn, Cu, Ni, Co, Mn, V, Sc, Y, Ce, or Mo and a ligand coordinated with the metal atom.

7. The method of claim 6, wherein the catalyst comprises DBTDL, $Bi(neo)_3$, $Fe(acac)_3$, $Ti(OiPr)_2(acac)_2$, $Hf(acac)_4$, $Zr(acac)_4$, $Mn(acac)_2$, $Bi(oct)_3$, $Zn(tmhd)_2$, $Zr(tmhd)_4$, or any combination thereof.

8. The method of claim 1, wherein the effective amount of polyurethane exchange catalyst to total isocyanate functionality is less or equal to 5 mol %.

9. The method of claim 1, wherein the second constitutional unit is a prepolymer molecule comprising a polyether, a polyester, a polycarbonate, a polyacrylate, a polyolefin, a polybutadiene, a polysulfide, or a polysiloxane.

10. The method of claim 1, wherein the second constitutional unit is a branch unit having at least two hydroxyl groups each capable of reacting with the isocyanate group of the first constitutional unit to form the urethane bond.

11. The method of claim 10, wherein the second constitutional unit further comprises one or more molecules selected from a polyether, a polyester, a polycarbonate, a polyacrylate, a polyolefin, a polybutadiene, a polysulfide, a polysiloxane, a plant-based oil, an alcohol, or an amine.

12. The method of claim 1, wherein the isocyanate constitutional unit is an aromatic isocyanate constitutional unit.

13. The method of claim 1, wherein the isocyanate constitutional unit comprises at least two isocyanate groups.

14. The method of claim 1, wherein the effective bond-exchange temperature is less than or equal to 160° C.

15. The method of claim 1, wherein the effective bond-exchange time is less than or equal to 12 minutes.

16. The method of claim 1 further comprising mechanically processing the polyurethane composition prior to heating.

17. The method of claim 1, wherein the compounding device is a batch-service compounding device.

18. The method of claim 17, wherein the compounding device is a mixer or a kneader.

19. The method of claim 1, wherein the compounding device is a continuous-service compounding device.

20. The method of claim 19, wherein the compounding device is a twin-screw extruder.

* * * * *